United States Patent
Konno et al.

[11] Patent Number: 5,392,067
[45] Date of Patent: Feb. 21, 1995

[54] TV SYSTEM FOR ENDOSCOPES

[75] Inventors: Mitsujiro Konno, Houya; Yoshiharu Takasugi, Iruma; Katsuya Ono, Akishima; Kimihiko Nishioka, Hachiouji, all of Japan

[73] Assignee: Olympus Optical Co., Ltd., Tokyo, Japan

[21] Appl. No.: 962,635

[22] Filed: Oct. 16, 1992

[30] Foreign Application Priority Data

Oct. 17, 1991 [JP] Japan .................. 3-269410
Sep. 7, 1992 [JP] Japan .................. 4-238618

[51] Int. Cl.⁶ .................. H04N 7/10; H04N 7/18
[52] U.S. Cl. .................. 348/72; 348/65; 348/71; 128/4; 128/6
[58] Field of Search .................. 358/98; 348/72, 71, 348/65; 128/6, 4; H04N 7/18, 7/10

[56] References Cited

U.S. PATENT DOCUMENTS

| | | | |
|---|---|---|---|
| 4,807,025 | 2/1989 | Eino et al. ............... | 358/98 |
| 4,856,495 | 8/1989 | Tohjoh et al. ............ | 128/6 |
| 4,930,861 | 6/1990 | Okabe et al. ............. | 350/96.25 |
| 4,977,450 | 12/1990 | Yokota ..................... | 358/98 |
| 4,988,171 | 1/1991 | Yokota ..................... | 350/404 |
| 5,050,974 | 9/1991 | Takasuki et al. .......... | 359/728 |
| 5,091,795 | 2/1992 | Nishioka et al. .......... | 359/93 |
| 5,233,416 | 8/1993 | Inoue ........................ | 358/98 |
| 5,237,446 | 8/1993 | Takahashi ................. | 348/337 |
| 5,270,825 | 12/1993 | Takasugi ................... | 348/65 |

FOREIGN PATENT DOCUMENTS

60-90484 5/1985 Japan .
1284225 11/1989 Japan .

Primary Examiner—Tommy B. Chin
Assistant Examiner—Vu Le
Attorney, Agent, or Firm—Cushman, Darby & Cushman

[57] ABSTRACT

A TV system for endoscopes is configured to connect to a fiber scope using an image guide fiber bundle and a rigid endoscope using a relay lens system. An image is formed by either the fiber scope or the rigid endoscope on a TV monitor. The camera control unit controls a level of the color difference signal in accordance with spatial frequency components contained in the TV signal. A variable switching unit is provided which allows the electrical circuits of the camera control unit to function selectively in accordance with the characteristics of the image transmission system.

9 Claims, 48 Drawing Sheets

○ 1ST SPECTRUM $f_F$
× 2ND SPECTRUM
• 3RD SPECTRUM

FIG. 12A
PRIOR ART
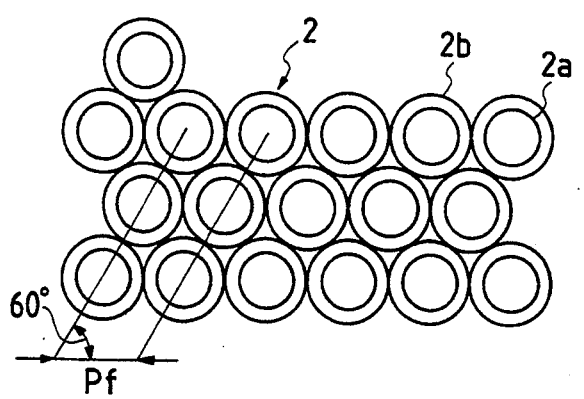
FIG. 12B
PRIOR ART
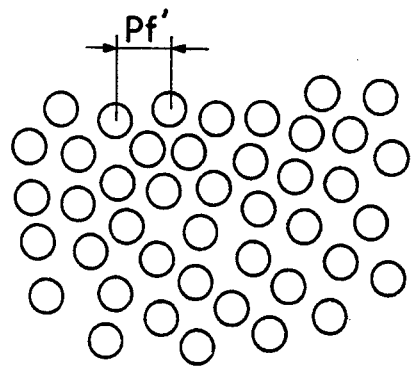
FIG. 12C
PRIOR ART
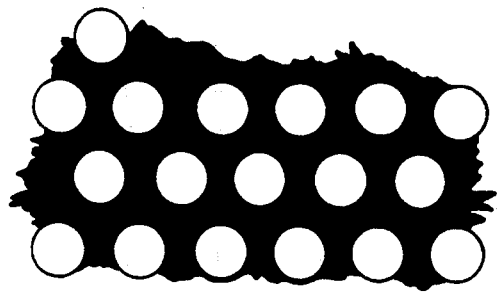
FIG. 12D
PRIOR ART
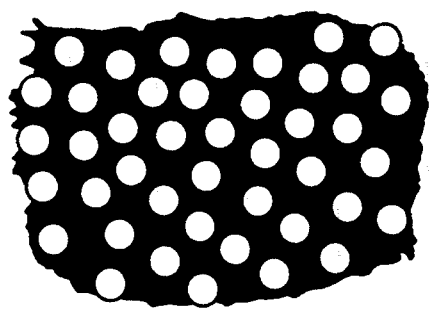
FIG. 13
PRIOR ART
| G | Mg | G | Mg |
|---|----|---|----|
| C | Y  | C | Y  |
| Mg| G  | Mg| G  |
| C | Y  | C | Y  |
| G | Mg | G | Mg |
Px, Py FREQUENCY COMPONENT NEAR 3.58 MHz IN LUMINANCE SIGNAL WHICH HAS BEEN CUT-OFF BY OPTICAL LOW-PASS FILTER FREQUENCY COMPONENT NEAR 3.58MHz IN LUMINANCE SIGNAL

LUMINANCE SIGNAL

INPUT SIGNAL

DELAY TIME OF APERTURE SIGNAL

APERTURE SIGNAL

AMPLITUDE

OUTPUT SIGNAL IN WHICH EDGE IS STRESSED

HORIZONTAL SCANNING DIRECTION

VERTICAL DIRECTION

HORIZONTAL SCANNING DIRECTION

DIRECTION OF +30°

VERTICAL DIRECTION

DIRECTION OF -30°

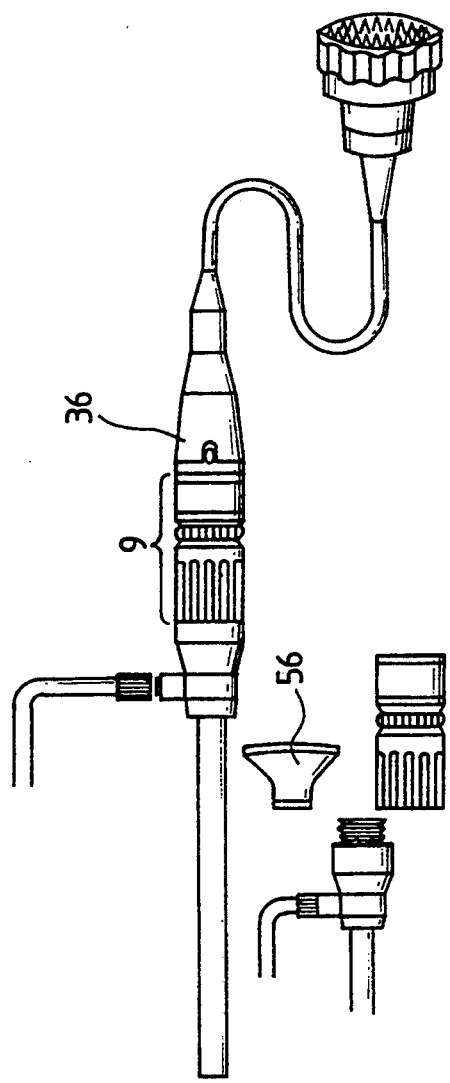
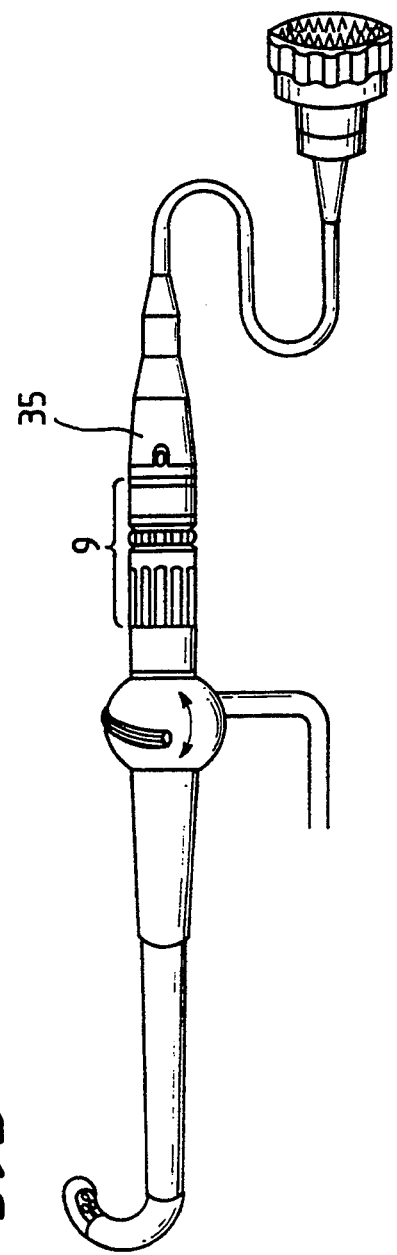
FIG. 59A
FIG. 59B

TV SYSTEM FOR ENDOSCOPES

FIELD OF THE INVENTION

The present invention relates to a TV system for endoscopes which is configured so as to permit observing images of coelomata, etc. on a TV monitor or the similar apparatus while selectively using a fiber scope and a rigid or non-flexible endoscope.

BACKGROUND OF THE INVENTION

In the recent years, there have been prevailing TV systems for endoscopes which are configured so as to permit observing images of coelomata, etc. on TV monitor and the similar apparatus. Since such a TV system allows an image to be observed simultaneously by a large number of persons at the same time and specific information contained in an image of object to be conspicuous or to be erased by utilizing image processing techniques, these TV systems are utilized for diagnoses of living bodies, surgical operations, various types of inspections in body cavities, and will find wider fields of application in the future.

There is known, as an example of surgical operations using endoscopes, laparoscopic chole-cyst-ectomia which is carried out for removing chole-lithus. Recently, attention has been paid to a surgical operation which is referred to as "Common Bile Scopy". This operation is adopted for removing chole-lithus after switching a rigid endoscope used for observation to a fiber scope which is capable of allowing a scalpel, scissors and other means for surgical operations to protrude out through a forceps channel when chole-lithus filling a bile duct is found during the laparoscopic chole-cyst-ectomia.

An example of a TV system for endoscopes which is used for the surgical operation will be described with reference to FIG. 1 through FIG. 4. In FIG. 1, the reference numeral 1 represents a fiber scope which uses an image guide fiber bundle as an image transmission system, the reference numeral 3 designates a rigid endoscope which uses a relay lens system as an image transmission system. The reference numeral 5 represents objective lenses which are disposed in distal ends of the fiber scope 1 and the rigid endoscope 3 respectively, the reference numeral 6 designates eyepiece lenses disposed in eyepiece units 7 of the fiber scope and the rigid endoscope respectively, and the reference numeral 8 denotes an adaptor which comprises an imaging lens system 9 and is adopted for connecting the eyepiece units 7 to a TV camera 10 which does not comprise an imaging optical system. Disposed in the TV camera 10 are an optical low-pass-filter 11 and a solid-state image pickup device (CCD) 12.

When the fiber scope 1 is selected as an endoscope for observation, an object M is illuminated with an illumination light bundle which is emitted from a light source (not shown) and transmitted through the light guide, an image of the object M is formed by the objective lens 5, and this image is transmitted through the image guide fiber bundle 2. The image is reimaged on the solid-state image pickup device 12 through the eyepiece lens system 6, the imaging lens system 9 and the low pass filter 11, and reproduced on a TV monitor through a camera control unit 13. When the rigid endoscope is selected as an endoscope, the image of the object M is transmitted through the relay lens system 4, reimaged on the solid-state image pickup device 12 through the eyepiece lens system 6, the imaging lens system 9 and the low pass filter 11 as in the case where the fiber scope 1 is selected, and reproduced on the TV monitor 14.

FIG. 2 illustrates a system configuration wherein the adaptor 8 is replaced with a camera head 15 which comprises the imaging lens system 9, the low pass filter 11 and the solid-state image pickup device 12. Further, FIG. 3 shows a system configuration which allows only the fiber scope 1 to be connected to the camera head, whereas FIG. 4 illustrates another system configuration wherein the eyepiece lens system 6 is not disposed in the fiber scope 1. In the system configuration illustrated in FIG. 4 wherein a camera head 13a consisting of the imaging lens system 9, low pass filter 11 and the solid-state image pickup devices 12, and a signal processing circuit 13b are disposed in the camera control unit 13, the fiber scope 1 is to be connected directly to the camera control unit 12, differently from the case of the system configurations which have already been described above. The fiber scope may be a fiber scope which uses a flexible image guide fiber bundle and is flexible as a whole or a fiber scope which uses a rigid image guide fiber bundle and is not flexible as a whole.

In each of the TV systems for endoscopes described above, an image formed on the solid-state image pickup devices i.e., an image transmitted to the solid-state image pickup device through the fiber scope or the rigid endoscope is used as an image to be projected to the TV monitor. An image formed by the fiber scope particularly has a characteristic described below. FIG. 5 shows an end surface of emergence of an image guide fiber bundle in which optical fibers are arranged densely in six directions. In FIG. 5, the reference numeral 2a represents a core of an image guide fiber bundle 2, and the reference numeral 2b designates a cladding.

Further, the arrow A indicates a direction in which the optical fibers are arranged and the arrow B indicates a horizontal scanning direction of a solid-state image pickup device 12 on which elements are disposed in a lattice pattern. When an image of the end surface of emergence of an image guide fiber bundle is picked up by the solid-state image pickup device 12, signals of the image formed by the endoscope contain an intense frequency spectrum $fF=1/Pf \times \beta \times \sin 60°$) which is produced due to arranged patterns on the image guide fiber bundle 2 and the solid-state image pickup device 12. In the formula expressing the intense frequency spectrum, the reference symbol Pf represents a pitch of images of the optical fibers and the reference symbol $\beta$ designates a magnification of the imaging optical system. This frequency spectrum fF is an especially intense frequency spectrum of the first order and, when it is illustrated on a two-dimensional spatial frequency plane taking the arrangement direction of the optical fibers as a horizontal axis, a large number of discrete frequency spectra of the second and higher orders appear as shown in FIG. 6.

When an image to be projected to the TV monitor is an image of an end surface of emergence of an image guide fiber bundle in which optical fibers are arranged at random as illustrated in FIG. 7, a frequency spectrum produced due to the arrangement pattern of the optical fibers is expressed as $fF=1/(Pf' \times \beta)$. In this formula, the reference symbol Pf' represents an average pitch of the optical fibers arranged at random. In this case, the frequency spectra are distributed nearly uniformly in all directions, unlike the case where the optical fibers are arranged densely in six directions.

In an optical instrument which discretely samples spatial frequencies for picking up an image by utilizing the solid-state image pickup device, high-frequency components exceeding the Nyquist frequency limit, if contained in the images of the object, produce spurious signals called aliasing, moiré, etc. due to beat between the high-frequency components and a sampling frequency.

Conventionally, these spurious signals are eliminated by disposing an optical low pass filter between the imaging optical system and the solid-state image pickup device as described above.

When an image of an object obtained with a fiber scope or a similar optical instrument is to be picked up by using a TV camera, however, it is necessary to sufficiently lower the response of the imaging optical system by adopting an optical low pass filter which is composed of a large number of birefringent plates as described in detail in Japanese Patent Preliminary Publication No. sho 63-291026.

In the TV system for endoscopes which can use the fiber scope 1 and the rigid endoscope 3 selectively as illustrated in FIG. 1 and FIG. 2, the optical low pass filter 11 is commonly used for the fiber scope 1 and the rigid endoscope 3. When an optical low pass filter having such a characteristic as to eliminate the moiré which is produced by selecting the fiber scope 1 is adopted for the TV system for endoscopes, the resolution of an image projected to the TV monitor is degraded. When an optical low pass filter having such a characteristic as to enhance the resolution of images formed by the rigid endoscope, image quality is degraded by the moiré which is produced by selecting the fiber scope.

For this reason, degradation in quality of images formed by the fiber scope 1 or the rigid endoscope 3 is ignored in the TV system for endoscopes described above or the imaging lens system 9 is slightly defocused to prevent the production of the moiré only when the fiber scope is selected as described in Japanese Patent Preliminary Publication No. Hei 2-89225.

A method which utilizes the digital technique successfully for obtaining, on a TV monitor, images which are formed with endoscopes, free from moiré and noise, and high in resolution and contrast will be described below.

FIG. 8 is a block diagram of main components of the camera control unit 13 which uses conventional analog circuits. In the camera control unit 13 shown in this drawing, an electrical signal output from a solid-state image pickup device 12 disposed in a TV camera 10 is divided into an electrical signal representing luminance information and another electrical signal representing color information while passing through an electrical low pass filter 16 and an electrical bandpass filter 17, respectively, which are disposed in parallel with each other in the camera control unit 13. The luminance information is divided by an aperture signal generating circuit 18 into an electrical signal for generating an aperture signal for emphasizing edges and into another electrical signal which is to be used as a luminance signal in a TV signal. Further, the electrical signal representing the color information is modulated by a modulator circuit 19 into a color difference (chroma) signal in the TV signal.

In a camera control unit which uses the digital circuits illustrated in the block diagram shown in FIG. 9, the electrical signal output from the solid-state image pickup device is divided into an electrical signal providing luminance information and another electrical signal providing color information as in the case of the analog circuits described above. These electrical signals are converted into digital signals by digital circuits 20 so that noise is not produced by the subsequent circuits and so that the S/N ratio is enhanced. A function of the aperture signal which is divided from the luminance information by an aperture signal generating circuit 18 will be described conceptionally with reference to FIG. 10A, FIG. 10B and FIG. 10C. Assuming that the rectangular wave shown in FIG. 10A is the electrical signal providing the luminance information, an aperture signal shown in FIG. 10B is obtained by processing this rectangular signal. By overlapping this aperture signal with the luminance signal, a signal emphasizing edges as shown in FIG. 10C (the aperture signal) can be obtained. Since the signal shown in FIG. 10C apparently has negative spot image intensity distribution, apparent response is changed from that shown in FIG. 11A to that shown in FIG. 11B exceeding 100%, whereby response, or contrast of the image of the object, can be enhanced.

The camera control unit illustrated in FIG. 9 comprises a color signal suppressing circuit which utilizes the digital signal processing technique described above. After the aperture signal shown FIG. 10B is generated by the aperture signal generating circuit 18, an absolute value of an amplitude of the aperture signal is calculated by a circuit 21, and an output intensity of the electrical signal providing the color information is adjusted in accordance with the absolute value by a chromagain controller 22 (these circuits and controller compose an aperture control circuit), and the color difference signal output from the modulator circuit is suppressed by a chromasuppress circuit 23. These circuits comprise the chromasuppress circuit 23. When high-frequency components producing moiré are contained in the image of the object, the aperture signal generated from the high-frequency components has a wide amplitude and the color signal suppressing circuit operates to eliminate moiré produced due to the high-frequency components.

Accordingly, a camera control unit 13 which comprises the color signal suppressing circuit utilizing the digital technique as described above has improved resolution since it is unnecessary to eliminate the moiré by using the optical low pass filter or slightly blurring the image as in the conventional TV system for endoscopes. Consequently, the camera control unit 13 makes it possible not only to provide an image which is not inferior in contrast to the image obtained by the conventional analog TV system for endoscopes but also enhances the S/N ratio and reduces noise owing to the digital circuits. Though this color signal suppressing circuit can be composed of conventional analog circuits, the color suppressing circuit operates more stably when it uses digital circuits for processing the digital signals.

Since frequencies which can be resolved by a fiber scope are determined dependently on an arrangement pitch of the fibers in the image guide fiber bundle used as the image transmission system, it is meaningless to improve the resolution of the solid-state image pickup device so as to be higher than the resolution of the image guide fiber bundle. With the rigid endoscope which uses the relay lens system as the image transmission system, however, enhancement of the resolution of the solid-state image pickup device directly results in improvement of quality of the images formed by the endoscopes. In the TV system for endoscopes described above, it is therefore possible to obtain images of very high quality when the endoscope is selected and images of quality equal to that of the images obtained by the conventional TV system for endoscopes when the fiber scope is used, thereby making it possible to compose a TV system for endoscopes featuring higher accuracy which permits performing the above-described surgical operation more accurately and more speedily.

When the image guide fiber bundle is used as the image transmission system as in the case of the fiber scope, however, an object to be photographed by a TV camera is an end surface of emergence of the image guide fiber bundle which consists of cores 2a and claddings 2b as illustrated in FIG. 12A and FIG. 12B, whereby a difference in brightness is clearly produced between the images of the cores 2a and the clads 2b as shown in FIG. 12C and FIG. 12D in practical use of the TV system for endoscopes, and the image of the end surface contains a large number of high-frequency components.

Accordingly, the aperture signal has a very high intensity and the color signal suppressing circuit adjusts the electrical signal providing the color information to lower an output intensity thereof. For this reason, the images obtained by the fiber scope become images on which colors are faded on the TV monitor.

When the images are picked up by a single-plate type solid-state image pickup device having a color encoding filter which is disposed on a light receiving surface, and has color filters of G (green), C (cyanogen), Mg (magenta) and Y (yellow) arranged in a lattice pattern thereon (FIG. 13), sampling points are formed at ($\frac{1}{2}$Px, 0), ($\frac{1}{2}$Py, 0), ($\frac{1}{2}$Px, $\frac{1}{2}$Py), ($-\frac{1}{2}$Px, $-\frac{1}{2}$Py), ($\frac{1}{2}$Px, $-\frac{1}{2}$Py) and ($-\frac{1}{2}$Px, $\frac{1}{2}$Py), wherein the reference symbols Px and Py represent the pitch of picture elements of the filter, with respect to the horizontal scanning direction and to the vertical scanning direction, respectively, on a coordinates system on the two-dimensional spatial frequency plane illustrated in FIG. 14. When an image of the end surface of emergence of the image guide fiber bundle in which optical fibers are arranged densely in six directions as described above is picked up by using these filters, a frequency spectrum fF of the first order, contained in the image, exists in the vicinity of the sampling point as shown in FIG. 5, intense moiré is produced in this vicinity. In FIG. 15, the frequency spectrum is illustrated as that having certain width on an assumption that the imaging lens system is a zoom lens system.

In order to eliminate the moiré, the intensity of the frequency spectrum fF which exists in the vicinities of the sampling points is conventionally attenuated by using a large number of birefringent plates as it is disclosed by Japanese Patent Preliminary Publication No. Hei 1-284225.

In recent years where picture elements are disposed at higher densities in solid-state image pickup devices, a Serious problem is posed by moiré which is produced by the color sub-carrier frequency. Each of the NTSC, PAL and SECAM systems adopt a composite signal output system which outputs the luminance signal and the color difference signal at the same time. In an NTSC system, for example, signals to be output for a single scanning line on the TV monitor have a waveform illustrated in FIG. 16A. The TV monitor judges a color phase from a phase difference between a color burst signal (signal frequency 3.58 MHz) and the color difference signal (color sub-carrier frequency 3.58 MHz), and chroma from an amplitude of the color difference signal. When the luminance signal contains components which have frequencies in the vicinities of 3.58 MHz, or nearly equal to the color sub-carrier frequency of the color difference signal (see FIG. 16B), the TV system may regard these components as the color difference signals and allow colors different from those on an original image to be displayed on the TV monitor. FIG. 17 illustrates the color sub-carrier frequency represented on a two-dimensional frequency plane.

In the conventional TV system for endoscopes wherein picture elements are arranged coarsely in the solid-state image pickup device and the sampling point has a frequency close to the color sub-carrier frequency, the frequency spectrum of the optical fibers existing in the vicinity of the color sub-carrier frequency can be attenuated by using an optical low pass filter which lowers the intensity of the frequency spectrum of the optical fibers existing in the vicinity of the sampling point.

When an image formed by a fiber scope is picked up by using a solid-state image pickup device in which picture elements are arranged densely, however, moiré is produced on the picked up image due to interference between the intense frequency spectrum fF contained in the image of the end surface of the image guide fiber bundle and the color sub-carrier frequency. In this case, the conventional optical low pass filter described above poses a problem in that it cannot sufficiently attenuate the intensity of the frequency spectrum fF existing in the vicinity of the color sub-carrier frequency, thereby being incapable of preventing moiré from being produced.

Further, the TV system for endoscopes which permits connecting the fiber scope 1 and the rigid endoscope 3 selectively as illustrated in FIG. 1 and 2 poses a problem in that the resolution is degraded when the rigid endoscope is used since this TV system usually comprises an optical low pass filter for the fiber scope and images formed by the rigid endoscope must be picked up through this optical low pass filter.

More recently, on the other hand, there has been proposed a camera control unit which allows, when an image of an object containing frequency components exceeding the color sub-carrier frequency causing moiré is picked up, the color signal suppressing circuit functions in accordance with a value of an amplitude of the aperture signal generated from the high-frequency components so that a color output corresponding to the high-frequency components is lowered making color moiré less noticeable. When an image of the end surface of emergence of the image guide fiber bundle shown in FIG. 6 and FIG. 7 is picked up by using this camera control unit, however, there is a problem in that the aperture signal has a high intensity due to a very large number of high-frequency components contained in the image, whereby the color signal suppressing circuit functions to lower the output intensity of the color information signal as if a non-chromatic image were picked up and a sharp image cannot be obtained.

SUMMARY OF THE INVENTION

A primary object of the present invention is to provide a TV system for endoscopes which can prevent non-chromatic images or images affected by moiré from being reproduced when a fiber scope is used, and allows images to be obtained which have a high resolution and contrast when a rigid endoscope is used.

The TV system for endoscopes according to the present invention is configured to selectively permit the use of an image guide optical fiber bundle and a relay lens system as an image transmission system of endoscopes, allows images obtained with an endoscope to be reimaged onto solid-state image pickup devices by an imaging lens system, converts electrical signals output from the solid-state image pickup device into TV signals in a camera control unit, and projects the output TV signals onto a TV monitor as images formed by the endoscope; and is characterized in that the camera control unit in particular comprises an electrical circuit having a suppressing characteristic for the color difference signal outputs which is controlled in accordance with the selection of the image transmission system, and set in accordance with a frequency spectrum produced due to fixed pattern and luminance of an image guide fiber bundle as well as a means for switching the suppressing characteristic for the color difference signal outputs dependently on a selected image transmission system.

In the TV system for endoscopes according to the present invention, the suppressing characteristic for the color difference signal outputs is adjusted so as to satisfy the following condition:

$fc < fc'$ and $fc' \geq fF$ when $fF$ is larger or equal than or to $fc$ wherein the reference symbol $fc$ represents a lowest spatial frequency when the color difference signal output has an intensity of 50% or lower in a condition where the relay lens system is selected as the image transmission system, the reference symbol $fc'$ designates a highest spatial frequency when the color difference signal output has an intensity of 50% or higher in a condition where the image fiber bundle is selected as the image transmission system, and the reference symbol $fF$ denotes a frequency spectrum produced by the fixed pattern of the image guide fiber bundle.

Further, the TV system for endoscopes according to the present invention is configured so as to permit selectively using an image guide fiber bundle and a relay lens system as an image transmission system of endoscopes, allows images obtained with an endoscope to be reimaged onto a solid-state image pickup device by an imaging lens system, converts electrical signals output from the solid-state image pickup device into TV signals in a camera control unit, and projects the output TV signals onto a TV monitor as images formed by the endoscope; and is characterized in that the camera control unit especially comprises an electrical circuit for controlling a suppressing characteristic of color difference signal outputs in accordance with spatial frequencies contained in the images to be picked up, and an optical low pass filter for a rigid endoscope and another optical low pass filter for a fiber scope which have cut-off frequencies different from each other so that the optical low pass filters can be selected in accordance with a selection of the image guide fiber bundle or the relay lens system as the image transmission system.

The TV system for endoscopes according to the present invention is configured so as to satisfy the following condition:

$fL \leq fF$ when $fF$ is larger or equal than or to $fc$.

wherein the reference symbol $fc$ represents a lowest spatial frequency when the color difference signal output produced by the suppressing characteristics has an intensity of 50% or lower, the reference symbol $fF$ designates the frequency spectrum produced due to the fixed pattern in an image of an end surface of emergence of the image guide fiber bundle, and the reference symbol $fL$ denotes a cut-off frequency of the optical low pass filter for the fiber scope.

The TV system for endoscopes according to the present invention is configured so as to reimage an image appearing on the end surface of emergence of the image guide fiber bundle onto the solid-state image pickup device and allows the image to be observable on a TV monitor; and is characterized especially in that the TV system comprises, in an imaging optical path, a first optical element which has an optical characteristic for sufficiently attenuating a frequency spectrum inherent in an image of the image guide fiber bundle existing in the vicinity of the color sub-carrier frequency and another optical characteristic for sufficiently attenuating another frequency spectrum inherent in the image guide fiber bundle existing in the vicinity of the sampling frequency of the solid-state image pickup device.

The TV system for endoscopes according to the present invention is configured so as to be connectable to at least a fiber scope using an image guide fiber bundle and a rigid endoscope using a relay lens system, reimaging an image formed by either of the fiber scope and the rigid endoscope onto a solid-state image pickup device and convert electrical signals output from the solid-state image pickup device into TV signals by the camera control unit so as to reproduce the image on a TV monitor; and using an imaging optical path, dependently on one of the image transmission systems, an optical element having an optical characteristic for sufficiently attenuating response of the solid-state image pickup device to frequency of the sampling point or another optical element which has an optical characteristic for sufficiently attenuating a frequency spectrum inherent in the image guide fiber bundle existing in the vicinity of the color sub-carrier frequency and an additional optical characteristic for sufficiently attenuating a frequency spectrum inherent in the image guide fiber bundle existing in the vicinity of the sampling frequency of the solid-state image pickup device.

The TV system for endoscopes according to the present invention is configured so as to reimage, onto a solid-state image pickup device, an image formed by an endoscope and appearing on an end surface of emergence of an image guide fiber bundle and provides electrical signals output from the solid-state image pickup device after converting these signals into composite TV signals for reproducing the image formed by the endoscope; and is characterized in that the TV system comprises an electrical means which selects only signals existing in the vicinities of the color sub-carrier frequency out of luminance signals of the composite TV signals and lowers the selected signals.

The TV system for endoscopes according to the present invention is configured so as to reimage, onto a solid-state image pickup device, an image which is formed by an endoscope and appears on an end surface of emergence of an image guide fiber bundle, and provides electrical signals output from the solid-state image pickup device into at least composite TV signals; and is characterized in that the TV system comprises an electrical means for switching the composite TV signals into component TV signals when a frequency spectrum inherent in an image of the image guide fiber bundle exists in the vicinity of the color sub-carrier frequency.

The TV system for endoscopes according to the present invention is configured so as to reimage, onto a solid-state image pickup device, an image appearing on an end surface of emergence of image guide fiber bundle in which optical fibers are arranged densely in six directions, provides electrical signals output from the solid-state image pickup devices after the electrical signals are converted into composite TV signals; and is characterized in that an arrangement direction of optical fibers in the image guide fiber bundle is set at approximately 30° relative to the horizontal scanning direction on the solid-state image pickup device when a frequency spectrum inherent in an image of the image guide fiber bundle exists in the vicinity of the color sub-carrier frequency of the composite TV signals.

The TV system for endoscopes according to the present invention is configured so as to be connectable to at least a fiber scope using an image guide fiber bundle and a rigid endoscope using a relay lens system, and reimage, onto a solid-state image pickup device, an image formed by either of the fiber scope and the rigid endoscope, and provides electrical signals output from the solid-state image pickup device after converting these signals into TV signals in a camera control unit for reproducing the image on a TV monitor; and is characterized in that the camera control unit comprises an electrical circuit which outputs the color difference signals after controlling a level of these signals in accordance with spatial frequency components contained in the image and a switching means for allowing the electrical circuits to function selectively in accordance with characteristics of the image transmission systems.

This and other objects as well as the features and the advantages of the present invention will become apparent from the following detailed description of the preferred embodiments when taken in conjunction with the accompanying drawings.

BRIEF DESCRIPTION OF THE DRAWINGS

FIG. 12A and FIG. 12B are diagrams illustrating fixed patterns of image guide fiber bundles different from each other;

FIG. 12C and FIG. 12D are diagrams illustrating images of fixed patterns having a bright-dark difference on the end surface of emergences of the image guide fiber bundles shown in FIG. 12A and FIG. 12B respectively;

FIG. 13 is a diagram illustrating a configuration of a color filter;

FIG. 59A is a diagram illustrating an example of a configuration of the sixth embodiment which is to be combined with the rigid endoscope;

FIG. 59B is a diagram illustrating an example of a configuration of the sixth embodiment of the present invention to be combined with the fiber scope;

DESCRIPTION OF THE PREFERRED EMBODIMENTS

Figure 10A:
FIG. 10A and FIG. 10B and FIG. 10C are diagrams descriptive of generation of the aperture signals.
Figure 10B:
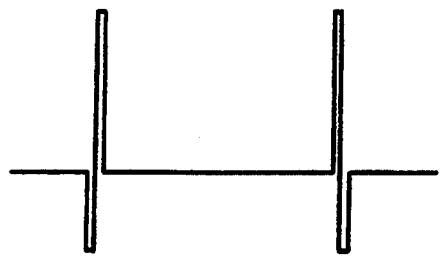
Figure 10C:
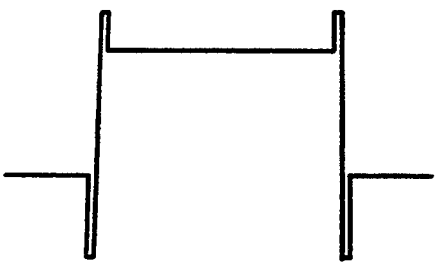
Figure 11A:
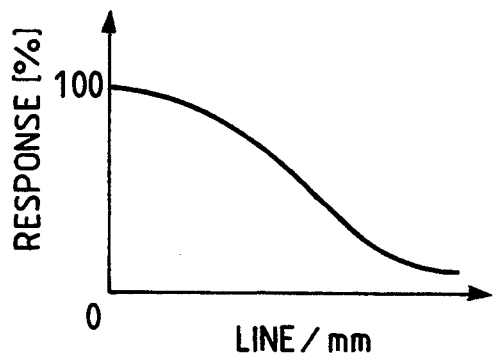
FIG. 11A and FIG. 11B show graphs illustrating apparent response characteristics at spatial frequencies before the aperture signals are overlapped and after the aperture signals are overlapped respectively.
Figure 11B:
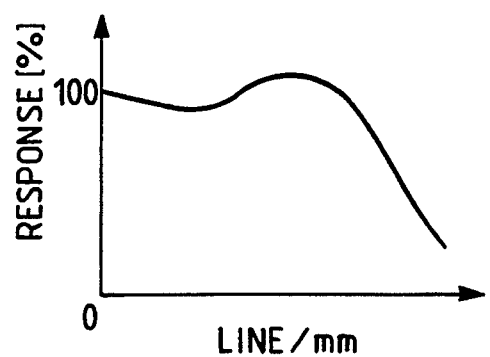
Figure 14:
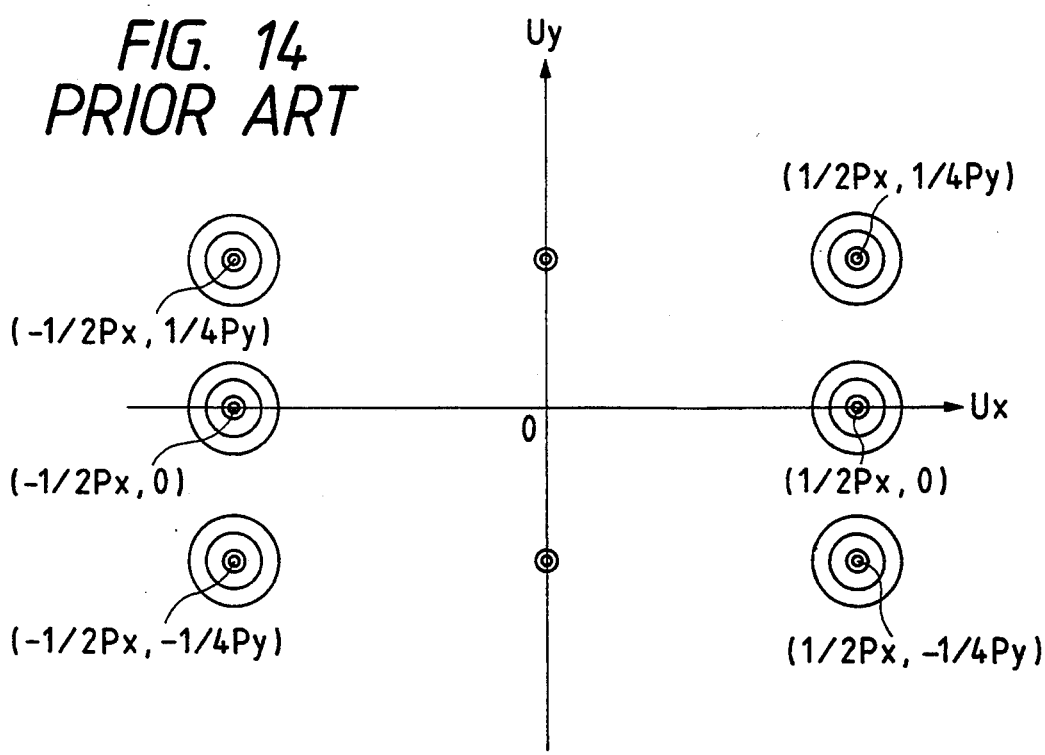
FIG. 14 is a diagram illustrating a frequency characteristic of video signals output from a solid-state image pickup device through the color filter shown in FIG. 13.
Figure 15:
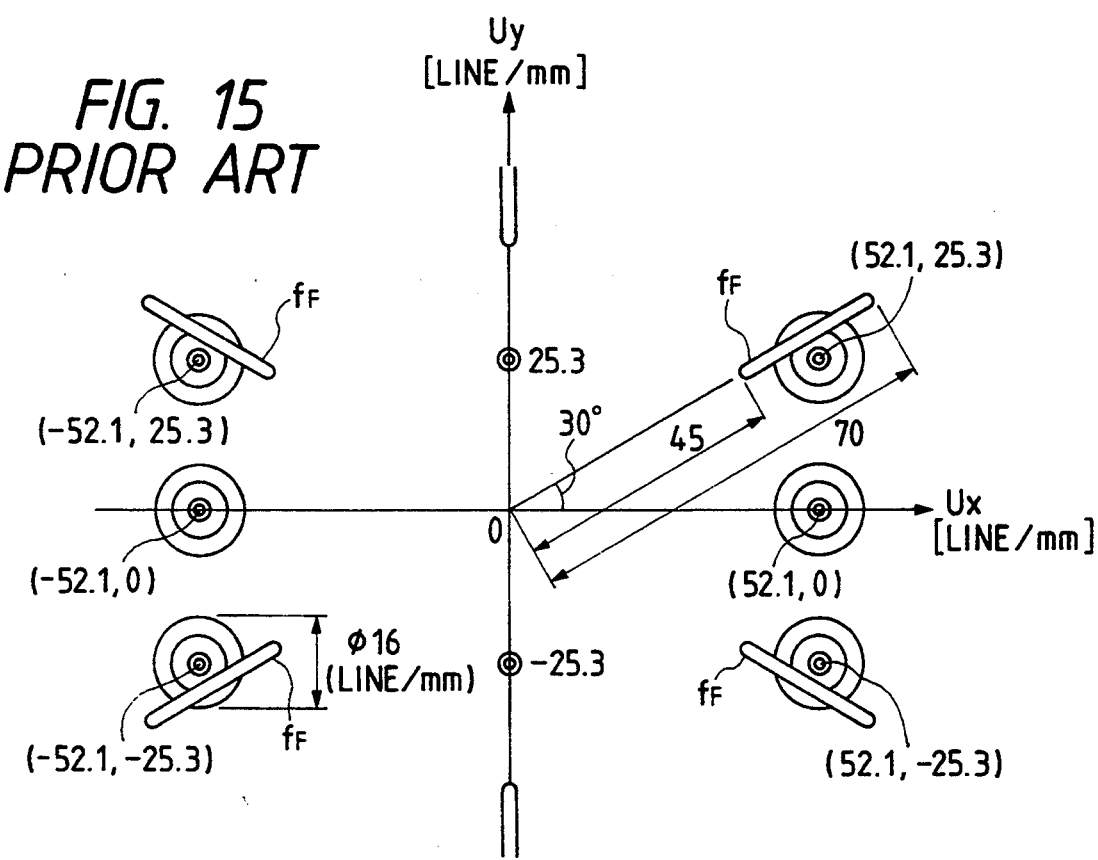
FIG. 15 is a diagram illustrating a frequency characteristic of video signals obtained by picking up an image of the end surface of emergence shown in FIG. 7 with a solid-state image pickup device using the color filter shown in FIG. 13.

Prior to a description of the embodiments of the TV system for endoscopes according to the present invention, the principle of this TV system for endoscopes will be explained below:

When a camera control unit which comprises electrical circuits including a color signal suppressing circuit is used for obtaining images which are free from moiré and has high resolution, it is sufficient, for preventing the discoloring phenomenon from being produced when a fiber scope is used and obtaining images of a quality on the order of that of the images available with the conventional TV systems for endoscopes, to change an absolute value of amplitude of the edge emphasizing signal as shown in FIG. 10C (aperture signal) by using an electrical and optical means selectively between a condition where the TV system for endoscopes is connected to a rigid endoscope and another condition where the TV system is connected to a fiber scope. For this purpose, it is sufficient to configure the electrical means so as to be capable of selecting frequency characteristics of the aperture signal in accordance with endoscopes combined with the TV system. Alternatively, it is sufficient to configure the optical means so as to be capable of exchanging optical low pass filters in accordance with characteristics of the endoscopes using image transmission systems different from one another.

Description will now be made of the electrical means.

Figure 18A:
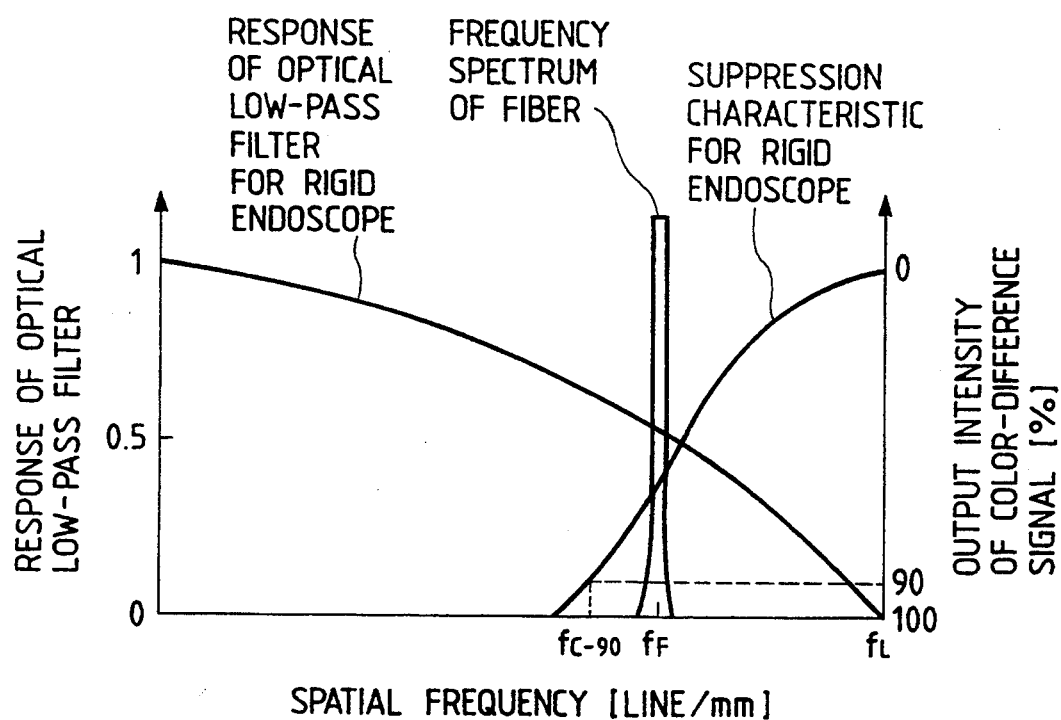
FIG. 18A shows a graph illustrating a principle descriptive of the relationship between a spatial frequency component in an image and the suppressing characteristic for the color sub-carrier signal output as well as relationship between the spatial frequency component and response of the optical low pass filter in case of $fF \geq f_{c-90}$ obtained by using the rigid endoscope in the TV system for endoscopes according to the present invention equipped with the electrical switching means.
Figure 18B:
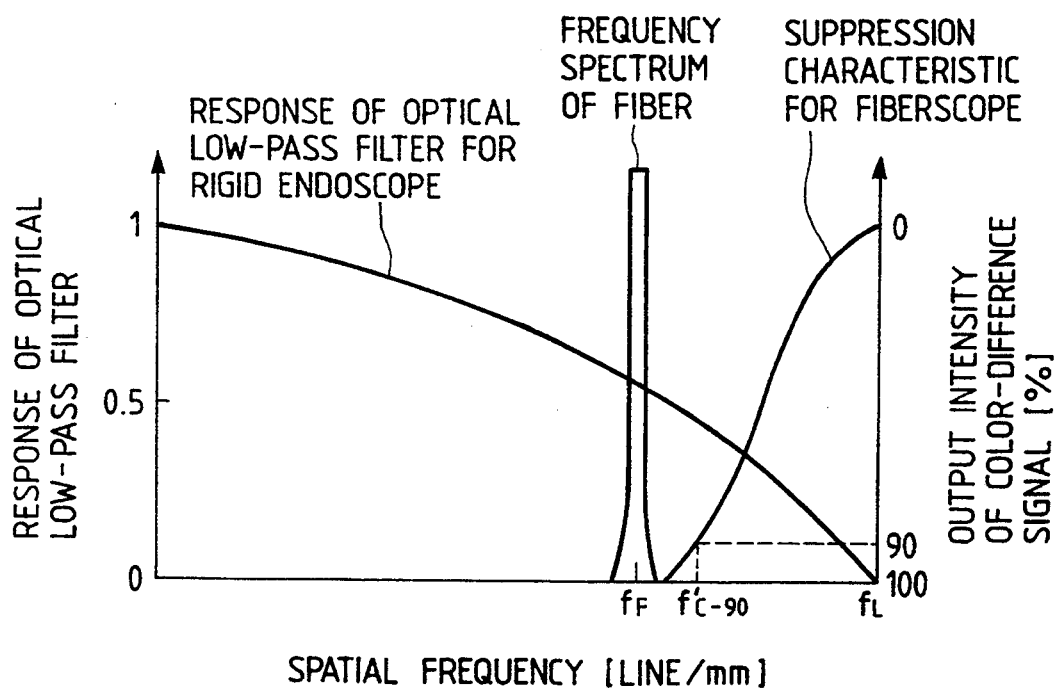
FIG. 18B shows a graph illustrating a principle which is similar to that shown in FIG. 18A except that it is obtained by using the fiber scope in the TV system for endoscopes according to the present invention.

FIG. 18A and FIG. 18B show graphs illustrating principles of relationship between the spatial frequency component contained in an image obtained by equipping the TV system with the electrical switching means and a suppressing characteristic of the color difference signal output provided from the camera control unit, and the relationship between the spatial frequency component and response of the optical low pass filter.

In the electrical circuits arranged in the camera control unit of the TV system for endoscopes according to the present invention, the color difference signal is progressively suppressed as the spatial frequency becomes higher. The suppressing characteristic for the spatial frequency is changed in such a manner that the characteristic is varied along the curve shown in FIG. 18A when the rigid endoscope is selected or along the curves shown in FIG. 18B when the fiber scope is selected.

Further, the TV system for endoscopes according to the present invention uses an optical low pass filter for the rigid endoscope and the optical low pass filter is used also for the fiber scope. Therefore, an image of an end surface of emergence of the fiber scope contains a frequency spectrum fF produced by the fixed pattern as illustrated in FIG. 12B and FIG. 12C when the image is photographed by a TV camera.

Since the TV system for endoscopes according to the present invention is configured as described above, moiré partially produced on an image formed by a rigid endoscope using an ordinary lens system as the image transmission system is eliminated electrically and a cut-off frequency fL of the optical low pass filter can be set at a level higher than the conventionally used cut-off frequency, thereby enabling an enhanced resolution.

Figure 9:
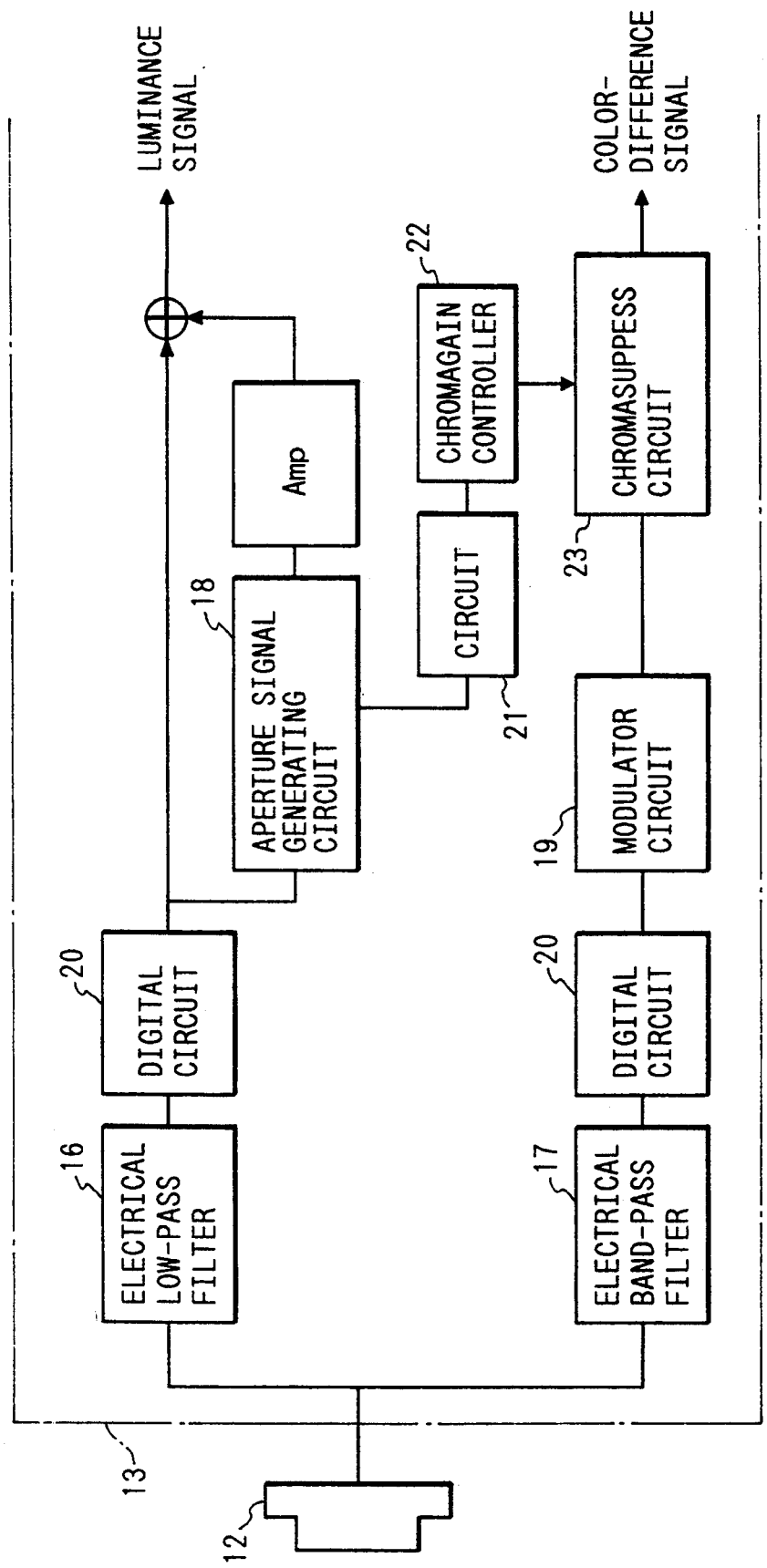
FIG. 9 is a block diagram of a TV signal generating circuit wherein a digital circuit and a signal suppressing circuit are added to the TV signal generating circuit shown in FIG. 8.

Furthermore, since digital circuits are used in the camera control unit as shown in FIG. 9, S/N ratios are high with less noise and the enhancing effect can be utilized sufficiently, thereby making it possible to obtain images formed by endoscopes without degrading the image contrast.

Now, description will be made of the TV system for endoscopes when the fiber scope is selected therein.

When an end surface of emergence of an image guide fiber bundle comprising optical fibers densely arranged in six directions is photographed, the image contains frequencies including an intense frequency spectrum $fF = 1/(Pf\beta \times \sin 60°)$. The reference symbol Pf represents a pitch of images of the optical fibers and the reference symbol B designates a magnification of the imaging optical system.

When an end surface of emergence of an image guide fiber bundle comprising optical fibers arranged at random therein is photographed by the TV camera, the frequency spectrum fF produced due to the fixed pattern thereof is expressed as $fF=1/(Pf'\times\beta)$. The reference symbol Pf' represents an average pitch of the optical fibers arranged at random.

Since the suppressing characteristic for the color difference signal output for the rigid endoscope is selected in the electrical circuit arranged in the camera control unit, a characteristic curve of the output intensity intersects with the frequency spectrum fF produced due to the fixed pattern on the end surface of emergence of the image guide fiber bundle as illustrated in FIG. 18A. When the lowest frequency for the color difference signal output which is controlled to 90% or lower by adjusting the suppressing characteristic is represented by $f_{c-90}$ as shown in FIG. 18A, the output intensity of the color difference signal at the spatial frequency fF is 90% or lower and exhibits the following characteristic:

$fF \geq f_{c-90}$

Consequently, the color difference signal is suppressed and the image is discolored or becomes whitish. The phenomenon that the image is regarded as a nearly monochromatic image by observers at the output intensity of 90% or lower has been experimentally confirmed.

For this reason, when the fiber scope is to be selected in the TV system for endoscopes, the suppressing characteristic (chroma response characteristic) is varied as shown in FIG. 18B so that the highest frequency $f'_{c-90}$ at a color difference signal output of 90% or higher satisfies the following condition:

$fF \leq f'_{c-90}$

By varying the suppressing characteristic as described above, it is possible to enhance the color difference signal output to 90% or higher at the spatial frequency fF to prevent the defect to discolor the image or making it whitish when the fiber scope is selected.

Figure 19A:
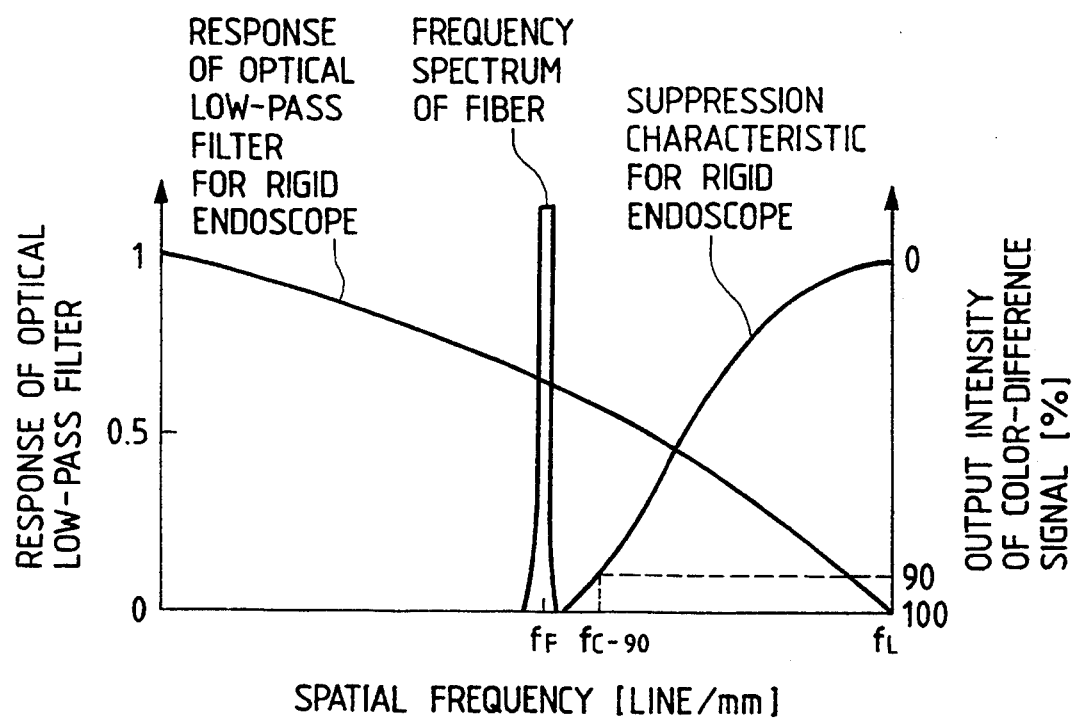
FIG. 19A shows a graph illustrating a principle which is similar to that shown in FIG. 18A except that it is obtained in the case of $fF < f_{c-90}$
Figure 19B:
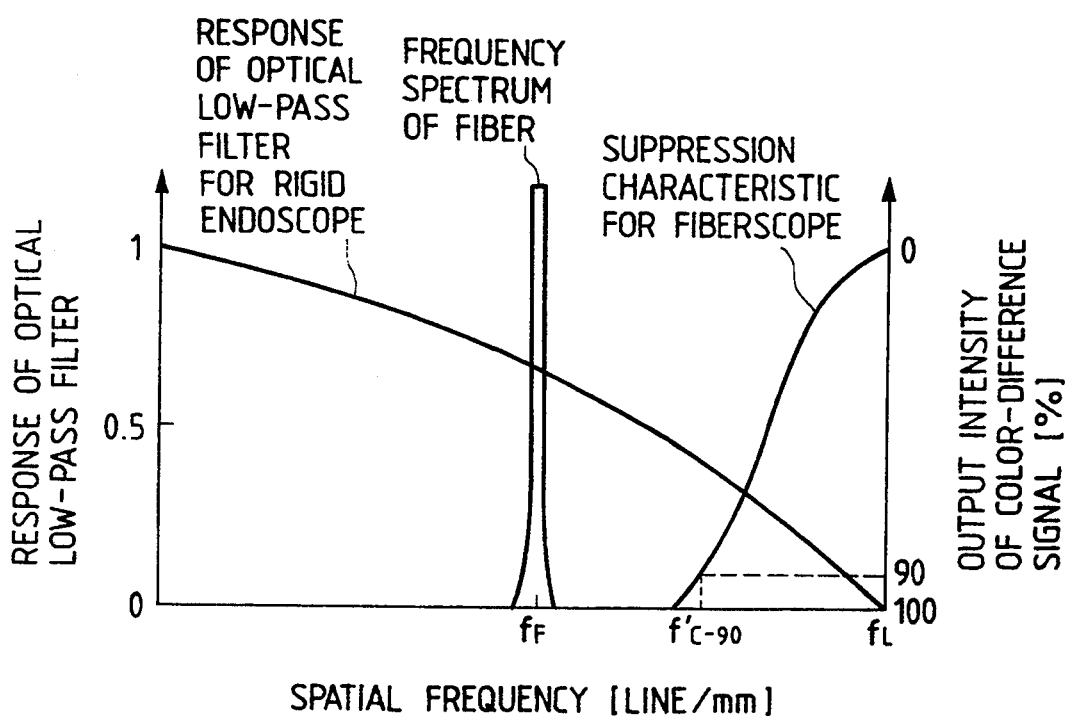
FIG. 19B shows a graph illustrating a principle which is similar to that shown in FIG. 18B except that it is obtained in the case of $fF < f_{c-90}$

In a case where a condition of $fF \leq f'_{c-90}$ has been already satisfied when the rigid endoscope is selected as shown in FIG. 19A, an image is not made monochromatic by switching the rigid endoscope to the fiber scope without changing the suppressing characteristic. When it is desired to switch the rigid endoscope to the fiber scope for obtaining more accurate color reproducibility at the spatial frequency fF, however, it is allowed to enhance the level of the color difference signal output as shown in FIG. 19B, as in the case of FIG. 18B, so as to obtain the following relationship:

$f_{c-90} < f'_{c-90}$

When the intensity of the color difference signal output is suppressed to 90% or lower, an image is discolored or becomes whitish, but experiments have already indicated that problems for practical use are posed by the color difference signal output which is lowered to a limit of 50%. In cases where sharpness of visual fields is degraded by the discoloring phenomenon, or moiré within a range where output intensities of the color difference signals are 90% to 50%, it is possible to obtain images of a quality on the order of that of the conventional images by defocusing images projected onto the solid-state image pickup device.

Accordingly, output intensities of the color difference signals pose no problems for practical use so far as the intensities are at least 50%.

The optical switching means will now be described.

Figure 20A:
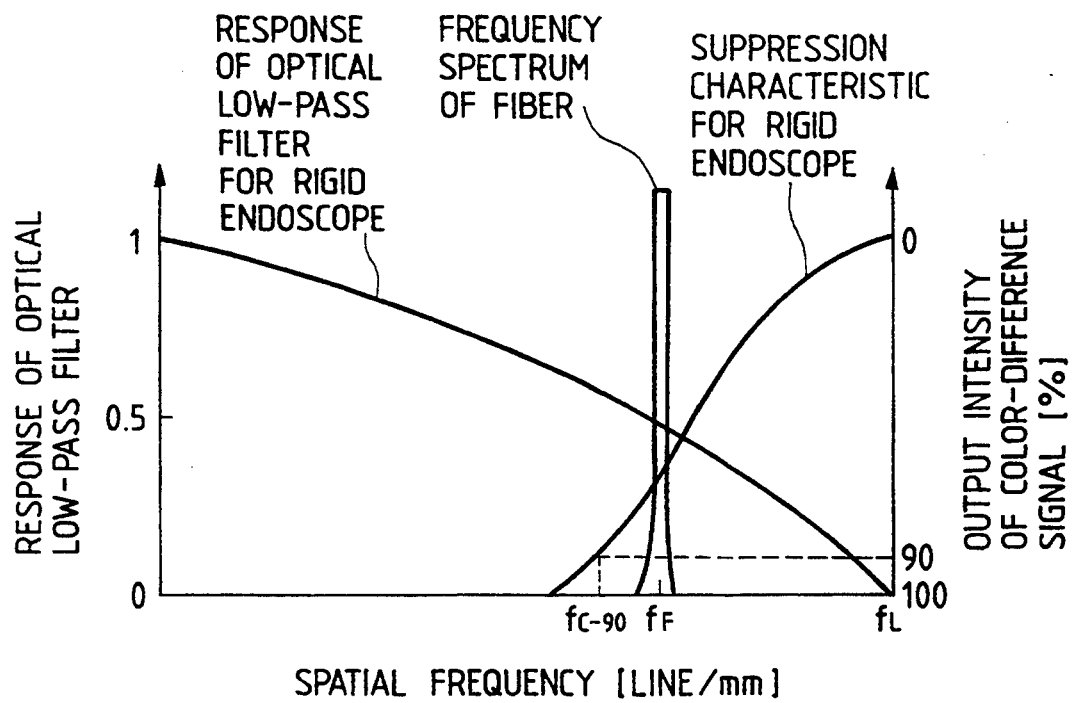
FIG. 20A shows a graph illustrating a principle which is similar to that shown in FIG. 18A except that it is obtained in the TV system for endoscopes according to the present invention equipped with the optical switching means.
Figure 20B:
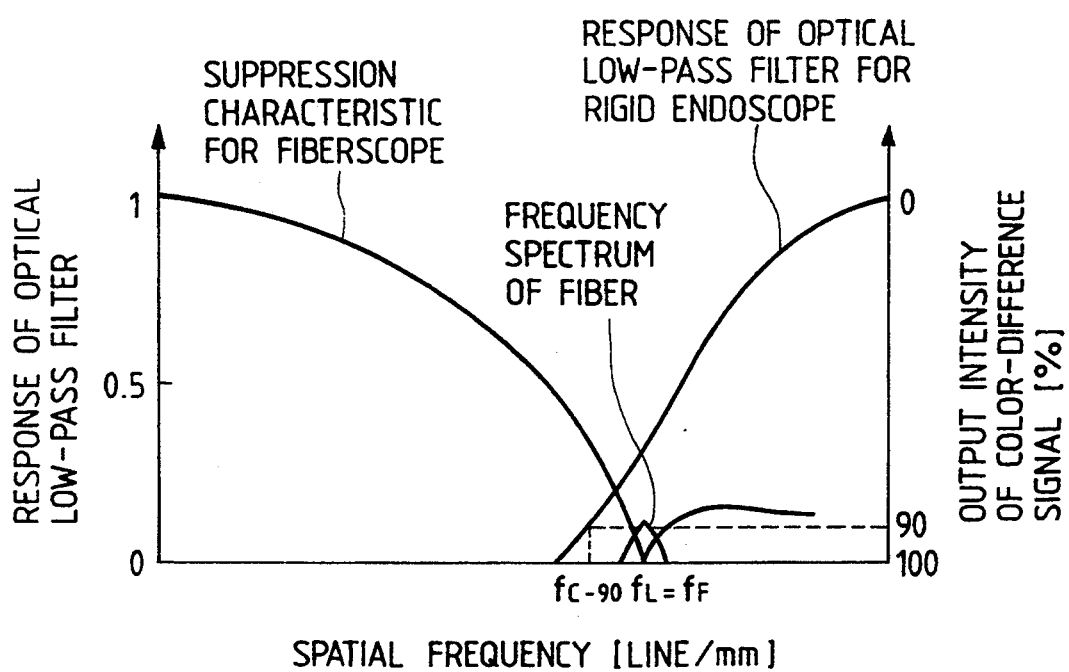
FIG. 20B shows a graph illustrating a principle which is similar to that shown in FIG. 18B except that it is obtained in the TV system for endoscopes according to the present invention equipped with the optical switching means.

FIG. 20A and FIG. 20B show graphs illustrating principles of the relationship between the spatial frequency component contained in an image and the suppressing-characteristic (chroma response characteristic) for the color difference signal output from the camera control unit, and the relationship between the spatial frequency and response of-the optical low pass filter respectively. In this case also, the electrical circuit includes the color signal suppressing circuit which has a characteristic to suppress the color difference signal as the spatial frequency component has a higher frequency, and the suppressing characteristic for the color difference signal is optimum for the rigid endoscope. This suppressing characteristic is not changed even when the rigid endoscope is selected.

Further, two optical low pass filters are prepared for the rigid endoscope and the fiber scope respectively. These optical low pass filters are different in response thereof and have cut-off frequencies different from each other as described later. These optical low pass filters are switched from one to the other dependent upon whether the relay lens system or the image guide fiber bundle is selected as an image transmission system.

As already described above with reference to FIG. 18A and FIG. 18B, the optical low pass filter for the rigid endoscope has a cut-off frequency which is set higher than the conventional cut-off frequency so as to permit an enhanced resolution. Further, since the S/N ratio is high with less noise and the enhancing effect can be utilized sufficiently owing to the digital circuits used in the camera control unit, the TV system for endoscopes provides images which are formed by the endoscope and are not inferior in contrast thereof.

Since the camera control unit comprises the color signal suppressing circuit, an image of the end surface of emergence of the image guide fiber bundle which is photographed after switching the rigid endoscope to the fiber scope contains the intense frequency spectrum fF produced due to the fixed pattern on the image guide fiber bundle. The suppressing characteristic of the color signal suppressing circuit is set for the rigid endoscope. Let us represent the lowest spatial frequency for the color difference signal output having an intensity of 90% or higher by $f_{c-90}$. In a case of $fF \geq f_{c-90}$ as shown in FIG. 20A, an output intensity of the color difference signal output corresponding an aperture signal generated at the frequency of fF is approximately 90% or lower when the optical low pass filter for the rigid endoscope is used. Consequently, the image is discolored or whitish.

In the TV system for endoscopes according to the present invention, the optical low pass filter for the fiber scope is configured so as to have a characteristic to assure cut-off frequency fL lower or equal than or to fF even in the case of $fF \geq f_{c-90}$. Therefore, the TV system for endoscopes according to the present invention permits quickly switching the optical low pass filter for the rigid endoscope to the optical low pass filter for the fiber scope as soon as the rigid endoscope is switched to the fiber scope. Since the white-black edges of the cores 2a and claddings 2b shown in FIG. 12B and FIG. 12C are blurred by switching the optical low pass filters, the intensity of the frequency spectrum is lowered and the edges can be processed nearly in the same manner as that for the frequency component contained in the image formed by the rigid endoscope. That is to say, fF is not resolved since the frequency fF of the mesh-like pattern inherent in an image of the fiber scope formed on the image surface is almost overlapped with the cut-off frequency fF in FIG. 20B wherein the color difference signal output has an intensity of 90% at fF. Consequently, an unwanted aperture signal is not generated, whereby the image is not discolored and resolved at a degree similar to that of the image obtained by the conventional TV system for endoscopes.

In this case also, problems for practical use are posed only when the intensity of the color difference signal output is lowered to the limit of approximately 50%, or the color difference signal output of 50% or higher is sufficient for practical use. When sharpness of the visual field is degraded while the output intensity is kept within a range from 90% to 50%, it is possible, needless to say, to resume an image quality equal to that obtained by the conventional TV system for endoscopes.

Figure 21A:
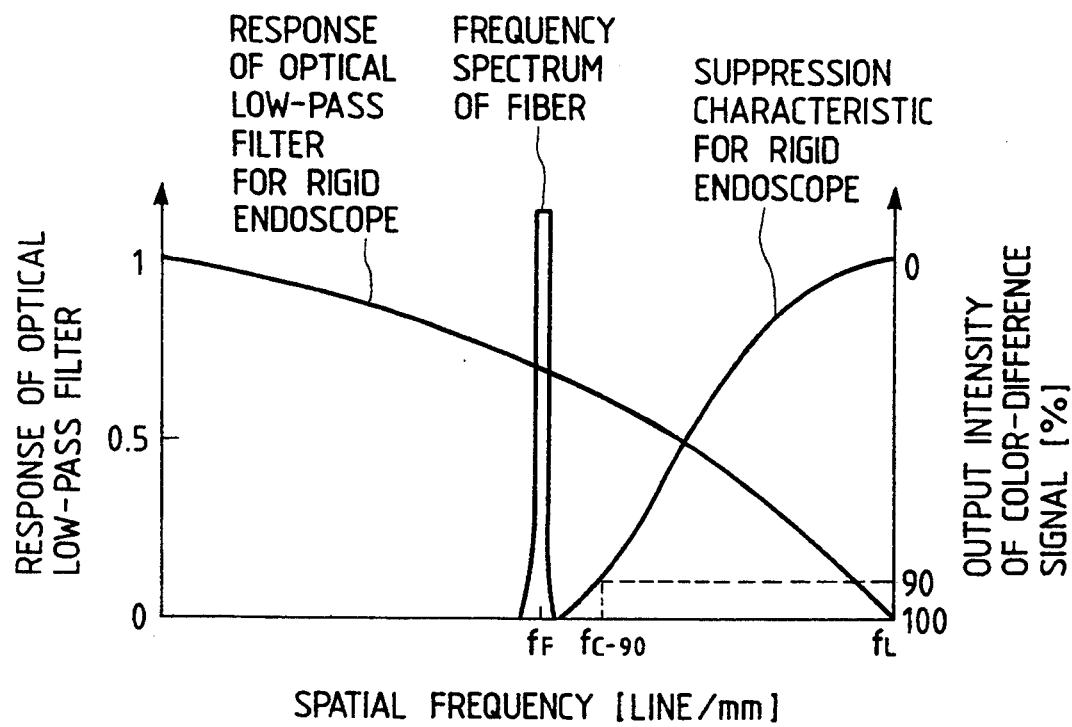
FIG. 21A shows a graph illustrating a principle which is similar to that shown in FIG. 19A except that it is obtained in the TV system for endoscopes shown in FIG. 20A.
Figure 21B:
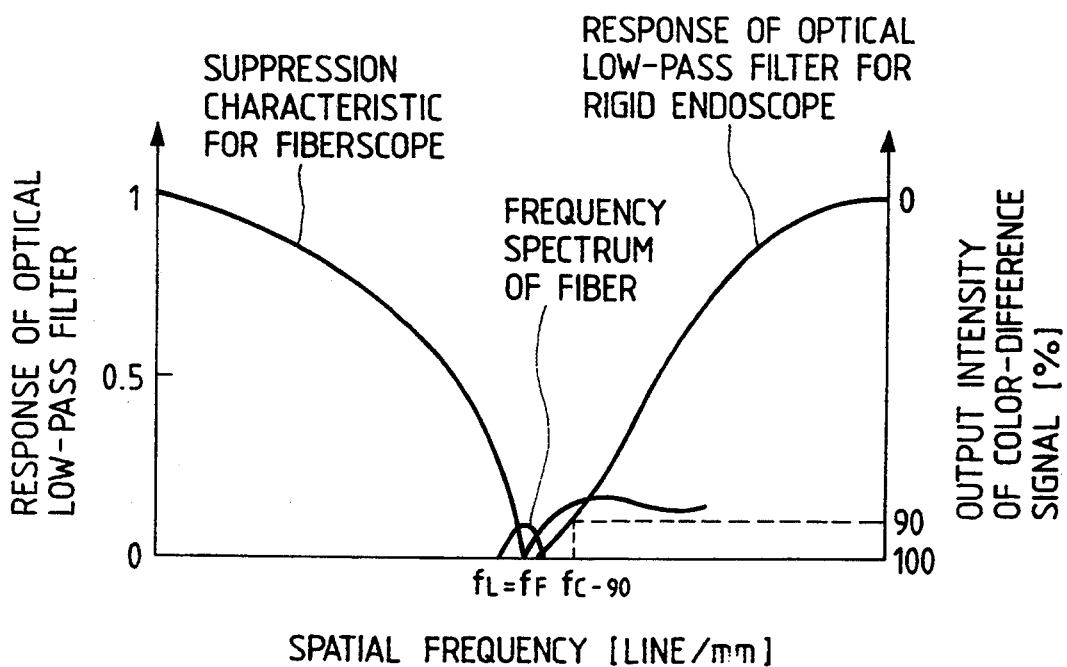
FIG. 21B shows a graph illustrating a principle which is similar to that shown in FIG. 19B except that it is obtained in the TV system for endoscopes shown in FIG. 20B.

Furthermore, when fF is lower or equal to $f_{c-90}$ in a condition where the rigid endoscope is selected as illustrated in FIG. 21B, for example, an image is not made monochromatic without switching the optical low pass filter for the rigid endoscope to the optical low pass filter for the fiber scope. In order to obtain a high accuracy of color reproducibility at the spatial frequency fF, however, the optical low pass filter for the rigid endoscope may be switched to an optical low pass filter for the fiber scope which satisfies the condition of $fL \leq fF$.

When an image of an end surface of emergence of an image guide fiber bundle comprising optical fibers densely arranged in the six directions as shown in FIG. 12A is picked up by a solid state image pickup device which outputs signals of the NTSC system and has a size of ⅔ inch, the intense frequency spectrum of the first order contained in the image has a spatial frequency of approximately 20 to 80 (lines/mm) on the image pickup surface.

When a ½ inch solid-state image pickup device, on which each picture element measures, for example $Px = 12.76$ μm in the horizontal direction and $Py = 9.86$ μm in the vertical direction, is used in the conventional TV system for endoscopes, this solid state image pickup device has sampling points in a number of 39.2 (lines/mm).

On the other hand, the color sub-carrier frequency output of the NTSC system is converted into a spatial frequency as expressed below:

3.58 MHz 29.5 (lines/mm)

That is to say, the optical low pass filter used in the conventional TV system for endoscopes has not only an effect to eliminate moiré which is produced due to interference between the spatial frequency at the sampling points and the spatial frequency of optical fibers but also another effect to eliminate to a certain degree of moiré which is produced due to an interference between the color sub-carrier frequency and the spatial frequency of the optical fibers since the sampling frequency is close to the color sub-carrier frequency.

A certain picture element measures $Px = 0.96$ μm in the horizontal direction and $Py = 9.9$ μm in the vertical direction. In this case, the Nyquist frequency limit in the horizontal direction is calculated as 52.1 (lines/mm). Accordingly, the moiré which is produced due to the interference between the color sub-carrier frequency and the frequency spectrum of the optical fibers cannot be eliminated by using the conventional optical low pass filter for eliminating the moiré produced due to the interference between the spatial frequency of the sampling points and the frequency spectrum of the optical fibers.

Figure 22:
FIG. 22 is a diagram illustrating a waveform of output from the solid-state image pickup device in a case where the first optical element is disposed in the imaging optical path in the TV system for endoscopes according to the present invention.

In the TV system for endoscopes according to the present invention which comprises, in the imaging optical path, not only an optical element for attenuating the intensity of the frequency spectrum fF existing in the vicinity of the sampling point but also another optical element for lowering the intensity of the frequency spectrum existing the vicinity of the color sub-carrier frequency of 29.5 (lines/mm), the frequency spectrum fF producing 3.58 MHz=29.5 (lines/mm) is not imaged on the solid-state image pickup device even when an image of an end surface of emergence of the image guide fiber bundle is picked up or when TV signal outputs are adjusted by functioning the color signal suppressing circuit so as to enhance the contrast of the luminance signal. In other words, since video signals output from the solid-state image pickup device have the waveform illustrated in FIG. 22, the TV system for endoscopes is capable of preventing the phenomenon that the luminance signal is regarded as the color signal on a TV monitor and providing moiré free images.

In a case where an optical low pass filter capable of sufficiently attenuating the frequency spectrum fF inherent in the image guide fiber bundle existing in the vicinity of the color sub-carrier frequency as described above is used in combination with the solid-state image pickup device having picture elements at a high density in the TV system for endoscopes connectable to both the fiber scope and the rigid endoscope, there was conventionally posed a problem that images containing components having frequencies higher and nearly equal than end to the color sub-carrier frequency are cut off by the optical low pass filter and cannot be reproduced since the optical low pass filter functions even when the rigid endoscope is selected, whereby resolution and contrast were degraded when the rigid endoscope was selected.

In the TV system for endoscopes according to the present invention, the optical low pass filters are exchanged from one to the other and the response of a selected filter is set so as to obtain an optical characteristic which is suited for a selected endoscope, i.e., to obtain an optical characteristic which sufficiently lowers the frequency spectrum fF inherent in the image guide fiber bundle existing in the vicinities of the color sub-carrier frequency and the sampling frequency when the fiber scope is used, or another optical characteristic which sufficiently lowers response to frequency components existing in the vicinities of the sampling frequency for preventing the spurious color phenomenon from being produced due to the high frequency components contained in bright spots on images, for example, of a mucous membrane in a coelomata when the rigid endoscope is selected.

Figure 23A:
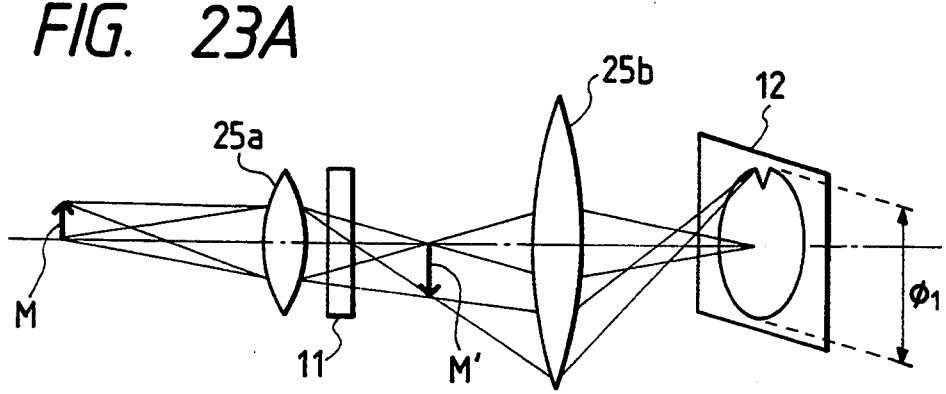
FIG. 23A is a diagram illustrating an example of an optical system of the TV system for endoscopes according to the present invention in which the fiber scope is selected.
Figure 23B:
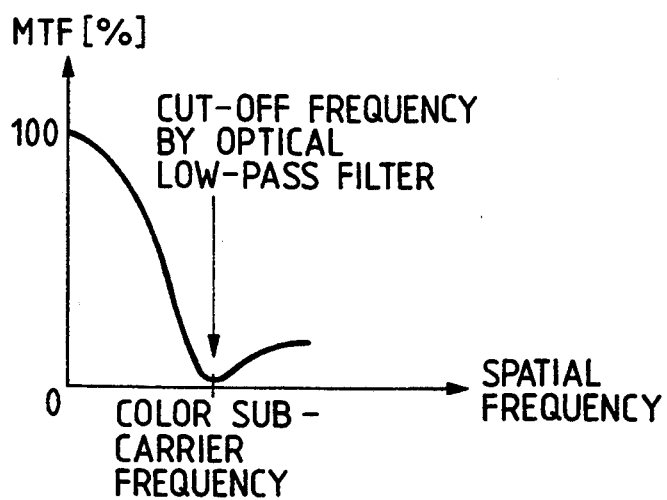
FIG. 23B is a graph illustrating the frequency characteristics of the optical system shown in FIG. 23A.
Figure 24A:
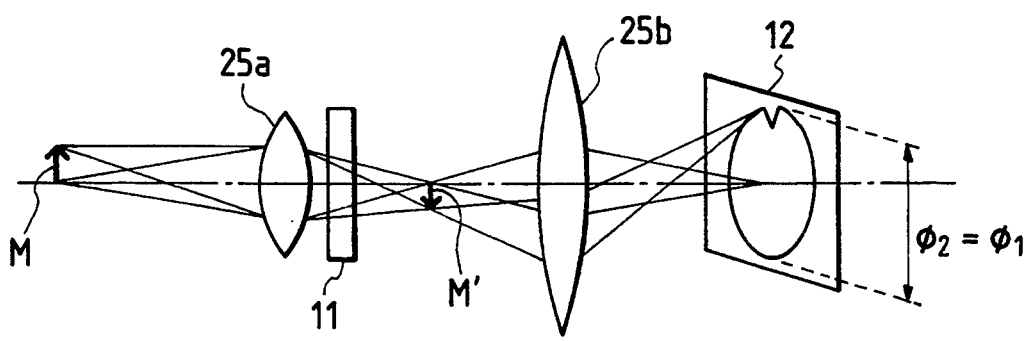
FIG. 24A shows a diagram illustrating an example of an optical system of the TV system for endoscopes according to the present invention in which the rigid endoscope is selected.
Figure 24B:
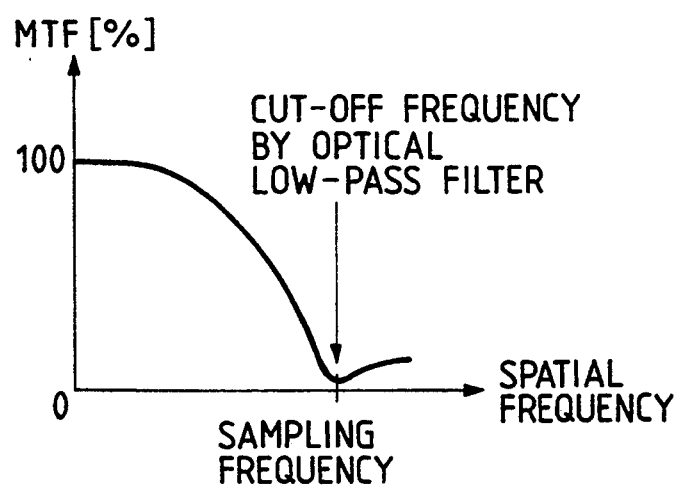
FIG. 24B is a graph illustrating a frequency characteristic of the optical system shown in FIG. 24A.

FIG. 23A and FIG. 24A exemplify an optical system having the optical performance described above. This optical system has a composition wherein a first variable magnification lens system 25a disposed on the object side and comprising an optical low pass filter 11 functions to form an intermediate image M' of an image M, and a second variable magnification lens system 25b serves for reimaging the intermediate image M' onto a solid-state image pickup device 12. FIG. 23A illustrates the optical system in a condition where it is to be used in combination with the fiber scope, whereas FIG. 24A shows the optical system in another condition where it is to be used in combination with the rigid endoscope. Since the first variable magnification lens system 25a comprises the optical low pass filter 11 as described above, frequency components contained in the intermediate image M' are varied by varying a magnification of the variable magnification lens system 25a. Accordingly, it is possible to change frequency response only without changing a size of the image M on the solid-state image pickup device by reimaging the intermediate image M' so as to have a predetermined size on the solid-state image pickup device by the second variable magnification lens system 25b, or vary the characteristic of the optical low pass filter 11.

In this case, it is possible to prevent moiré from being produced when the fiber scope is selected, and enhance resolution and contrast when the rigid endoscopes is used by selecting the optical characteristic which sufficiently attenuates the frequency spectrum fF inherent in the image guide fiber bundle existing in the vicinities of the color sub-carrier frequency and the sampling frequency when the fiber scope is used, and the optical characteristic which sufficiently lowers response in the vicinity of the sampling frequency for preventing the spurious color phenomenon from being caused due to the high-frequency components contained, for example, in the bright spots of the image of the mucous membrane when the rigid endoscope is selected.

The optical low pass filter which sufficiently attenuates the frequency spectrum fF inherent in the image guide fiber bundle existing in the vicinity of the above-mentioned color sub-carrier frequency must satisfy a condition that it has response of 40% or lower to the frequency spectrum fF contained within a region of "color sub-carrier frequency ±0.5 MHz". Further, the optical low pass filter which sufficiently attenuates the frequency spectrum fF inherent in the image guide fiber bundle existing in the vicinity of the sampling points must satisfy a condition that it has response of 40% or lower to the frequency spectrum fF contained within a region of "frequency of the sampling point ±w MHz". The reference symbol w represents a frequency region of the color difference signal.

Figure 25A:
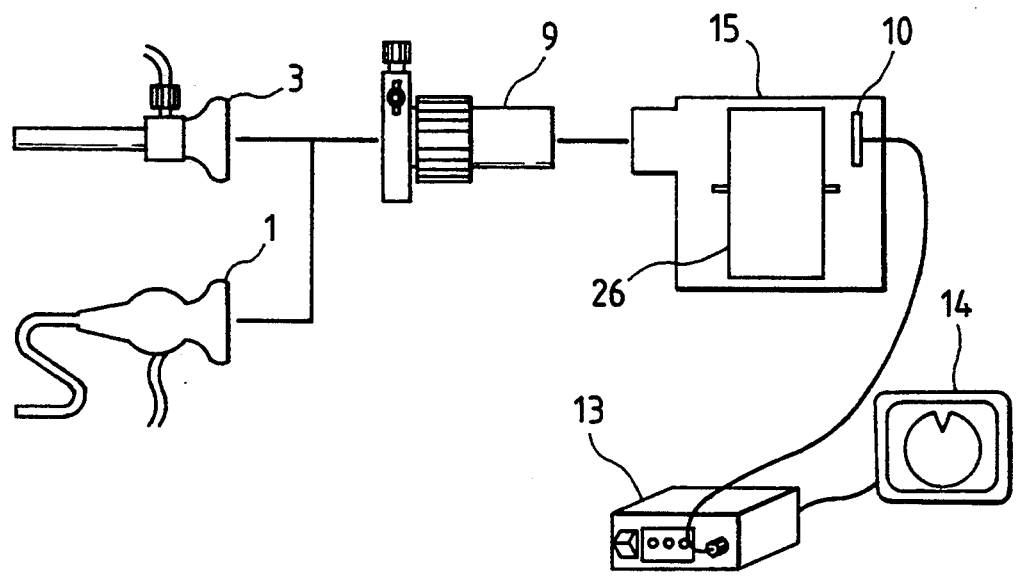
FIG. 25A and FIG. 25B are diagrams illustrating an example of a configuration of the TV system for endoscopes according to the present invention.
Figure 25B:
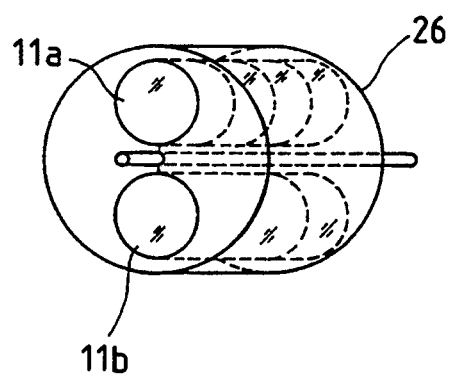

The response of the above-mentioned optical low pass filters can be changed selectively by preparing, as shown in FIG. 25B, two optical low pass filters: an optical low pass filter 11a which sufficiently attenuates the frequency spectrum fF inherent in the image guide fiber bundle existing in the vicinities of the color sub-carrier frequency and the sampling frequency; and another optical low pass filter 11b which sufficiently lowers a response in the vicinity of the sampling frequency for preventing the spurious color phenomenon from being produced due to the high-frequency components contained in the bright spots on the photographed image, for example, of the mucous membrane of the coelomata; and by disposing these optical low pass filters in the optical path of a TV camera 10 so as to be exchangeable with each other by using a turret 26.

Figure 26:
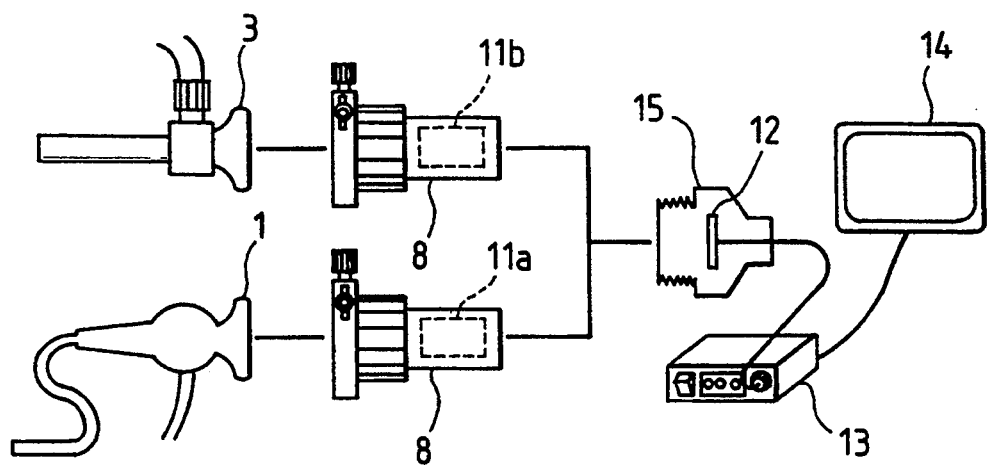
FIG. 26 is a diagram illustrating another example of the configuration of the TV system for endoscopes according to the present invention.
Figure 27:
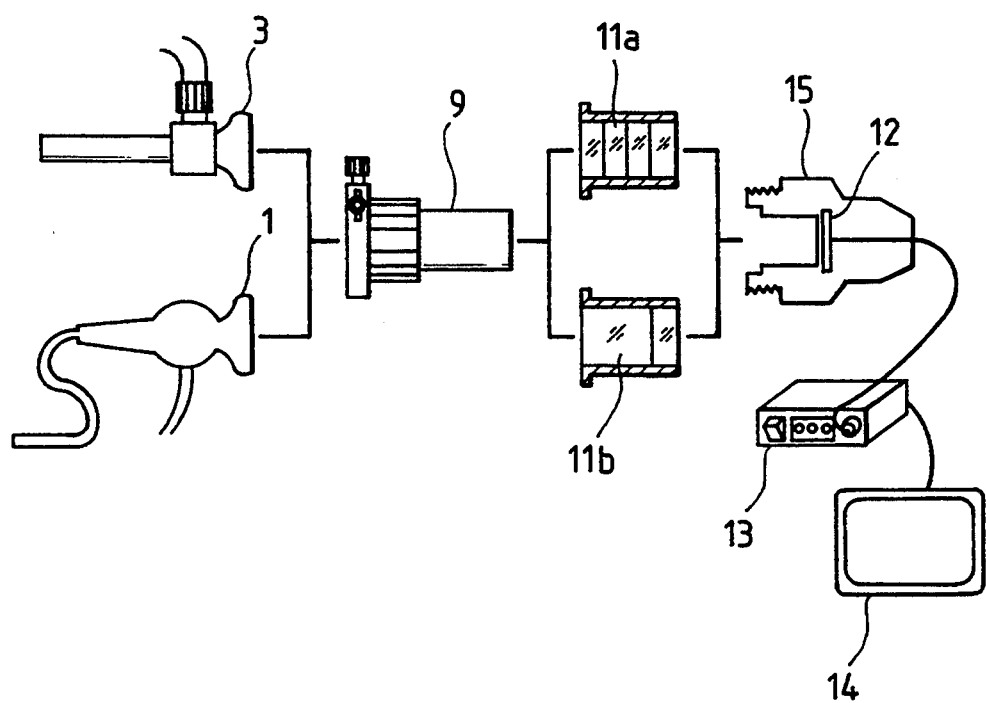
FIG. 27 is a diagram illustrating still another example of the configuration of the TV system for endoscopes according to the present invention.
Figure 28:
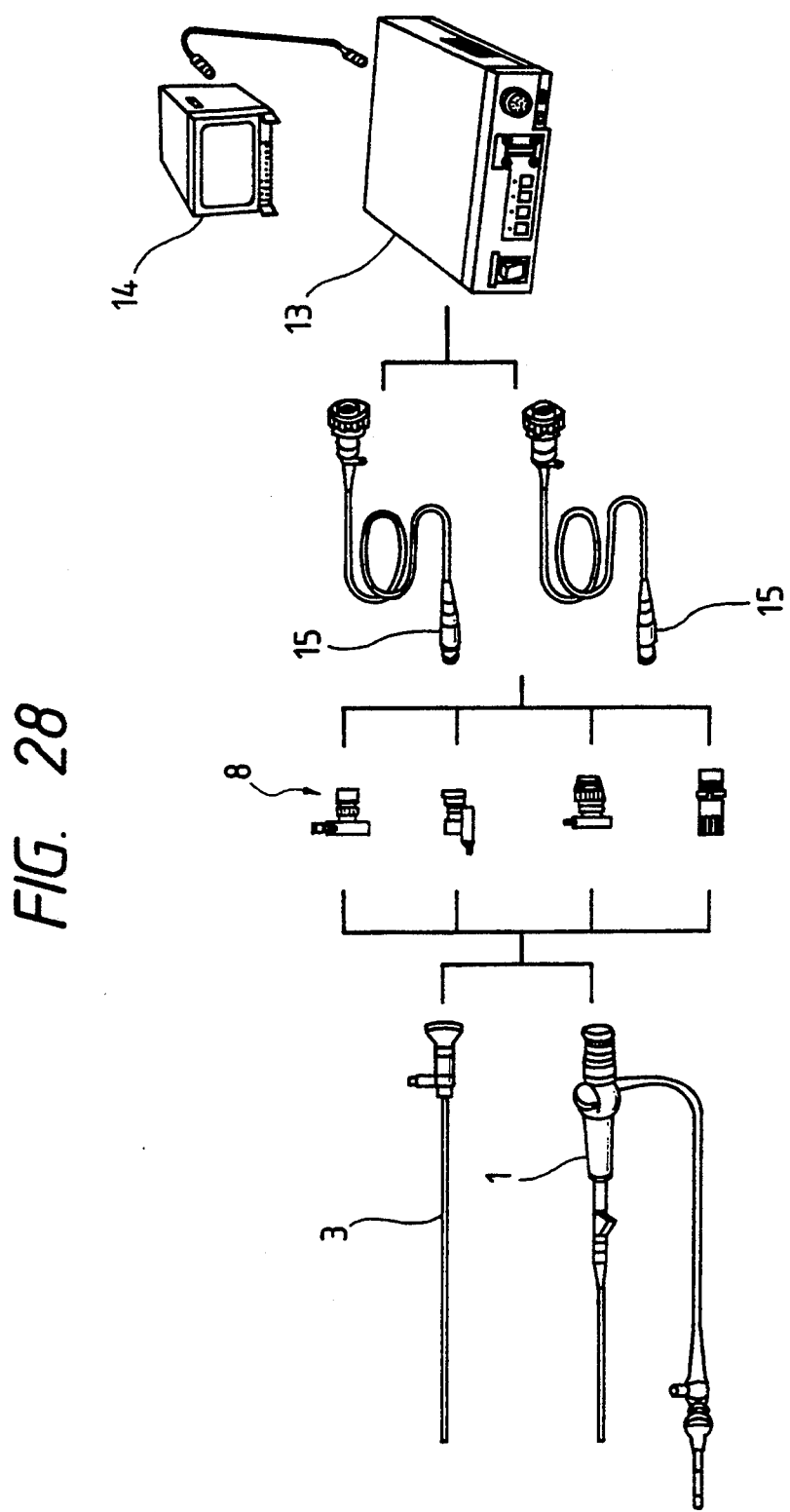
FIG. 28 is a diagram illustrating a further example of the configuration of the TV system for endoscopes according to the present invention.

Alternatively, as shown in FIG. 26, the response of the above-mentioned optical low pass filters can be changed selectively by preparing two adaptors 8 each of which comprises an imaging lens system and the optical low pass filter 11a or 11b, and selecting either of the adaptors 8 in accordance with an endoscope to be used in combination with the TV system for endoscopes. Further, it is possible as shown in FIG. 27 to configure the camera head 15 so as to permit switching the optical low pass filters from one to the other so that the optical low pass filters can be selected in accordance with endoscopes to be used in combination with the TV system for endoscopes. Furthermore, it is possible, as illustrated in FIG. 28, to prepare a plurality of adaptors 8 and a plurality of camera heads which comprise optical low pass filters having characteristics different from one another, and select these adaptors and camera heads in accordance with endoscopes to be used in combination with the TV system for endoscopes.

When a TV system for endoscopes which permits using a fiber scope and a rigid endoscope is combined with a television set of the NTSC system, for example, moiré is produced when the intense frequency spectrum fF contained in an image of an end surface of emergence of the image guide fiber bundle exists in the vicinity of the color sub-carrier frequency of 3.58 MHz. In this case, the production of moiré can be prevented by using an optical low pass filter which sufficiently attenuates the frequency response in the vicinities of 3.58 MHz for cutting off components of 3.58 MHz contained in the luminance signal. When the rigid endoscope is selected, however, resolution and contrast cannot be enhanced even by using a solid-state image pickup device having picture elements arranged at high density thereon, and an image will have a quality which is on the order similar to that of an image obtained with a solid-state image pickup device having picture elements arranged in a smaller number thereon.

Figure 16A:
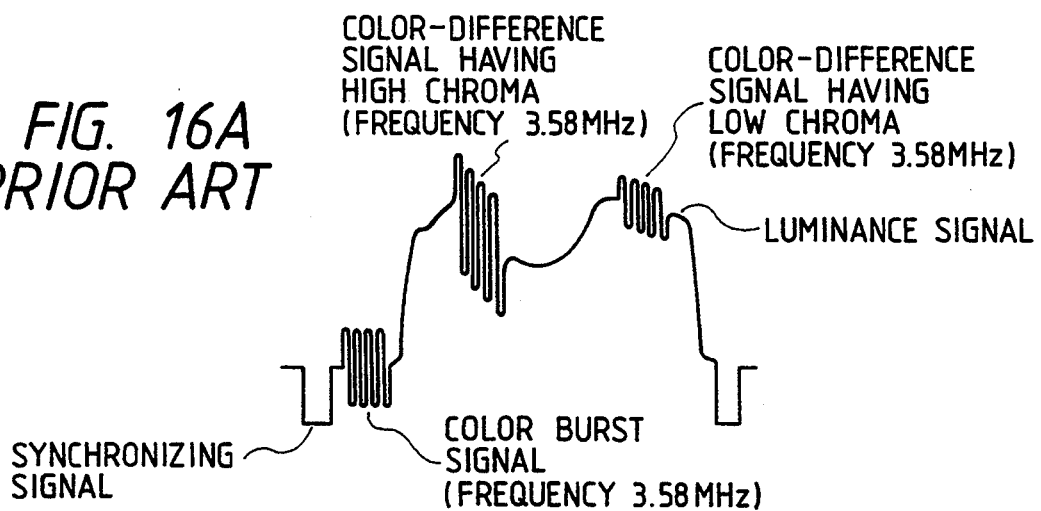
FIG. 16A is a diagram illustrating a waveform of the output from a solid-state image pickup device of an NTSC system.
Figure 16B:
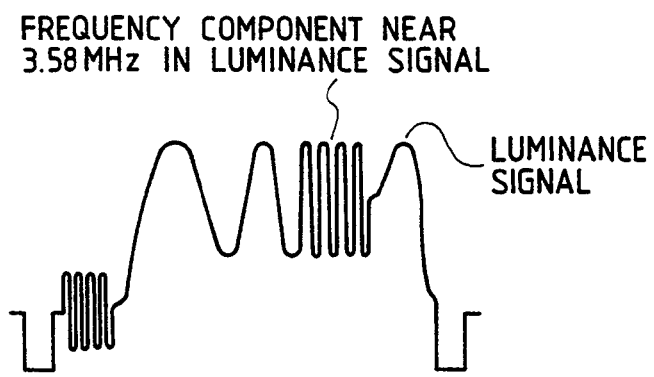
FIG. 16B is a diagram illustrating a waveform of the output from a solid-state image pickup device of an NTSC system in a case where a component having a frequency nearly equal to the color sub-carrier frequency is contained in a luminance signal.
Figure 17:
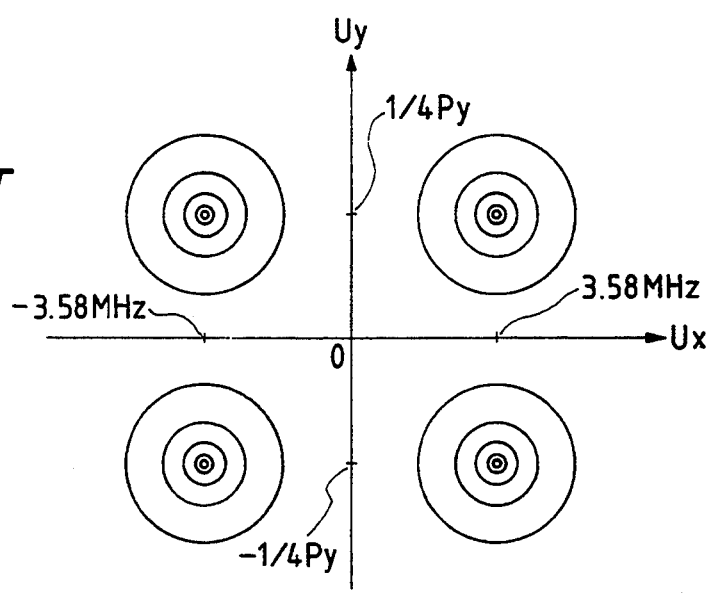
FIG. 17 is a diagram illustrating, on a two-dimensional spatial frequency plane, the color sub-carrier frequency shown in FIG. 16B.
Figure 30:
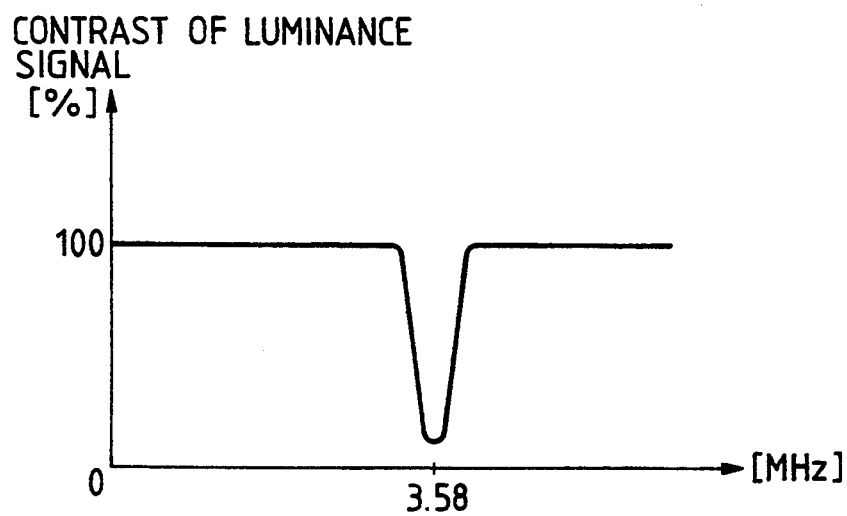
FIG. 30 is a graph illustrating a frequency characteristic of the TV system for endoscopes according to the present invention equipped with an electrical means for lowering the level of the composite signals.
Figure 31:
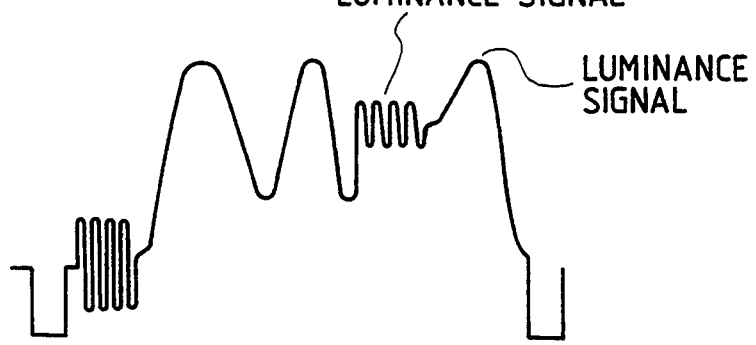
FIG. 31 is a diagram illustrating a waveform of output from the solid-state image pickup device in the TV system for endoscopes according to the present invention equipped with an electrical means for lowering the level of the composite signals.

The TV system for endoscopes according to the present invention, which has the configuration described above, has electrical characteristics sufficiently attenuating amplitudes of components in the vicinities of 3.58 MHz, as shown in FIG. 30, out of the luminance signal components of the composite signals at the output stage thereof and outputs the components in the vicinities of 3.58 MHz after sufficiently attenuating the amplitudes thereof as is clearly understood by comparing FIG. 16B with FIG. 31. Accordingly, the signals are processed as color difference signals having very weak chroma even when the luminance signals of 3.58 MHz are regarded as color signals on the side of the TV monitor, whereby the moiré which is produced by the fiber scope can constitute nearly no hindrance to observation of an image on the TV monitor. Consequently, the TV system for endoscopes according to the present invention is capable of preventing the moiré which is produced due to the interference between the frequency spectrum fF and the color sub-carrier frequency without using the optical low pass filter which sufficiently attenuates the response to the components having frequencies in the vicinities of the color sub-carrier frequency. As a result, the TV system for endoscopes according to the present invention is capable of eliminating the moiré which is produced when the fiber scope is selected by using the optical low pass filter attenuating the frequency spectrum existing in the vicinity of the sampling points.

Figure 32A:
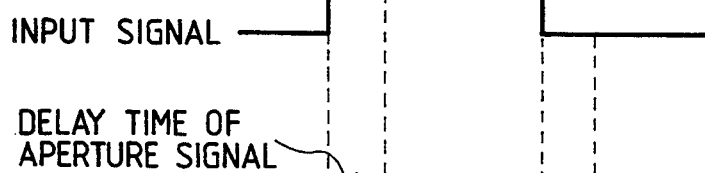
FIG. 32A, FIG. 32B and FIG. 32C are diagrams descriptive of a luminance signal, the aperture signal, and an aperture signal obtained by overlapping the luminance signal with the aperture signal respectively.
Figure 32B:
Figure 32C:
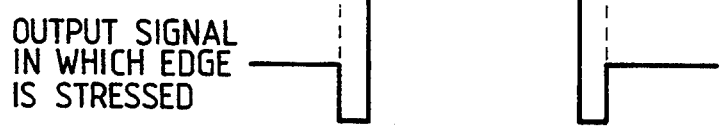
Figure 33A:
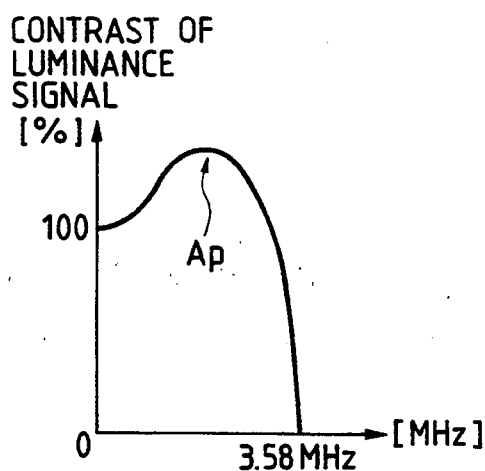
FIG. 33A and FIG. 33B are graphs illustrating the contrast of the luminance signals obtained by delaying peaks of the aperture signals in a condition where the fiber scope is selected and in another case where the rigid endoscope is selected respectively.
Figure 33B:
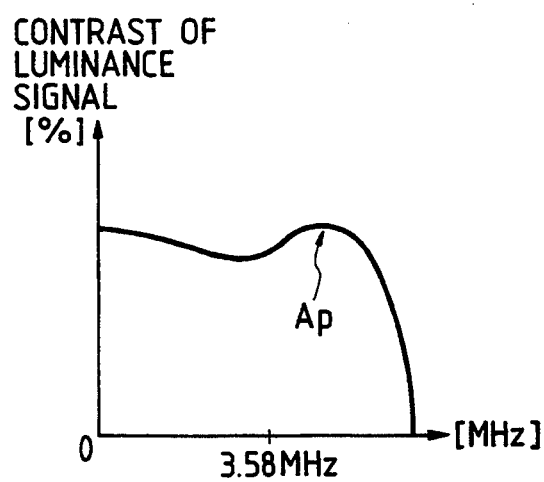

As a means for obtaining the electrical characteristic described above, it is possible to utilize, for example, the aperture signal. A function of the aperture signal will be described with reference to FIG. 32A, FIG. 32B and FIG. 32C. When an input signal providing the luminance information is as illustrated in FIG. 32A, the aperture signal shown in FIG. 32B is generated by processing the input signal. A signal emphasizing edges of an image as shown in FIG. 32C can be obtained by overlapping the aperture signal again with the luminance signal. The signal shown in FIG. 32C has a negative spot image intensity distribution and apparent response exceeding 100%, thereby being capable of enhancing image contrast. In this case, the peak frequency for emphasizing the edges in the response to an output image can be varied by controlling a delay time at the stage of the generation of the aperture signal. Accordingly, high-frequency components having frequencies higher that 3.58 MHz are smaller than the frequency components having frequencies lower than 3.58 MHz by setting peak Ap of the aperture signal so that contrast of the luminance signal is sufficiently low in the vicinity of 3.58 MHz (see FIG. 33A) when the fiber scope is selected, and the electrical characteristic described above can be obtained by normalizing the luminance signal as a whole. However, resolution sufficient for frequency components having frequencies higher than 3.58 MHz cannot be obtained in the condition described above when the rigid endoscope is used. When the rigid endoscope is selected, the delay time of the peak Ap of the aperture signal is set so that the cutoff frequency of contrast is within a frequency region higher than 3.58 MHz (see FIG. 33B). Though the function of the aperture signal has been described above as that for emphasizing the edges in the horizontal direction of an image, the edges of the image can be emphasized in the vertical direction or an oblique direction using the same principle.

By configuring the TV system for endoscopes according to the present invention as described above, it is possible to obtain an electrical characteristic which is close to the electrical characteristic sufficiently attenuating the amplitudes of the signals in the vicinities of 3.58 MHz, thereby narrowing the amplitude of the component of 3.58 MHz contained in the luminance signal and make moiré scarcely noticeable so as to constitute no hindrance to observation of an image on the TV monitor. It has been experimentally confirmed that a moiré eliminating effect sufficiently high enough for practical use is obtained so far as the amplitude of the luminance signal within a frequency region of "3.58+0.5" MHz is smaller than 40% of the amplitude within other frequency regions.

When the TV system for endoscopes according to the present invention is configured so as to electrically eliminate the moiré which is produced due to the interference between the frequency spectrum fF of the fiber scope and the color sub-carrier frequency, it is sufficient to use the optical low pass filter attenuating only the frequency spectrum fF of the fiber scope existing in the vicinity of the sampling point, and it is possible to obtain an image which is high in both resolution and contrast by using the optical low pass filter in combination with the solid-state image pickup device having picture elements arranged densely thereon when the rigid endoscope is selected. The moiré eliminating effect can be obtained by adopting the configuration described above for the TV system exclusively for fiber scopes.

Figure 29:
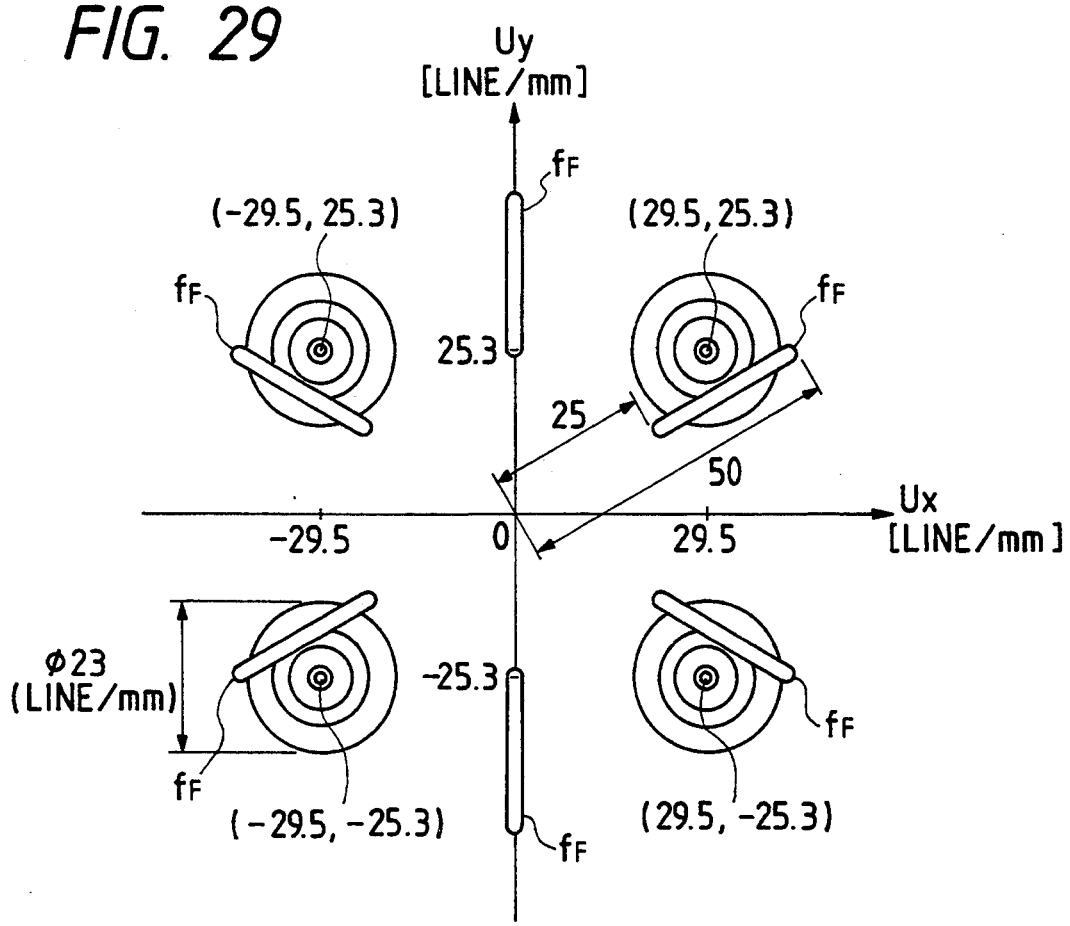
FIG. 29 is a diagram illustrating a frequency characteristic of a TV system for endoscopes of the NTSC system which is connectable selectively to a fiber scope and a rigid endoscope.

Moiré is produced when the intense frequency spectrum fF contained in an image of an end surface of emergence of the image guide fiber bundle exists in the vicinity of the color sub-carrier frequency of 3.58 MHz (see FIG. 29). In this case, resolution and contrast cannot be enhanced by using the optical low pass filter which sufficiently attenuates response to components having frequencies in the vicinities of 3.58 MHz even in combination with the solid-state image pickup device having picture elements densely arranged thereon.

The TV system for endoscopes according to the present invention having the configuration described above is capable of dividing TV signal outputs into the luminance signal and the color difference signal for providing the component TV signal, and preventing moiré from being produced due to interference between the signals since the frequency spectrum fF cannot be regarded as the color difference signal on the side of the TV monitor even if the color sub-carrier frequency contains the frequency spectrum fF when the fiber scope is selected.

Since the TV system for endoscopes according to the present invention is configured so as to electrically eliminate the moiré which is produced due to the interference between the frequency spectrum fF of the fiber scope and the color sub-carrier frequency, it is sufficient for the TV system for endoscopes to use the optical low pass filter which attenuates only the frequency spectrum fF of the fiber scope existing in the vicinity of the sampling points, and it is possible to obtain images excellent in both resolution and contrast by using the solid-state image pickup device having picture elements densely arranged thereon in combination with the optical low pass filter when the rigid endoscope is selected. The moiré eliminating effect can be obtained by applying the configuration described above to TV systems exclusively for fiber scopes.

Moiré is produced when the intense frequency spectrum fF contained in an image of an end surface of emergence of the image guide fiber bundle exists in the vicinity of the color sub-carrier frequency of 3.58 MHz as described above (see FIG. 29). When the optical low pass filter which sufficiently attenuates frequency components having frequencies in the vicinity of 3.58 MHz is used for eliminating the moiré, resolution and contrast of images cannot be enhanced even by using the solid-state image pickup devices having picture elements densely arranged thereon when the rigid endoscope is selected.

Figure 34A:
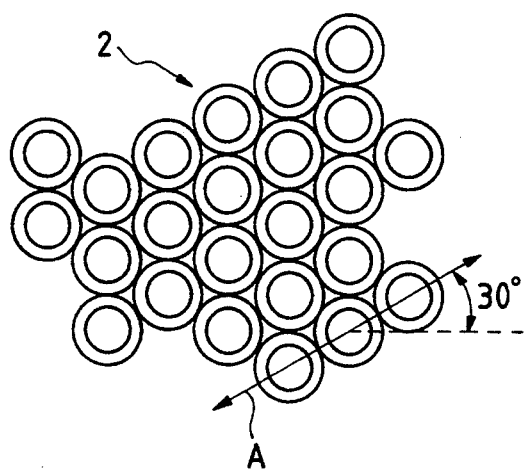
FIG. 34A is a diagram illustrating an end surface of emergence of a fiber bundle which is configured so as to have a certain angle.
Figure 34B:
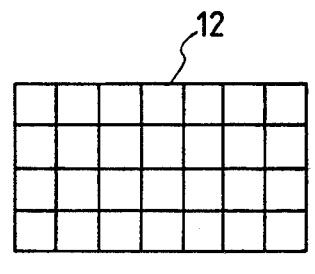
FIG. 34B is a diagram illustrating a scanning direction on the solid-state image pickup device.
Figure 35:
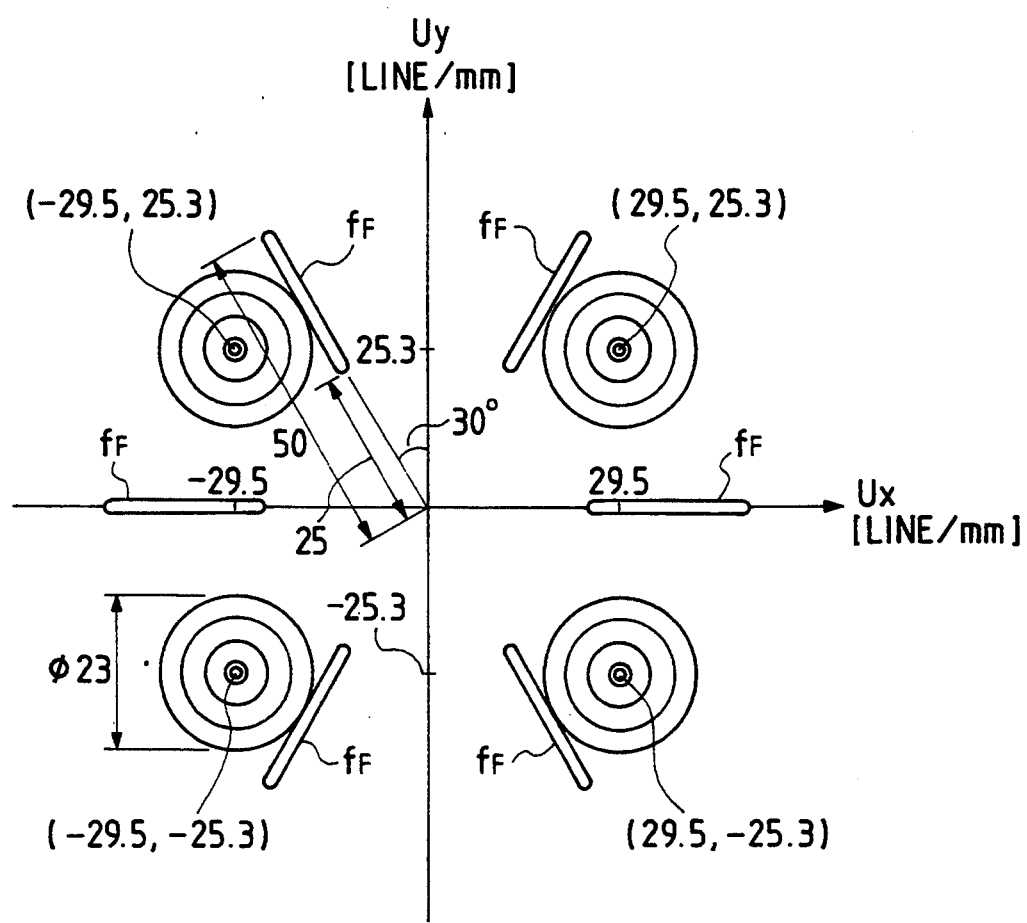
FIG. 35 is a diagram illustrating a frequency characteristic of video signals obtained by using the fiber bundle shown in FIG. 34A.

By setting an arrangement direction of optical fibers in the image guide fiber bundle at a certain angle (30°) relative to the horizontal scanning direction on the solid-state image pickup device (see FIG. 34A) in the TV system for endoscopes according to the present invention, the frequency spectrum fF of the first order of the optical fibers is inclined at a definite angle on the two dimensional frequency plane as shown in FIG. 35, and the frequency spectrum fF of the first order and the color sub-carrier frequency are separated from each other in frequencies thereof.

Figure 36A:
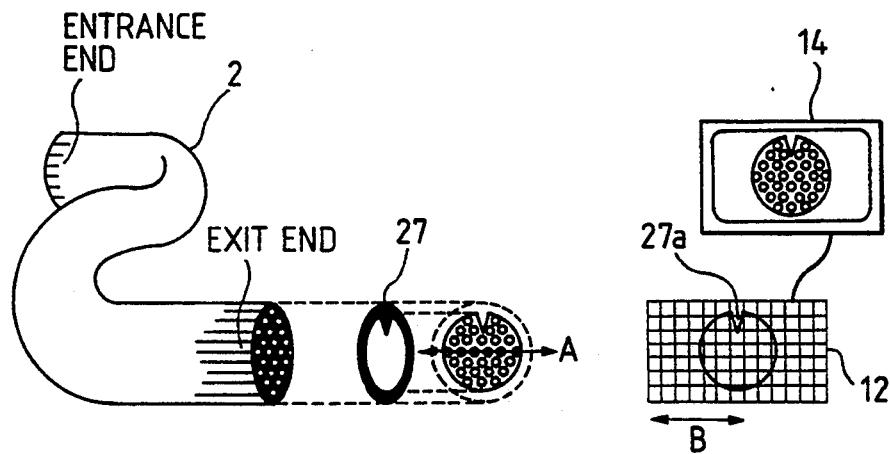
FIG. 36A shows diagrams illustrating an end surface of emergence of the conventional fiber scope and image pickup direction of the solid-state image pickup device.
Figure 36B:
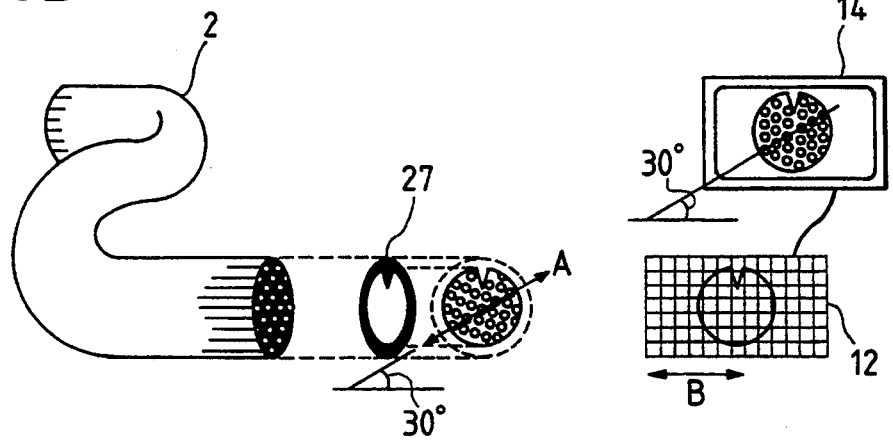
FIG. 36B and FIG. 36C show diagrams which are similar to those shown in FIG. 36A except that they illustrate two different examples according to the present invention respectively.
Figure 36C:
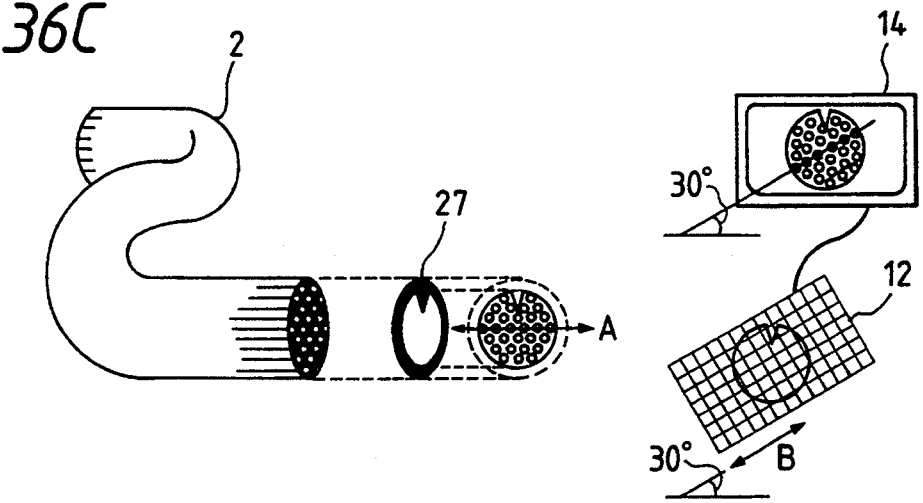

FIG. 36A, FIG. 36B and FIG. 36C schematically exemplify the relationship between the image guide fiber bundle and the solid state image pickup device. FIG. 36A shows the relationship conventionally adopted, whereas the end surface of emergence of the image guide fiber bundle, solid-state image pickup devices 12 and a TV monitor 14 for the TV system for endoscopes according to the present invention are illustrated in FIG. 36~ and FIG. 36C. In these drawings, the arrow A indicates the arrangement direction of the optical fibers and the allow B indicates the horizontal scanning direction on the solid-state image pickup device 12. Disposed on the end surface of emergence of the fiber scope 2 is a mask (field stop) 27 and an image of the end surface is displayed on the TV monitor 14 by way of the solid-state image pickup device 12. In FIG. 36B, the image guide fiber bundle as a whole is rotated 30° around an optical axis as compared with the image guide fiber bundle disposed in the conventional example. A notch 27a formed in the mask 27 is to be used as a reference mark for controlling an angle of an endoscope and set so as to be position ally unchanged on the solid-state image pickup devices. In FIG. 36C, the image guide fiber bundle and the mask are disposed at the locations which are the same as those shown in FIG. 36A, and only the solid-state image pickup device 12 is rotated 30° around the optical axis.

When the TV system for endoscopes according to the present invention is configured so as to mechanically eliminate the moiré which is produced due to the interference between the frequency spectrum of the fiber scope and the color sub-carrier frequency, i.e., by using the constructional characteristic of the fiber scope, it is sufficient to use the optical low pass filter which attenuated only the frequency spectrum fF existing in the vicinity of the sampling point, and it is possible to obtain images excellent in both resolution and contrast by using the optical low pass filter in combination with the solid-state image pickup device having picture elements densely arranged thereon. The moiré eliminating effect can also be obtained by applying the configuration described above to TV systems exclusively for fiber scopes. Further, the angle of the arrangement direction of the optical fibers in the image guide fiber bundle relative to the horizontal scanning direction on the solid-state image pickup device is not limited to the angle (30°) selected for the configuration described above, but may be set at an adequate angle at which the frequency spectrum fF of the first order is inclined at a definite angle on the two-dimensional frequency plane so that the frequency spectrum fF of the first order and the color sub-carrier frequency are separate from each other in frequencies thereof.

In order to enhance resolution and contrast of images with the spurious color signals eliminated as completely as possible, it is sufficient to use a single birefringent plate and an optical low pass filter having a cut-off frequency set at the Nyquist frequency limit of the solid-state image pickup device. Further, it is possible to suppress the spurious color signals by processing the luminance signal by a color signal suppressing circuit.

A function of the color signal suppressing circuit will be described below with reference to FIG. 37A and FIG. 37B.

Figure 37A:
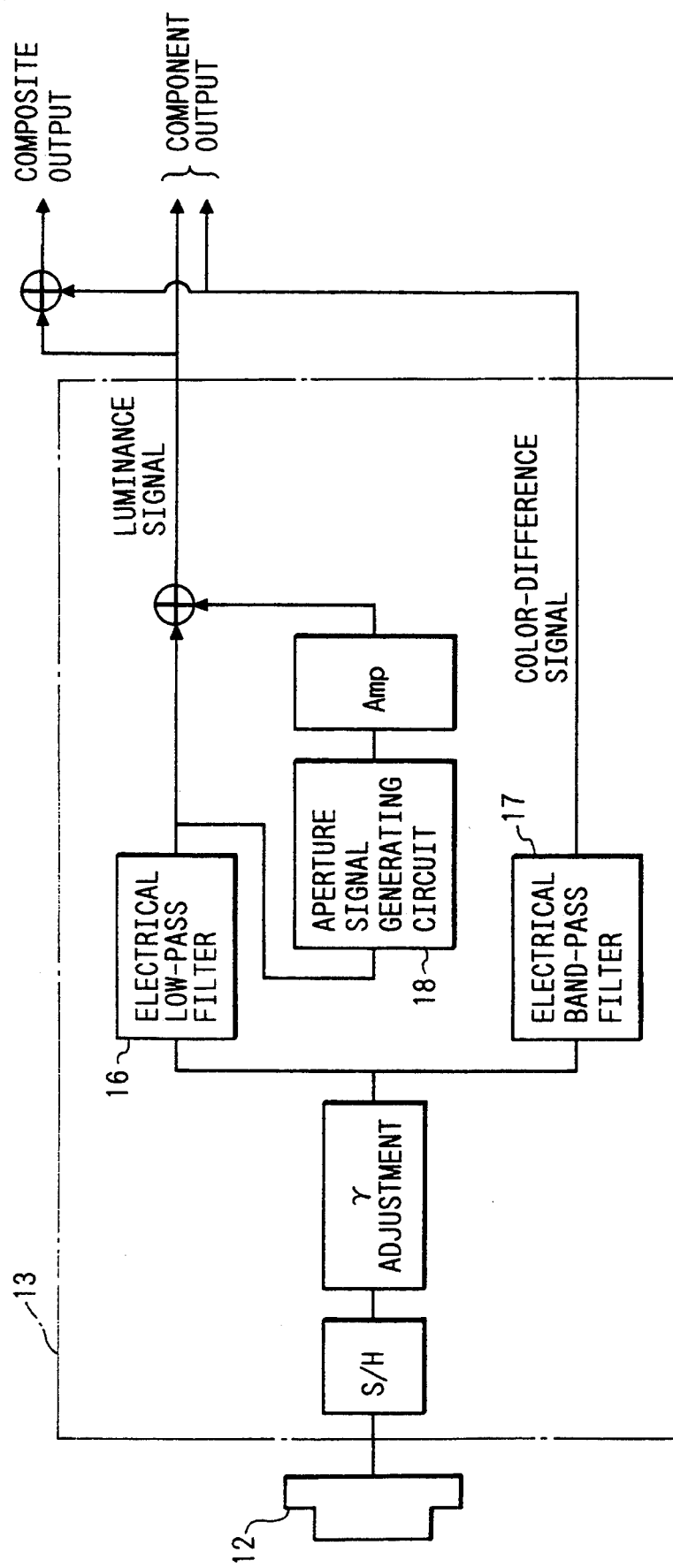
FIG. 37A is a block diagram of a TV signal generating circuit using analog circuits.
Figure 37B:
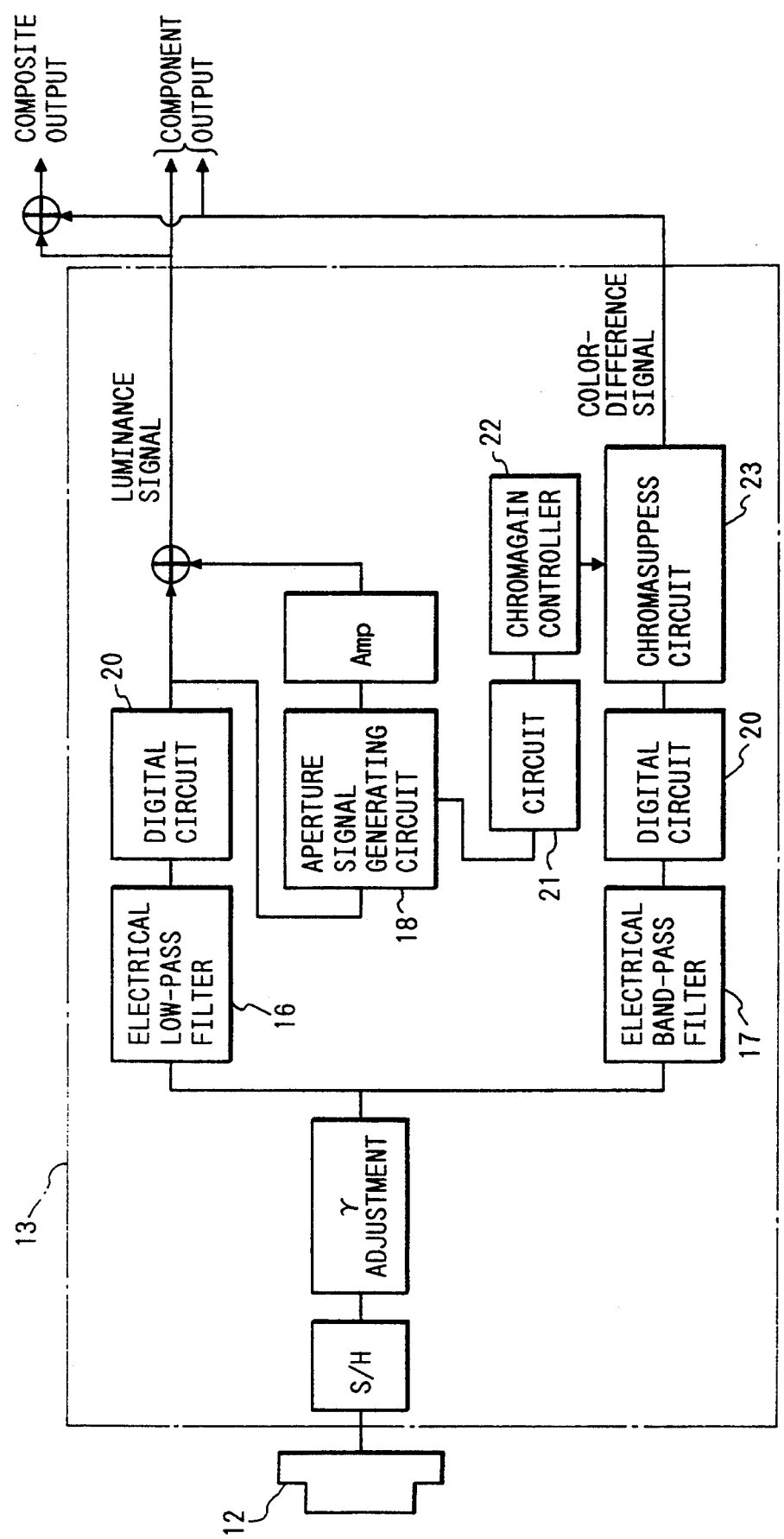
FIG. 37B is a block diagram of a TV signal generating circuit using digital circuits including a color signal suppressing circuit.

FIG. 37A is a block diagram illustrating the main parts of a camera control unit 13 using analog circuits. In this drawing, electrical signals output from a solid-state image pickup device 12 disposed in a TV camera 10 are processed by a sample and hold circuit and a gamma adjusting circuit respectively, whereby the electrical signals are divided into electrical signals providing luminance information and color information and pass through an electrical low pass filter 16 and an electrical bandpass filter 17 respectively. The luminance information is divided by an aperture signal generating circuit 18 into an electrical signal for generating an aperture signal for emphasizing the edges and another electrical signal to be used as a luminance signal of a TV signal. FIG. 37B is a block diagram illustrating the main parts of a camera control unit using digital circuits. In this drawing, electrical signals which are converted into digital luminance information while passing through an electrical low pass filter and an A/D converter circuit 20 are input into an aperture signal generating circuit 18, an absolute value circuit 21 calculates an amplitude of aperture signals upon generation of the aperture signals by the aperture signal generating circuit and output intensity of electrical signals providing color information is adjusted by a chromagain controller circuit 22, whereby digital color signals output from the A/D converter circuit 20 through the band pass filter are suppressed by a chromasuppress circuit 23.

By using the chromasuppress circuit 23 described above, spurious colors can be made less noticeable since, when high frequency components contained in bright spots on an image of a mucous membrane in coelomata which is an ordinary object to be observed through endoscopes are incident, intensity of the aperture signal is enhanced and the chromasuppress circuit 23 adjusts so as to lower the output intensity of the electrical signals providing the color information. Accordingly, a spurious color preventive effect can be obtained sufficiently for practical use even when a single birefringent plate is used and the cut-off frequency of the optical low pass filter is set at a level higher than the Nyquist frequency limit of the solid-state image pickup device, whereby image contrast can be enhanced at the Nyquist frequency limit of the solid-state image pickup device.

When an image of an end surface of emergence of the fiber scope is picked up and video signals of this image are processed by the chromasuppress circuit 23, however, the video signals contain a lot of high-frequency components. Accordingly, a problem is posed in that the aperture signal generated by the aperture signal generating circuit 18 has a large amplitude and the chromagain controller 22 adjusts so as to lower a level of all the signals, i.e., as if a non-chromatic image is picked up.

Figure 38:
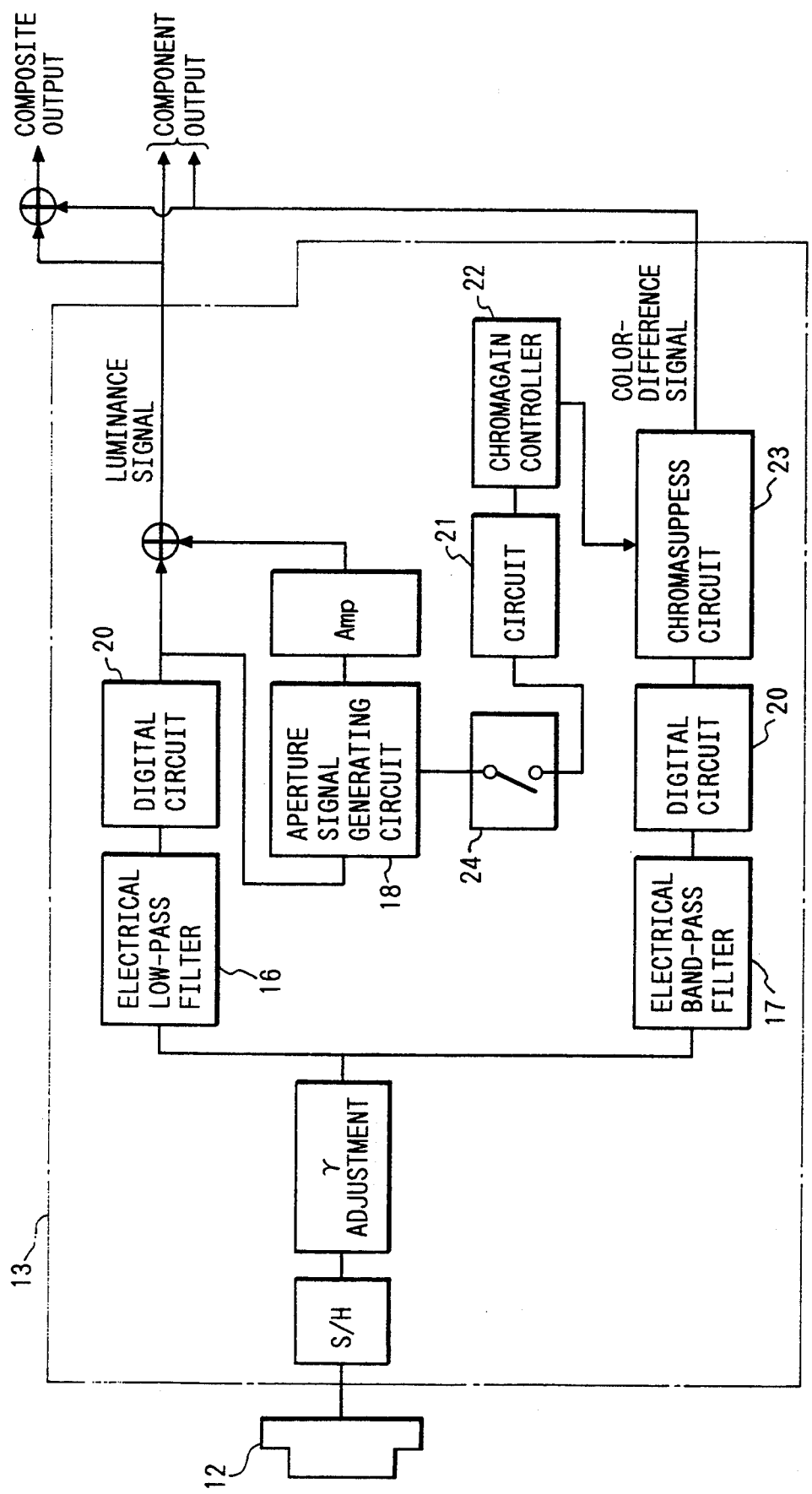
FIG. 38 is a diagram illustrating still another example of the configuration of the TV system for endoscopes according to the present invention.

In the configuration of the TV system for endoscopes according to the present invention described above, a switch 24 is disposed in the camera control unit 13 as shown in FIG. 38 so that different input conditions of the signals from the aperture signal generating circuit 18 are selectable between the case where the fiber scope is used and the case where the rigid endoscope is used. The switch 24 switches the signal connection between the aperture signal generating circuit 18 and the absolute value circuit 21. The switch 24 is set in an OFF condition to disconnect these circuits when the fiber scope is used and set in an ON condition to connect these circuits when the rigid endoscope is used. Consequently, discoloring of images is prevented when the fiber scope is used, and the chromasuppress circuit 23 functions to obtain images excellent in resolution and contrast when the rigid endoscope is used.

Though images become apparently non-chromatic when the color signal output is lower than 90% of the normal output level, experiments have proved that a limit allowable for observation of images in practice lies at 50% (or lower) of the normal output level. Therefore, the switch 24 is not limited to the ON/OFF type shown in FIG. 38, but may be of any type which continuously varies an output level of the aperture signal input from the aperture signal generating circuit 18 into the absolute value circuit 21 within a range above the limit mentioned above. Further, it is possible to equip fiber scopes with discriminating means so that the output level of the aperture signal is varied automatically dependently on a selected fiber scope. Furthermore, it is possible to feed the amplitude of the aperture signal back to the switch and reproduce colors by varying the characteristic of the aperture signal generating circuit when the fiber scope is used.

Description will now be made of the first embodiment of the TV system for endoscopes according to the present invention which comprises an electrical switch.

Figure 1:
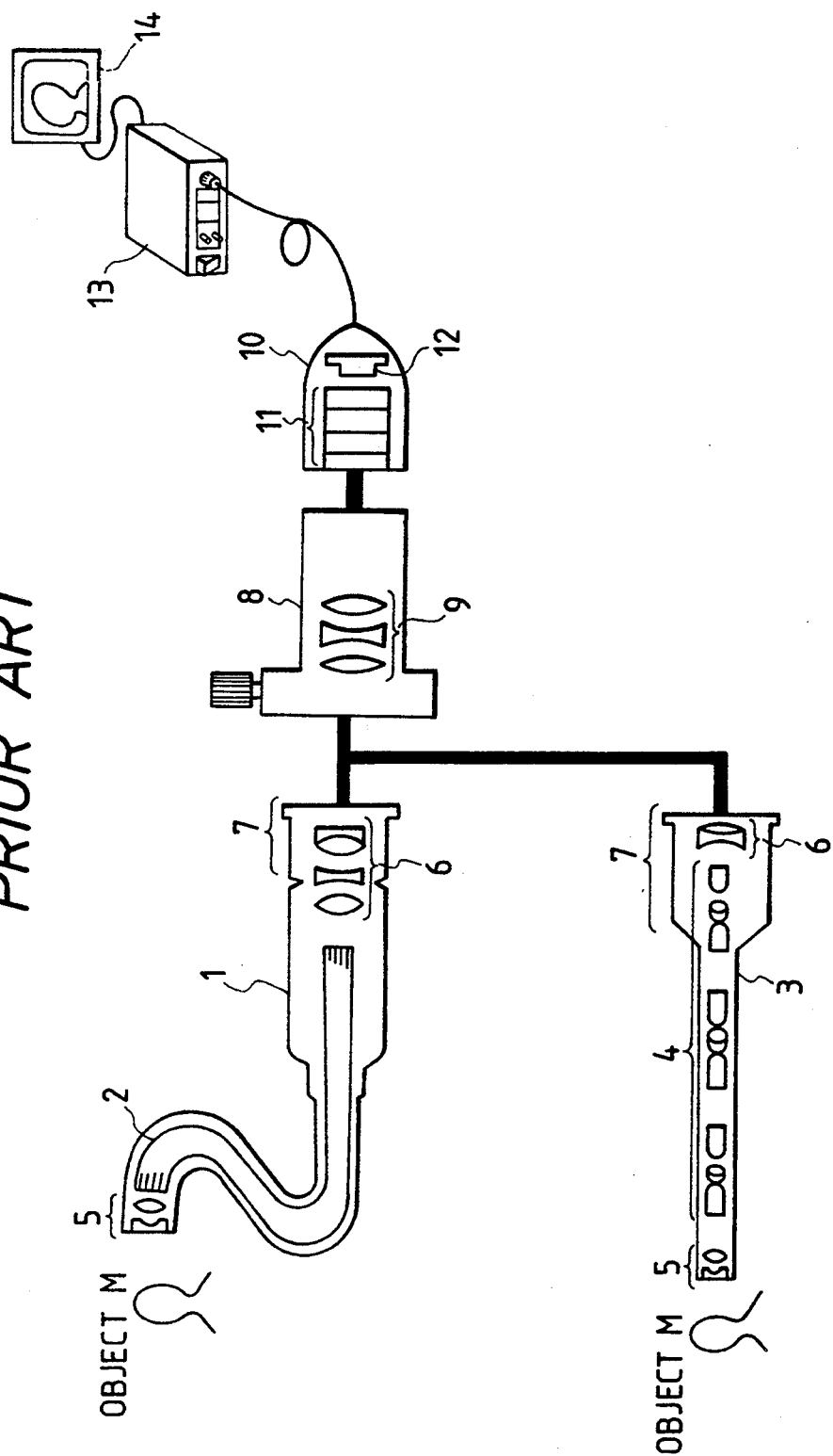
FIG. 1 through FIG. 4 are views illustrating the configurations of the conventional TV systems for endoscopes different from one another.
Figure 2:
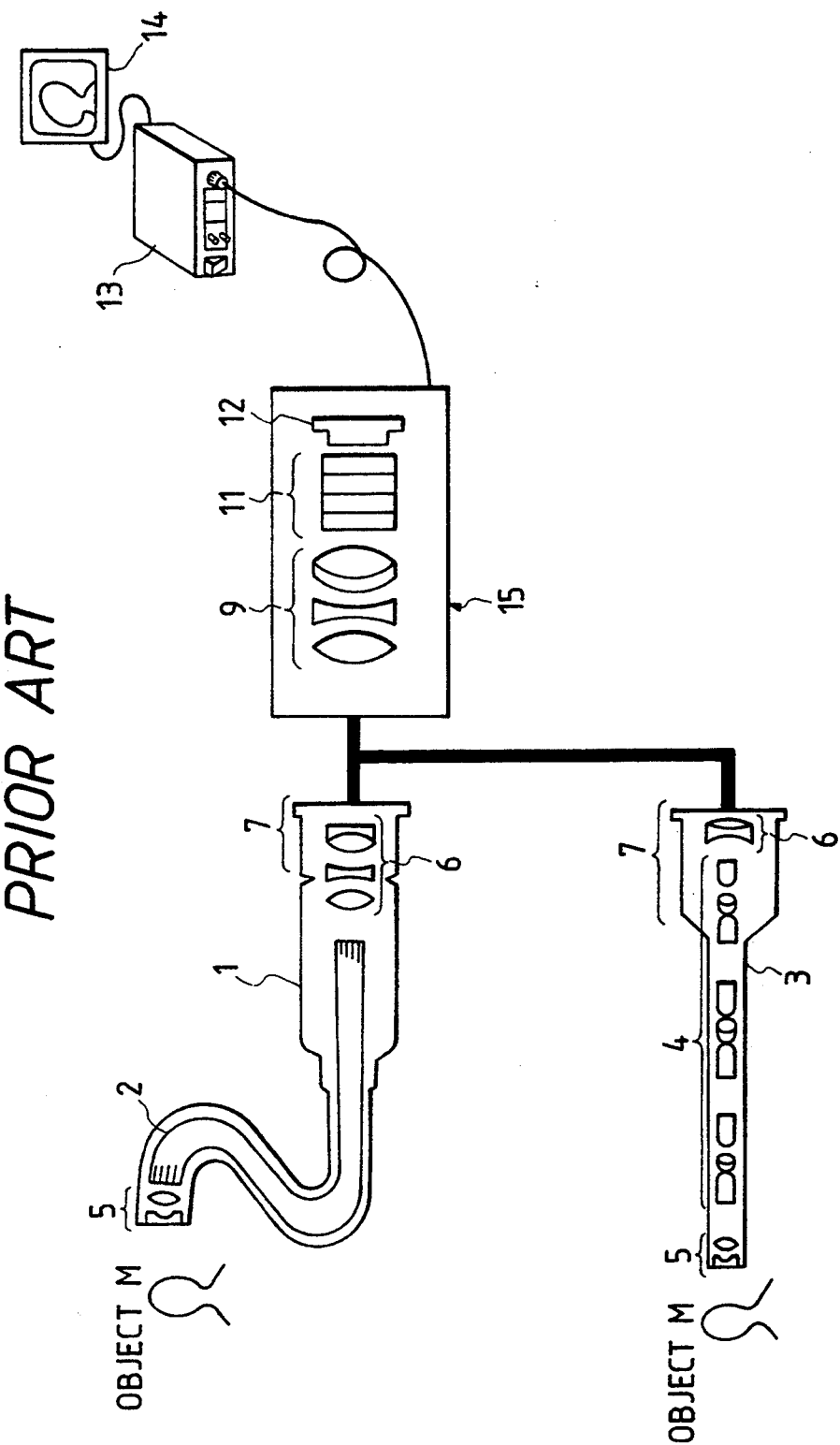
Figure 3:
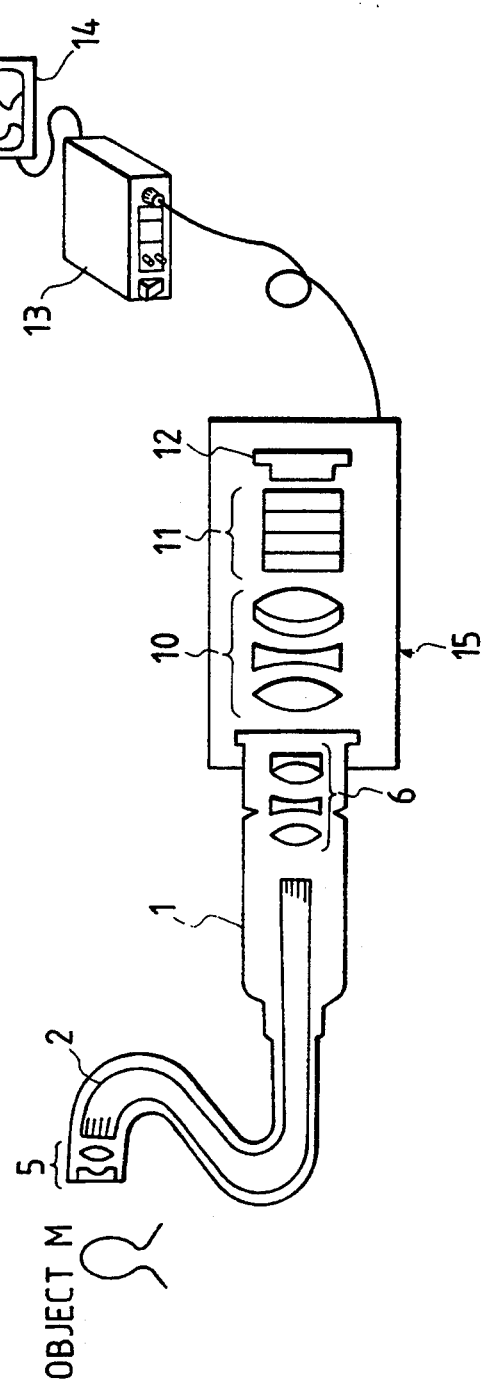
Figure 4:
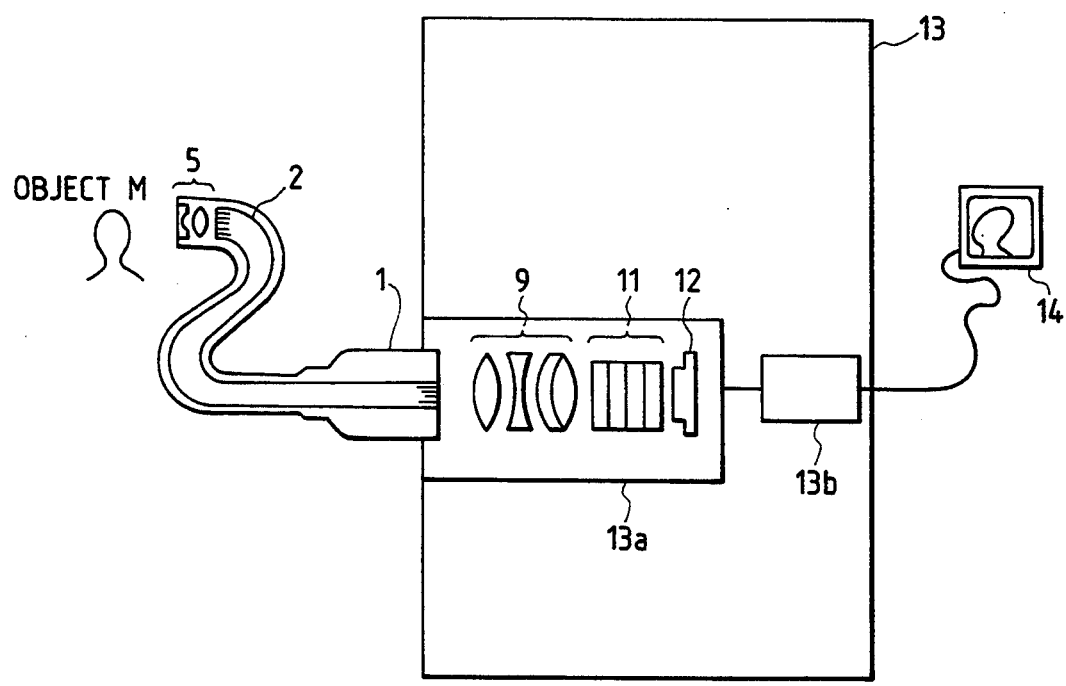
Figure 5:
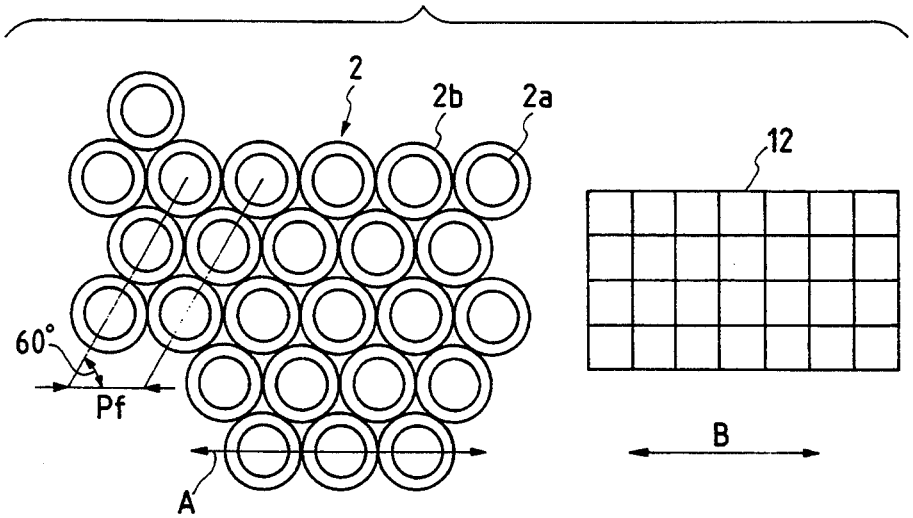
FIG. 5 shows diagrams illustrating an end surface of emergence of an image guide fiber bundle and a horizontal scanning direction on a solid-state image pickup device respectively.
Figure 6:
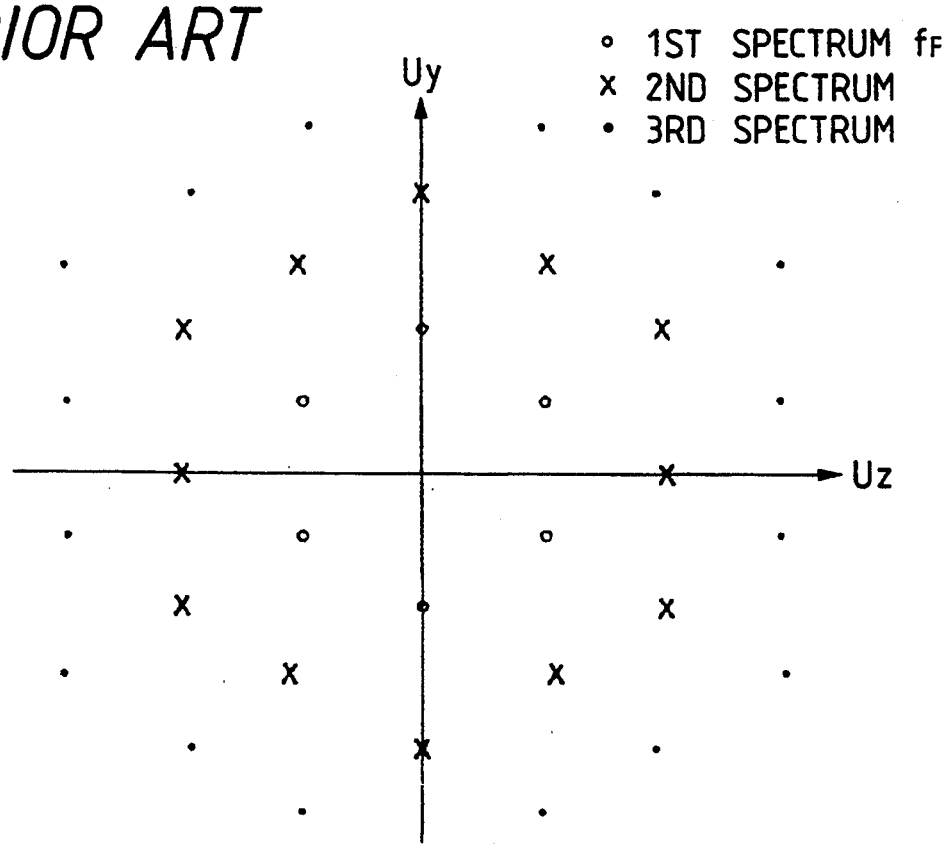
FIG. 6 is a diagram illustrating a frequency characteristic of video signals obtained by using a fiber scope having the end surface of emergence shown in FIG. 5.
Figure 7:
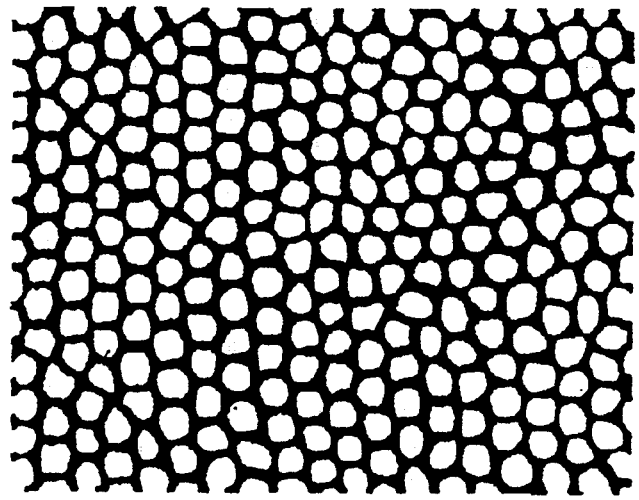
FIG. 7 is a diagram illustrating an end surface of emergence of an image guide fiber bundle comprising optical fibers arranged at random therein.
Figure 8:
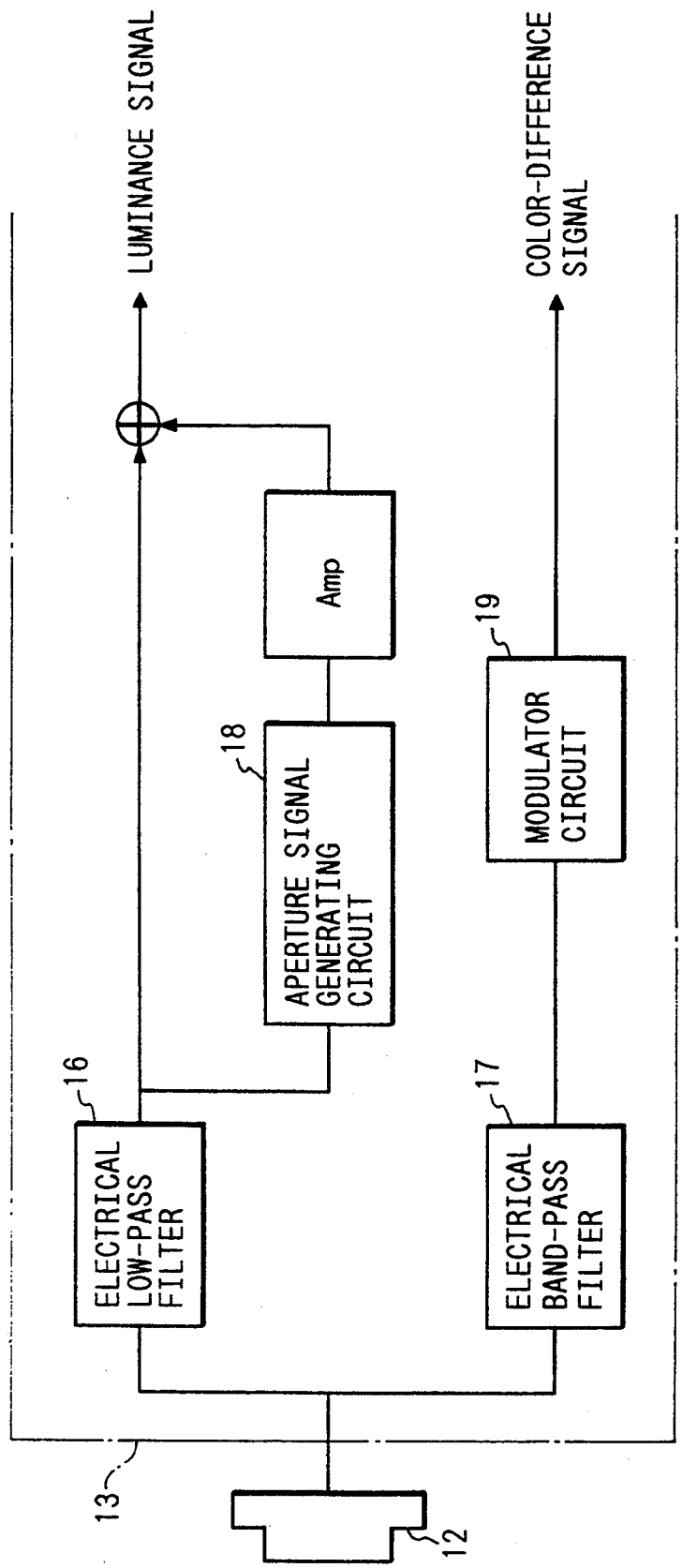
FIG. 8 is a block diagram of the conventional TV signal generating circuit.
Figure 39:
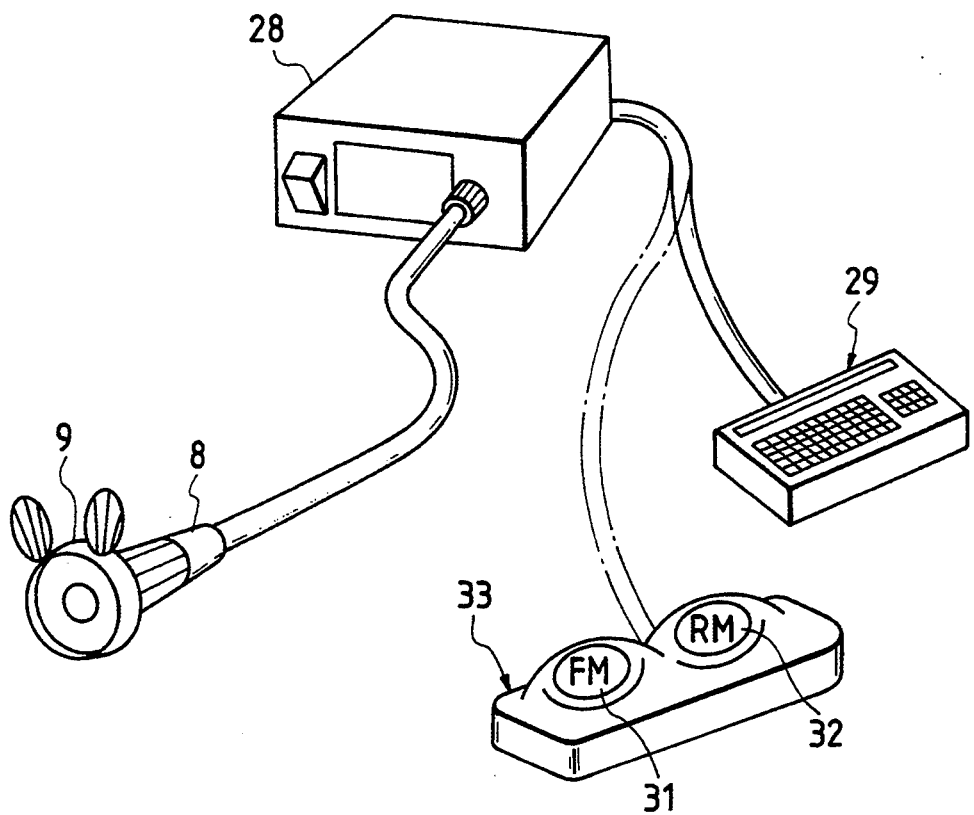
FIG. 39 is a perspective view illustrating the main parts of a first embodiment of the TV system for endoscopes according to the present invention.

FIG. 39 illustrates the main members of the first embodiment using the same reference numerals for the members which are substantially the same as those described with reference to the prior art. In FIG. 39, the fiber scope 1 and the rigid endoscope 6 which are shown in FIG. 1 and FIG. 2 are omitted, and optical connections of these scopes can be made selectively to a TV camera 8 by way of an adaptor 9 comprising an imaging lens system 10. Further, a solid-state image pickup device 12 disposed in the TV camera is connected to a camera control unit 28.

The camera control unit 28 comprises electrical circuits including a chromasuppress circuit 23 which varies the suppressing characteristic for the color difference signal by a chromagain controller 22 dependently on frequencies contained in picked up images so that the output intensity of the color difference signal is optimum for each of the rigid endoscope 6 and the fiber scope 1 by separating electrical signals output from the solid-state image pickup device 12 into luminance information and color information, and feeding aperture signals generated from the luminance information back to an output circuit of the color information.

The adjustment for varying the suppressing characteristic for the color difference signal output by the chromagain controller 22 in an aperture signal adjusting circuit is controlled by manipulating keys arranged on a keyboard 29 which is electrically connected to the camera control unit 28.

Figure 40:
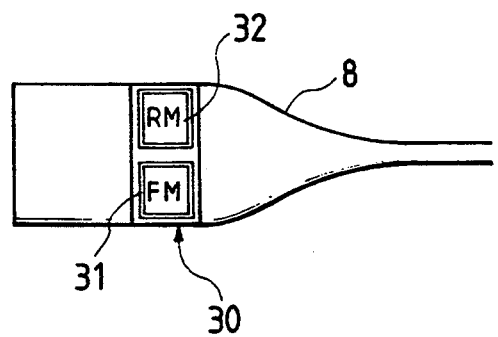
FIG. 40 is a plan view illustrating a modification of the first embodiment.

In place of the keyboard 29, a switch unit 30 may be disposed directly on the head of the TV camera 8 as shown in FIG. 40. In this case, disposed on the switch unit 30 are a selector switch (FM) 31 for selecting the suppressing characteristic of the color difference signals for the fiber scope and another selector switch (RM) 32 for selecting the suppressing characteristic of the color difference signals for the rigid endoscope 6. Alternatively, the switch unit 30 may be a foot switch 33 (see FIG. 39). The selector switches 31 and 32 may be pushbuttons for discontinuous adjustments or dial type rotary switches permitting continuous adjustments. On the object side of the solid-state image pickup device 12 arranged in the TV camera, an optical low pass filter 44 for the rigid endoscope, which will be described later with reference to the second embodiment, is disposed for enhancing quality of images when the rigid endoscope is used.

Functions of the first embodiment having the configuration described above will be explained below with reference to FIG. 41A and FIG. 41B.

Figure 41A:
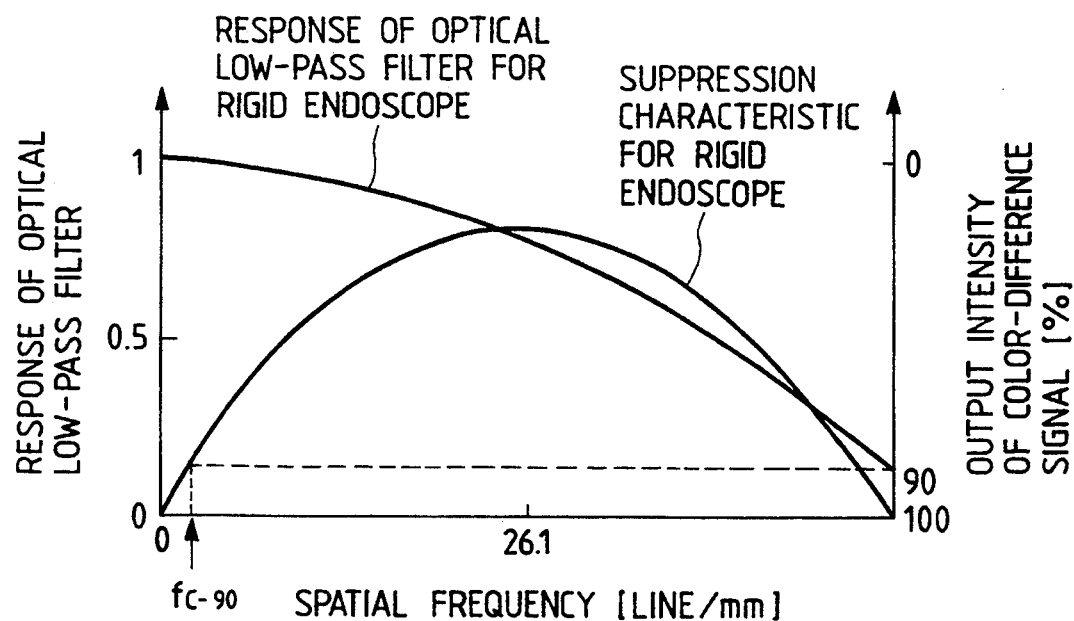
FIG. 41A shows graphs illustrating the relationship between the spatial frequency component in an image obtained by selecting the rigid endoscope and a suppressing characteristic for the color difference signal output as well as relationship between the spatial frequency component and response of the optical low pass filter.
Figure 41B:
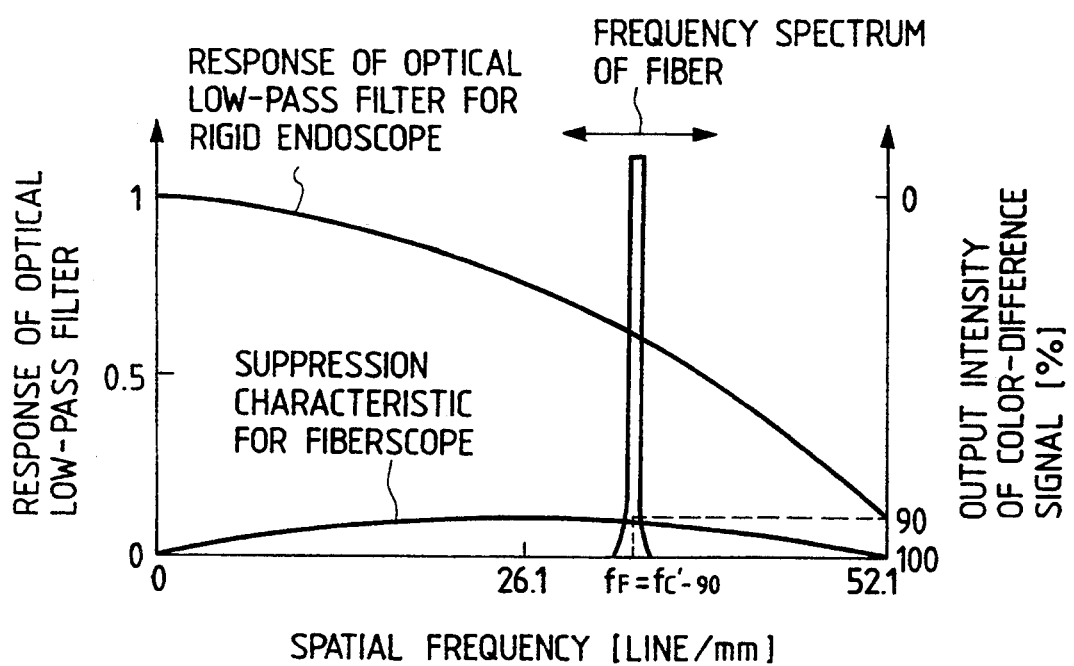
FIG. 41B shows graphs illustrating the relationship which is similar to that shown in FIG. 41A and obtained by using the fiber scope of the first embodiment.

When the rigid endoscope is used as an image transmission system, the suppressing characteristic for the color difference signals of the chromagain controller 22 in the chromasuppress circuit 23 is adjusted as illustrated in FIG. 41A. Spurious colors are made less noticeable by lowering the color difference signal output at intermediate frequencies in the frequency region within which the spurious colors have the highest tendency of production. Within the high frequency region, on the other-hand, output intensity of the color difference signals becomes high, but the optical low pass filter has very low response within this region, whereby the spurious colors can be made less noticeable (the actual response is different from that shown in FIG. 18A and FIG. 18B which are traced for making the principle easily understandable). For the TV system for endoscopes according to the present invention, it is important to control the suppressing characteristic in the vicinities of the spatial frequency of the optical fiber bundle. Since the spurious colors which are partially produced are eliminated electrically as described above, the cutoff frequency of the optical low pass filter can be set at a level higher than the conventional cut-off frequency. Further, since the intensity of the aperture signal is enhanced, images having higher resolution can be obtained by enhancing apparent response owing to the edge emphasizing effect.

When the rigid endoscope is switched to the fiber scope, an image guide fiber bundle is used as an image transmission system, and the contrast of the black-white edges of cores 2a and claddings 2b on the end surface of emergence of the image guide fiber bundle becomes high. Accordingly, the intensity of the aperture signal inevitably becomes high and an image formed by the fiber scope is discolored due to the color signal adjustment by the chromasuppress circuit 23. By manipulating the keyboard 29, for example, the suppressing characteristics for the color difference signals are switched so that the intensity of the color difference signals at the frequency spectrum fF produced due to the pattern of the end surface of emergence of the image guide fiber bundle is suppressed to 50% or higher as shown in FIG. 41B, or 90% or higher in the first embodiment. This adjustment is performed by lowering the enhanced gain so as to narrow an amplitude of the aperture signal when the circuit configuration shown in FIG. 37 is used. When intensity of the color difference signal output at a peak of the suppressing characteristic for the color difference signal output is higher than 50%, on the other hand, the frequency fc' is actually equal to the frequency at which the output intensity is 100% since the frequency fc' represents a highest value of the frequencies at which the output intensities are 50% or higher. Consequently, the discoloring phenomenon of images on the TV monitor 14 is prevented and images having high resolution are obtained when the fiber scope is used. Therefore, the first embodiment of the TV system for endoscopes according to the present invention allows the rigid endoscope and the fiber scope to be switched from one to the other, can enhance resolution on images obtained with the rigid endoscope, provides images having resolution on the order similar to that on the images obtained with the conventional TV system for endoscopes, and makes it possible to carry out surgical operations etc. adequately and speedily while observing diseased locations through endoscopes.

Figure 42:
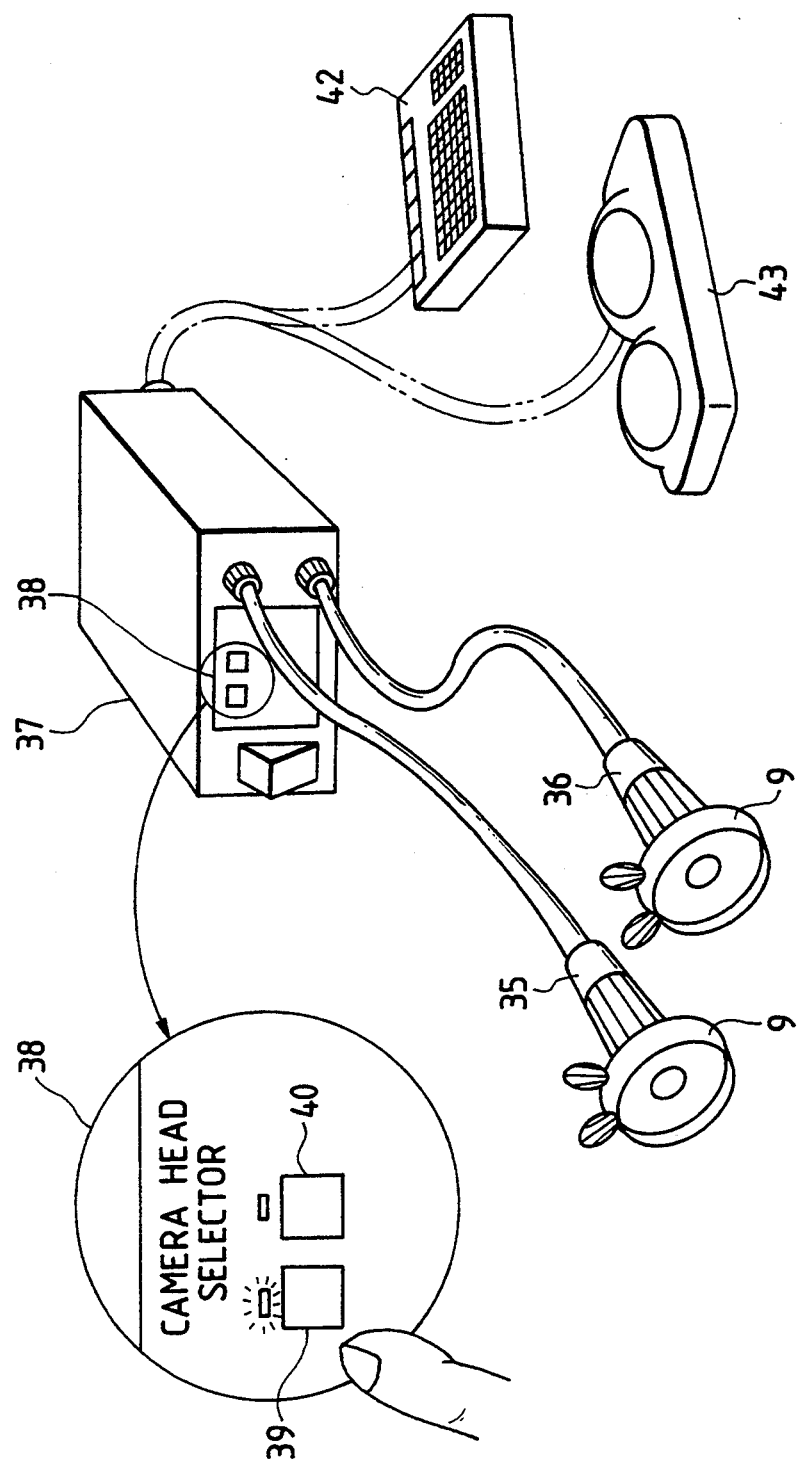
FIG. 42 is a perspective view illustrating main members of a second embodiment of the TV system for endoscopes according to the present invention.

Now, description will be made of the second embodiment of the TV system for endoscopes according to the present invention wherein two types of optical low pass filters are used selectively. FIG. 42 is a perspective view illustrating the main members of the second embodiment, wherein a camera head 35 having a built-in optical low pass filter for a rigid endoscope is attached to one of adaptors 9 to which a rigid endoscope 6 (not shown) is to be connected, and another camera head 36 comprising an optical low pass filter for a fiber scope is attached to another adaptor 9 to which a fiber scope 1 is to be connected. These two camera heads 35 and 36 are connected in parallel with each other to a camera control unit which comprises electrical circuits including a chromasuppress circuit 23.

The electrical circuits arranged in the camera control unit 37 are capable of varying an output intensity of the color difference signals dependently on frequencies contained in a picked up image by separating electrical signals output from solid-state image pickup device 12 into luminance information and color information, and feeding aperture signals generated from the luminance information back to the color information through the chromasuppress circuit 23. In order to improve the quality of images formed by the rigid endoscope, the suppressing characteristic for the color difference signals is adjusted by a chromagain controller 22 disposed in an aperture adjusting circuit so as to be a characteristic shown in FIG. 43A which is equal to that of the first embodiment illustrated in FIG. 41A. Disposed on the camera control unit 37 is a switch unit 38 which permits selecting signals from out of the two camera heads 35 and 36. This switch unit 38 is equipped with a switch 39 for allowing input of signals from the camera head 35 when the rigid endoscope is used and another switch 40 for allowing input of signals from the camera head 36 when the fiber scope is used. The switch unit 38 may be attached to the camera head 35 or 36, or may be composed as an external input unit such as a keyboard 42 as shown in FIG. 42 or a foot switch 43.

Figure 45A:
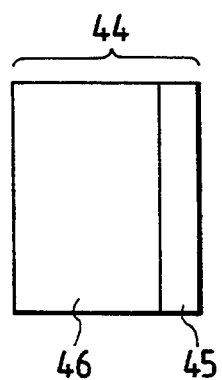
FIG. 45A is a schematic plan view illustrating an optical low pass filter for the rigid endoscope.
Figure 46:
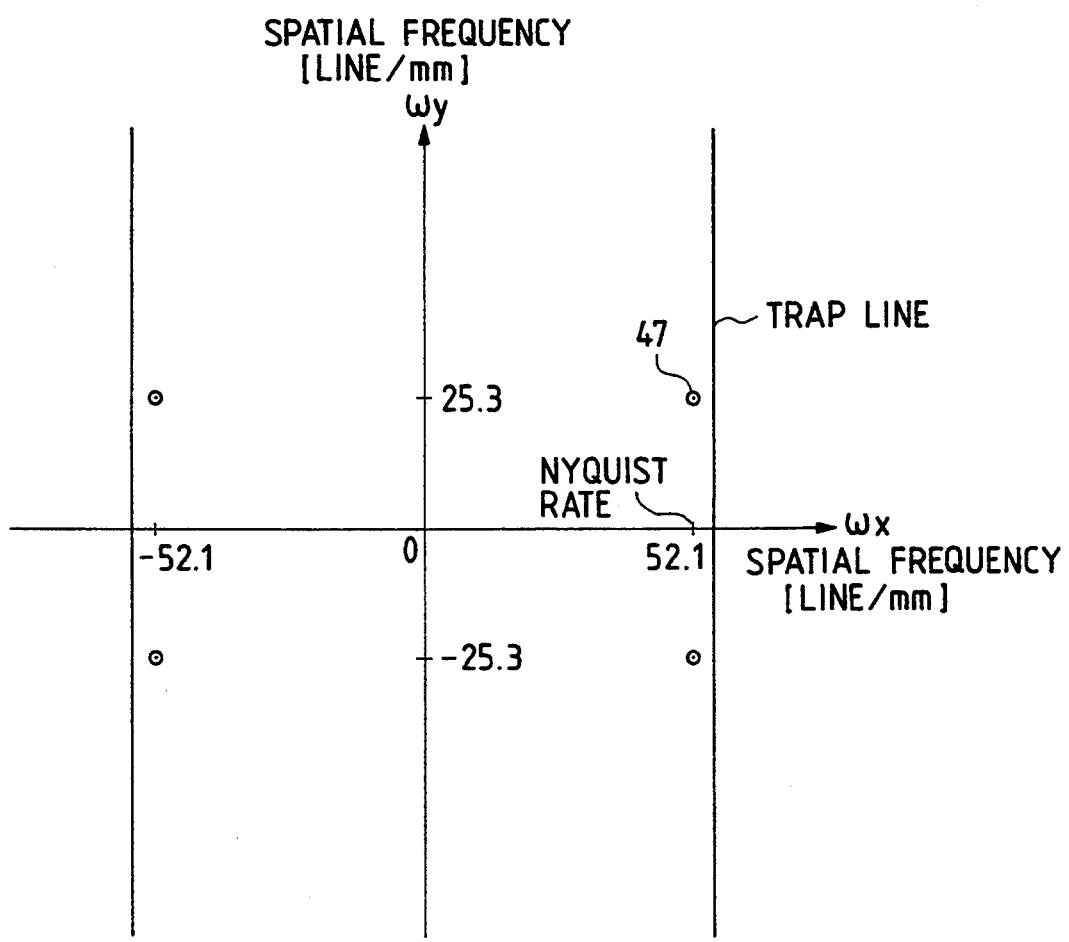
FIG. 46 is a diagram illustrating a trap characteristic of the optical low pass filter in FIG. 45A in a form traced on the two-dimensional frequency plane.
Figure 47A:
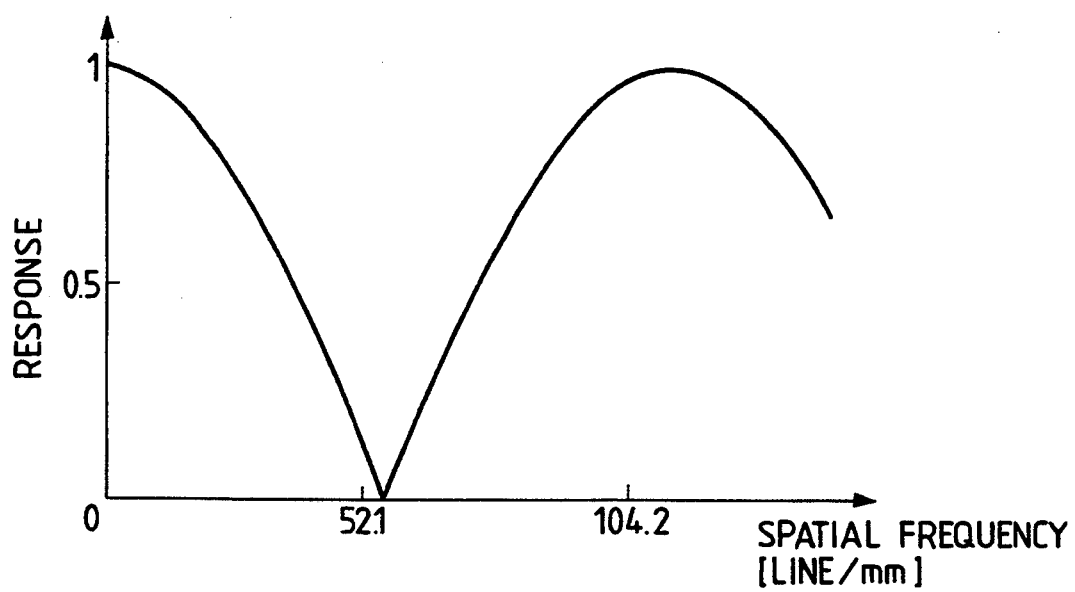
FIG. 47A is a graph illustrating the response, in the horizontal scanning direction, of the optical low pass filter shown in FIG. 45A.
Figure 47B:
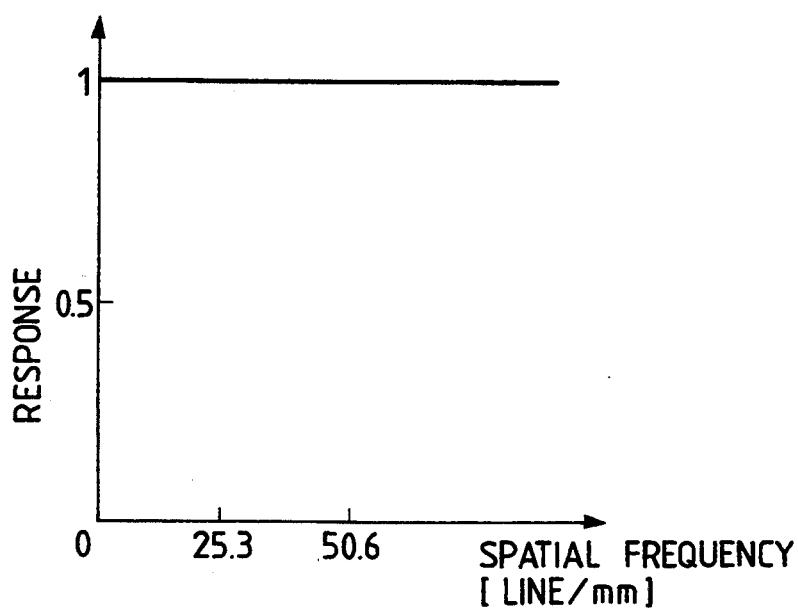
FIG. 47B is a graph illustrating the response, in the vertical scanning direction, of the optical low pass filter shown in FIG. 45A.

The optical low pass filter 44 built in the camera head 35 will be described below. This optical low pass filter 44 is composed of a single birefringent plate 45 and a glass plate 46 which is adopted for maintaining an optical path length constant as shown in FIG. 45A. The birefringent plate 45 is 1.51 mm thick and has a crystallographic axis set in the direction shown in FIG. 45B. This optical low pass filter 44 has a trap characteristic illustrated in FIG. 46. In this drawing, the reference symbols wx and wy represent two-dimensional frequency planes respectively; wx corresponding to the horizontal scanning direction. A point 47 indicating the location of moiré has a position which is deviated, from a standard position, for a distance of the width of two picture elements in the horizontal scanning direction and a distance of the length of four picture elements in the vertical direction on the solid-state image pickup devices 12. That is, the point 47 is located at (wx, wy)=(52.1, 25.3) (lines/mm), when a single picture element on the solid-state image pickup devices is 9.6 μm wide×9.9 μm long. The optical low pass filter 44 has a response in the horizontal direction and the vertical direction as illustrated in FIG. 47A and FIG. 47B respectively.

Though an optical low pass filter for rigid endoscopes has a cut-off frequency which is equal to the Nyquist frequency of 52.1 (lines/mm) in the horizontal scanning direction on solid-state image pickup devices, the second embodiment of the present invention uses the single birefringent plate 45 as the optical low pass filter 44 as described above and a cut-off frequency of this optical low pass filter 44 is set at 56.3 (lines/mm) which is located at a frequency higher than the Nyquist frequency of 52.1 (lines/mm) in the horizontal scanning direction of the solid-state images pickup devices 12. Since the camera control unit 37 comprises the chromasuppress circuit 23 for eliminating moiré, the second embodiment having the configuration described above can eliminate moiré sufficiently when the rigid endoscope is used. Therefore, the second embodiment enhances response at the Nyquist frequency and is capable of providing, on a TV monitor, images having contrast higher than that of the images obtained with the conventional TV systems for endoscopes.

Description will now be made of an optical low pass filter 48 for the fiber scope which is built in the camera head 36.

Figure 43A:
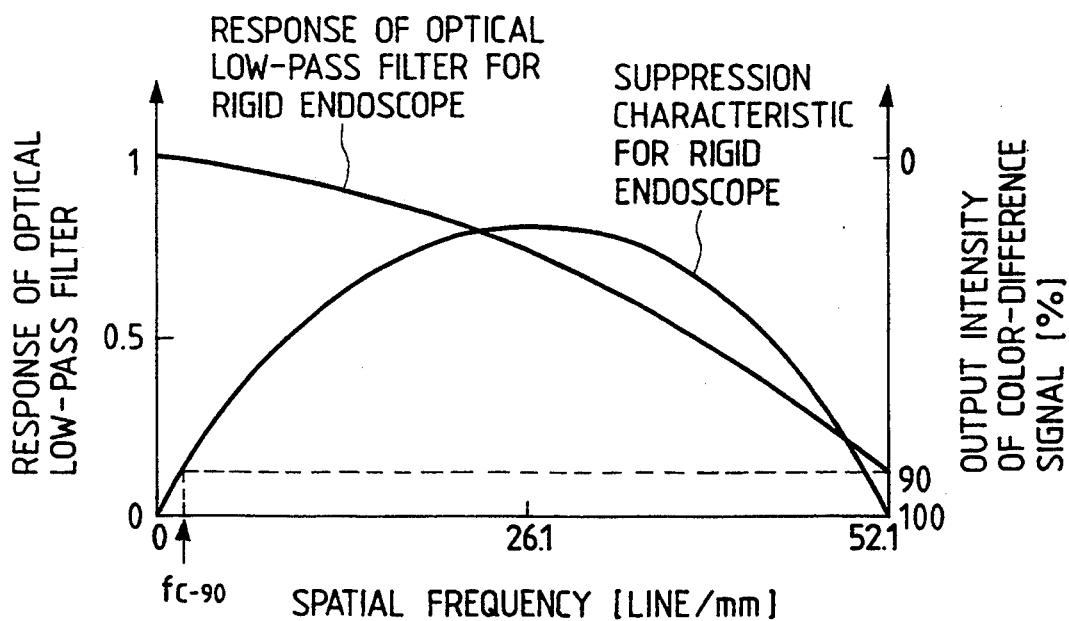
FIG. 43A and FIG. 43B show graphs illustrating the relationship which is similar to that shown in FIG. 41A and FIG. 41B and obtained in the second embodiment of the present invention.
Figure 48A:
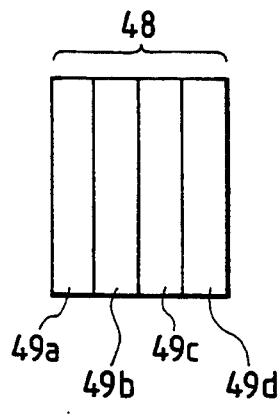
FIG. 48A is a schematic plan view illustrating an optical low pass filter for the fiber scope.
Figure 48B:
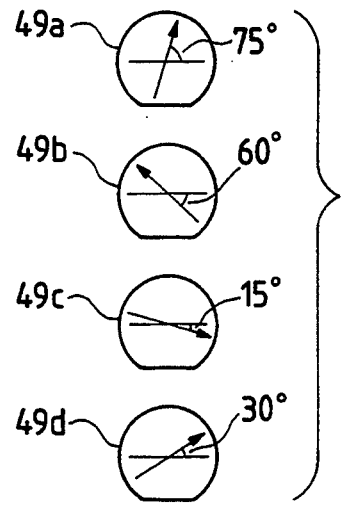
FIG. 48B shows diagrams illustrating the direction of crystallographic axes of birefringent plates to be used in the optical low pass filter shown in FIG. 48A.
Figure 49:
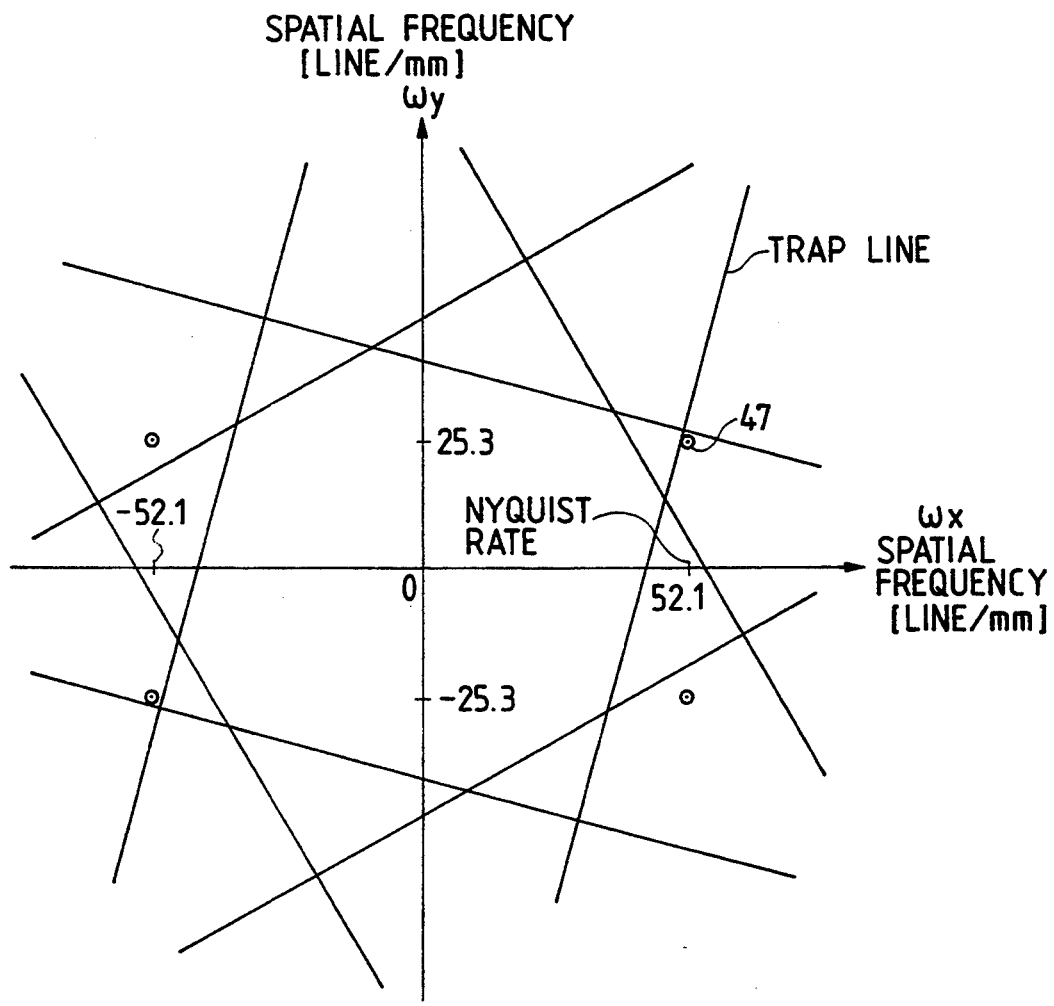
FIG. 49 is a diagram illustrating trap characteristics of the optical low pass filter shown in FIG. 48A in a form traced on the two-dimensional frequency plane.
Figure 50A:
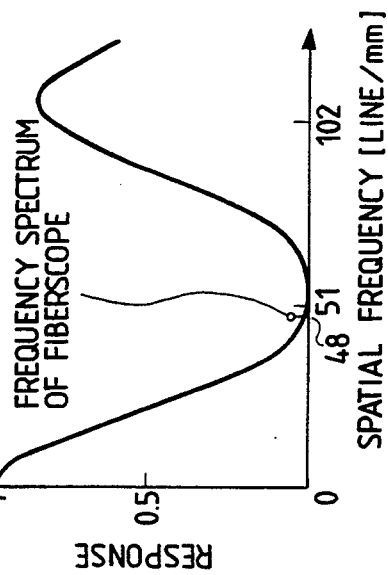
FIG. 50A is a graph illustrating the response, in the horizontal scanning direction, of the optical low pass filter shown in FIG. 48A.
Figure 50C:
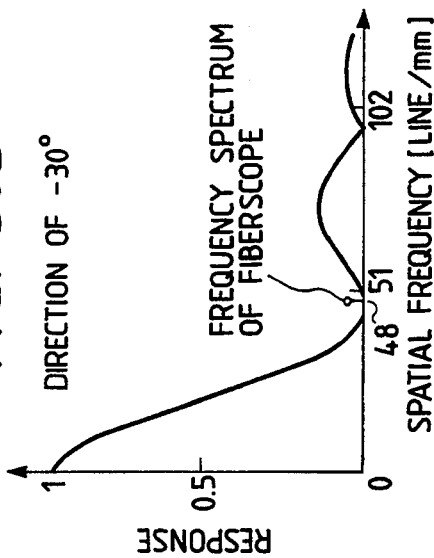
FIG. 50C is a graph illustrating the response of the optical low pass filter shown in FIG. 48A in a direction inclined 30° relative to a spatial frequency wx.
Figure 50B:
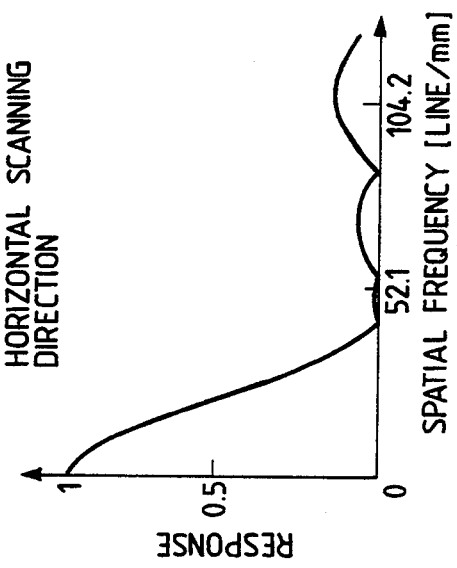
FIG. 50B is a graph illustrating the response, in the vertical scanning direction, of the optical low pass filter shown in FIG. 48A.
Figure 50D:
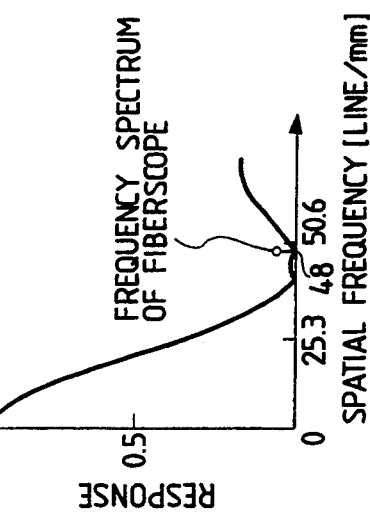
FIG. 50D is a graph illustrating the response of the optical low pass filter shown in FIG. 48A in a direction inclined −30° relative to the spatial frequency wx.

In the TV system for endoscopes preferred as the second embodiment of the present invention, the optical low pass filter 48 is used for obtaining TV images which are not discolored or have a quality on the order of that of the images provided by the conventional TV systems for endoscopes when an image of a fiber scope producing the spatial frequency fF≧48 (lines/mm) due to a fixed pattern thereof is picked up. This optical low pass filter 48 is composed of four birefringent plates 49a, 49b, 49c and 49d as illustrated in FIG. 48A which are 2.24 mm, 2.27 mm, 2 mm and 2.46 mm thick, respectively, and have crystallographic axes directed as shown in FIG. 48B. The directions shown in FIG. 48B are measured from the horizontal scanning direction. The optical low pass filter 48 has a trap characteristic illustrated in FIG. 49. When a fiber scope which produces the spatial frequency fF≧48 (lines/mm) due to a fixed pattern thereof is used, the optical low pass filter 48 exhibits response in the horizontal scanning direction and the vertical direction as shown in FIG. 50A and FIG. 50B respectively. Further, FIG. 50C and FIG. 50D show the response at the spatial frequency of wx in directions of +30° and −31° respectively which pass near the moiré point 47. Since the suppressing characteristic for the color difference signals is adjusted as illustrated in FIG. 43A for improving quality of images when the rigid endoscope is used, the optical low pass filter 48 is configured so as to have a cut-off frequency fL which is matched with the response characteristic and satisfies the following condition:

fL≦fF when fF is larger or equal than or to $f_{c-90}$ wherein the reference symbol $f_{c-90}$ represents a frequency at which the color difference signals have an output intensity of 90% and the reference symbol fF designates a frequency spectrum produced due to the fixed pattern of the image guide fiber bundle.

Figure 43B:
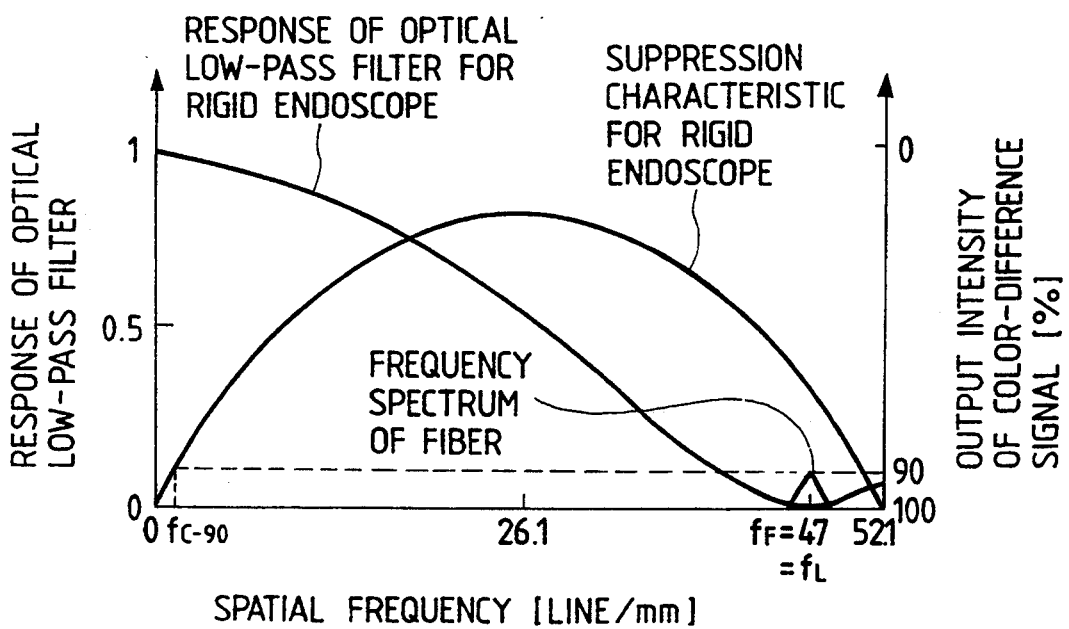
Figure 44:
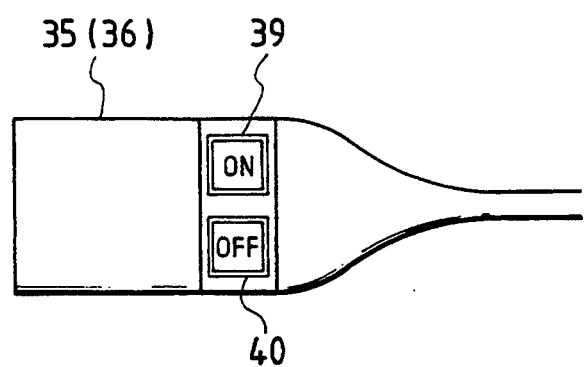
FIG. 44 is a plan view illustrating a modification of the second embodiment.

When the rigid endoscope 6 is selected by turning ON the switch 39 on the switch unit 38 disposed on the camera control unit 37, for example, in the second embodiment having the configuration described above, an image having passed through the relay lens system 7 of the rigid endoscope 6 is reimaged on the solid-state image pickup device 12 by an eyepiece lens system 4 and an imaging lens system 10 through the optical low pass filter 44 disposed in the camera head 35. This image is converted into electrical signals and input into the camera control unit 37 for electrically eliminating moiré by the chromasuppress circuit 23 disposed in the camera control unit 37. Further, since the cut-off frequency of the optical low pass filter is set higher than the Nyquist frequency in the horizontal scanning direction on the solid-state image pickup device 12, the second embodiment can enhance contrast as compared with that on images formed by a rigid endoscope in the conventional TV system for endoscopes. When the switch unit 38 is changed over as occasion demands, an image formed with the fiber scope is reimaged on the solid-state image pickup device 12 disposed in the camera head 36 and signals of the image are input into the camera control unit 37. In conjunction with the switching of the image transmission systems, the optical low pass filter 44 for the rigid endoscope is switched to the optical low pass filter 48 for the fiber scope. Upon this switching, the suppressing characteristic for the color difference signal outputs of the electrical circuit disposed in the camera control unit 37 is switched from that shown in FIG. 43A to that illustrated in FIG. 43B which is similar to the characteristic shown in FIG. 43B. However, since the optical low pass filter 48 satisfies the condition of fL≦fF when fF is larger of equal than or to $f_{c-90}$, the frequency spectrum fF is located in the vicinity of the Nyquist frequency fL and frequency fF inherent in the mesh pattern of the fiber scope is not resolved on the image surface, whereby unwanted aperture signals are not generated. Consequently, the image is not discolored and has a quality on the order to that of the images obtained with the conventional TV system for endoscopes. As is understood from the foregoing description, the second embodiment is also capable of enhancing the resolution on images formed by the rigid endoscope, preventing the phenomenon to discolor images when the fiber scope is selected and assuring resolution on the order of that on the images obtained with the conventional TV system for endoscopes. For the purpose of obtaining sufficiently desirable characteristic of the TV system for endoscopes, the second embodiment adopts $f_{c-90}$ at which the color difference signals have an output intensity of 90% in place of the spatial frequency fc at which the output intensity is 50% as the spatial frequency representing the response characteristic to the color difference signals for the rigid endoscope. It is sufficient for practical use, needless to say, to adopt the spatial frequency fc at which the color difference signals have an output intensity of 50% or higher. Even if moiré is produced by using the fiber scope described above, the moiré can be eliminated by defocusing images or increasing the number of the birefringent plates.

The low pass characteristic of the optical low pass filter can be obtained by using a spherical lenses or random phase plates in place of the birefringent plates. For obtaining the low pass characteristic by utilizing defocusing, it is allowable to dispose a click mechanism on a focus ring in the adaptor 9 at a location at which a desirable frequency characteristic is obtainable. Further, when a zoom lens system is used as the imaging lens system, the frequency spectrum fF of the optical fibers is changed on the image surface. In this case, the low pass characteristic can be adjusted so as to be matched with the frequency spectrum fF by using a liquid crystal cell or disposing a low pass filter before the zoom lens system.

Figure 51:
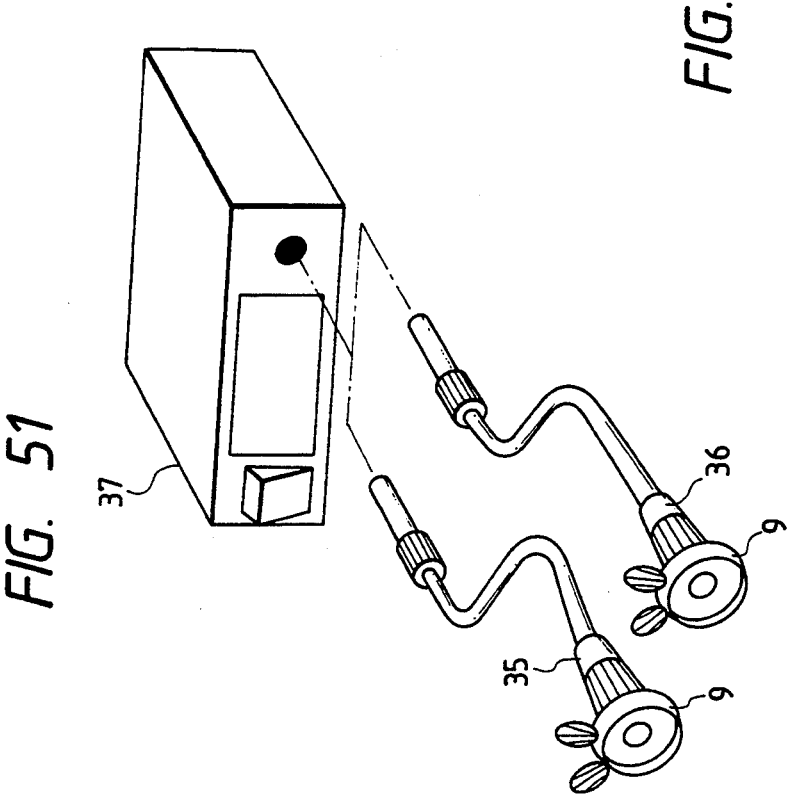
FIG. 51 is a perspective view illustrating a modification of the switching means for the optical low pass filters.

Though the two camera heads are selectively used in the second embodiment described above, it is possible to use three or more camera heads. Alternately, it is possible to dispose an input terminal on the camera control unit 37 so that output terminals of a plurality of camera heads can be connectable selectively, as shown in FIG. 51.

Figure 52A:
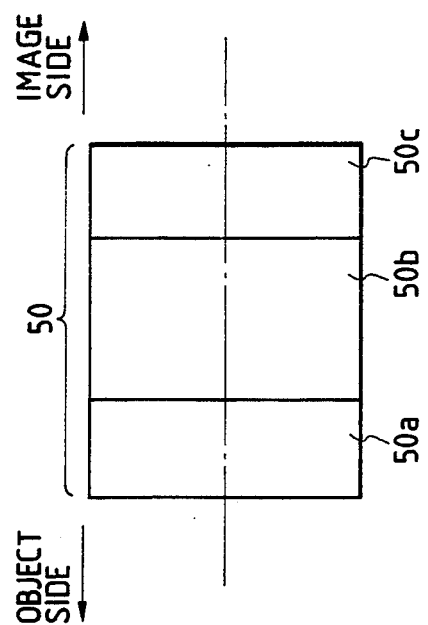
FIG. 52A is a schematic plan view illustrating an optical low pass filter to be used in a third embodiment of the TV system for endoscopes according to the present invention.
Figure 52B:
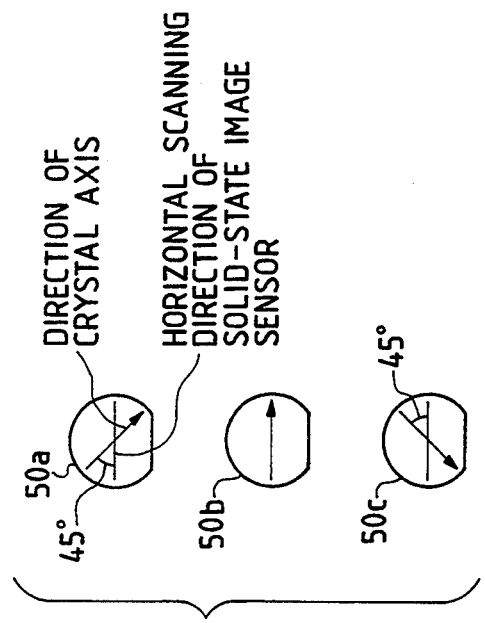
FIG. 52B shows diagrams illustrating direction of crystallographic axes of birefringement plates used in the optical low pass filter shown in FIG. 52A.

The third embodiment of the present invention, another example of the optical low pass filter for fiber scopes, will be described below with reference to FIG. 52A and FIG. 52B. In FIG. 52A, the reference numeral 50 represents an optical low pass filter which is composed of three birefringent plates 50a, 50b and 50c which are disposed in order from the object side, 1.67 mm, 2.88 mm and 1.67 mm thick respectively, and have crystallographic axes directed as illustrated in FIG. 52B.

Figure 53:
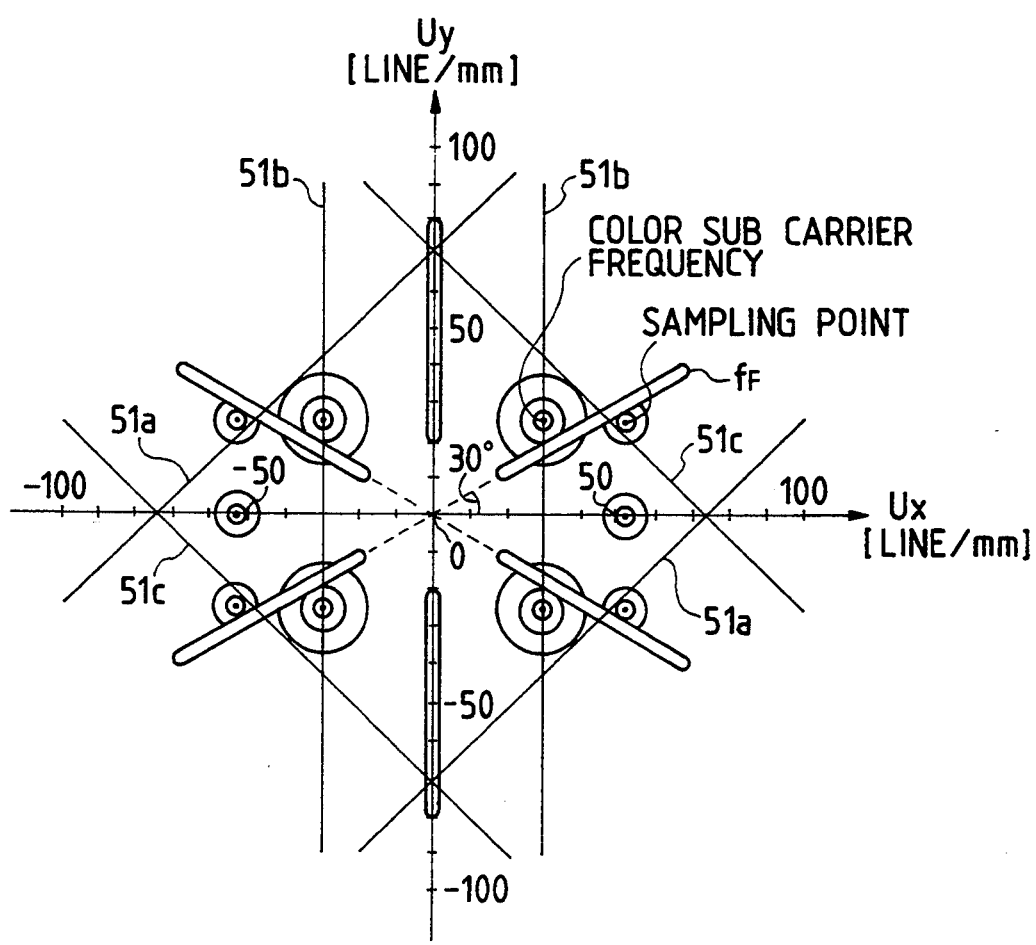
FIG. 53 is a diagram illustrating a trap characteristic of the optical low pass filter shown in FIG. 52A in a form traced on the two-dimensional frequency plane.

The optical low pass filter 50 having the configuration described above has a trap characteristic illustrated in FIG. 53. In this drawing, the reference symbols Ux and Uy represent two dimensional frequency planes respectively, and the trap lines 51a, 51b and 51c indicate frequencies at which response is lowered to 0% by the birefringent plates 50a, 50b and 50c respectively.

Further, a sampling point is located at a position corresponding to the width of two picture elements in the horizontal scanning direction on the solid-state image pickup device and the length of four picture elements in the vertical direction. Assuming that a single picture element is 9.6 μm wide×9.9 μm long on the solid-state image pickup device, the sampling point is located at (Ux, Uy)=(52.1, 25.3) (lines/mm). Further, assuming that the solid-state image pickup device is of the NTSC system, the color sub-carrier frequency is produced at a location of (Ux, Uy)=(29.5, 25.3) (lines/mm). The frequency spectrum fF contained in an image of the end surface of emergence of an image guide fiber bundle can have value up to approximately 20 to 80 (lines/mm).

As is apparent from FIG. 53, the trap line 51b is set so as to pass the vicinity of the color sub-carrier frequency taking into consideration a case where the frequency spectrum fF exists in the vicinity of the color sub-carrier frequency. Further, even when the frequency spectrum fF exists in the vicinity of the sampling point, the intensity of the frequency spectrum can be attenuated sufficiently by the trap lines 51a and 51c. Since the trap line is set so as to pass also the vicinity of the color sub-carrier frequency, a moiré eliminating effect sufficient for practical use can be obtained by using only three birefringent plates which are relatively expensive though resolution is slightly degraded in the horizontal scanning direction.

By using the optical low pass filter having the configuration described above, it is possible to prevent moiré from being produced when the fiber scope is selected. Similar response can be obtained by using a spherical lenses, phase filters or the similar means in place of the birefringent plates 50a, 50b and 50c.

Figure 54A:
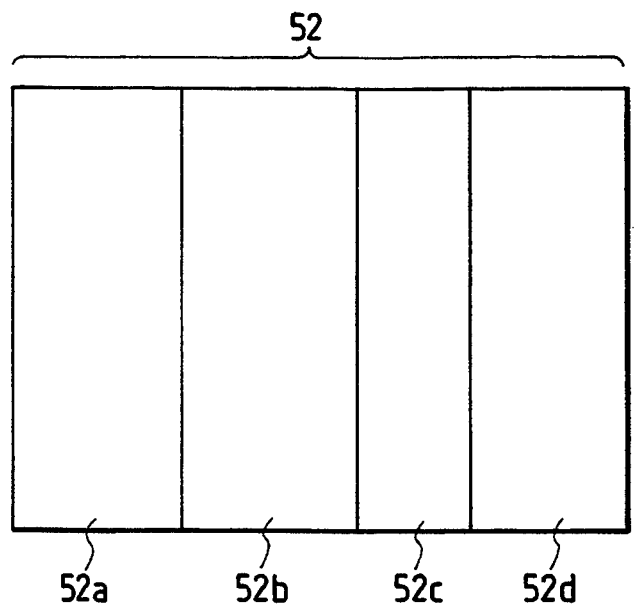
FIG. 54A is a schematic plan view illustrating an optical low pass filter to be used in a fourth embodiment of the TV system for endoscopes according to the present invention.
Figure 54B:
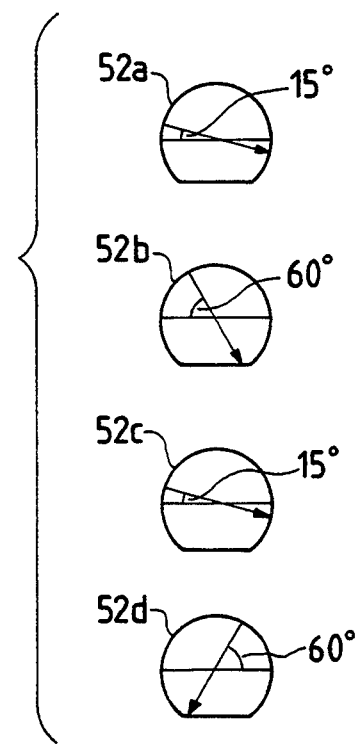
FIG. 54B shows diagrams illustrating directions of crystallographic axes of birefringent plates used in the optical low pass filter shown in FIG. 54A.

FIG. 54A and FIG. 54B illustrate an optical low pass filter for a fiber scope which is to be used in the fourth embodiment of the TV system for endoscopes according to the present invention. In FIG. 54A, the reference numeral 52 represents the optical low pass filter which is composed of four birefringent plates 52a, 52b, 52c and 52d disposed in order from the object side, and 2.7 mm, 2.7 mm, 1.7 mm and 2.3 mm thick respectively. These birefringent plates have directions of crystallographic axes illustrated in FIG. 54B.

Figure 55:
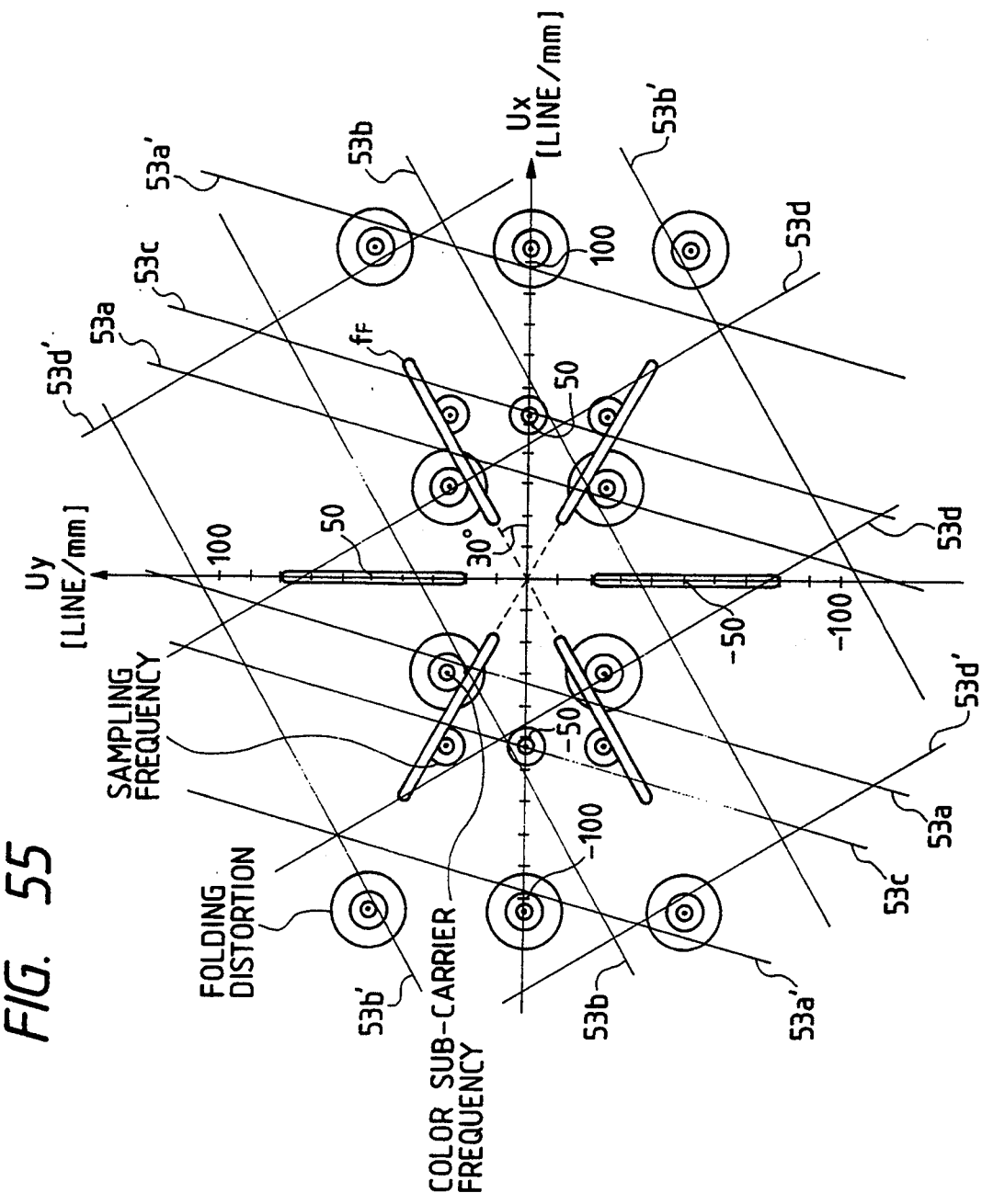
FIG. 55 is a diagram illustrating a trap characteristic of the optical low pass filter shown in FIG. 54A in a form traced on the two-dimensional frequency plane.

The optical low pass filter 52 having the configuration described above has a trap characteristic illustrated in FIG. 55. In FIG. 55, the reference symbols Ux and Uy represent two dimensional frequency planes respectively, and the trap lines, 53a, 53b, 53c and 53d indicate frequencies at which response is lowered to 0% by the birefringent plates 52a, 52b, 52c and 52d respectively Further, the trap lines 53a', 53b', 53c' and 53d' are obtained by repeating the trap lines 53a, 53b, 53c, and 53d respectively for preventing folding noise. Furthermore, all of the sampling point, the color sub-carrier frequency and the frequency spectrum fF contained in a image of end surface of emergence of the image guide fiber bundle are same as those used in the first embodiment.

Owing to the optical low pass filter having the configuration described above, the trap lines 53a, 53b, 53c and 53d passing through the color sub-carrier frequency and the sampling point perform a function which is similar to that of the optical low pass filter 50 used in the third embodiment described above, and the folding noise can be prevented by utilizing the repeating effect of the trap lines when all of the directions of the crystallographic axes of the birefringent plates are inclined.

Figure 56A:
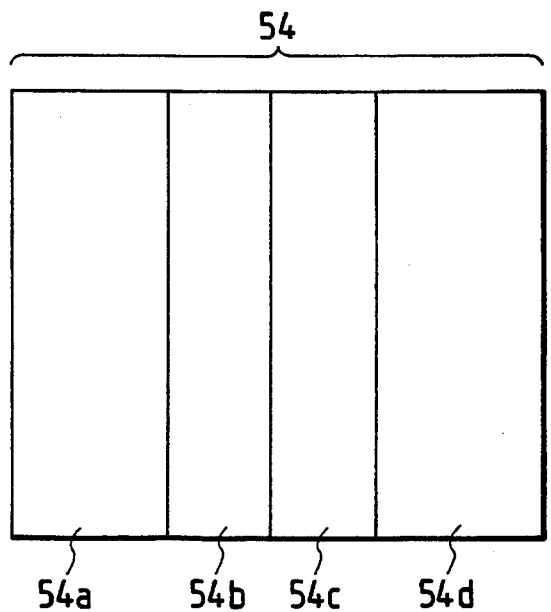
FIG. 56A is a schematic plan view illustrating an optical low pass filter to be used in a fifth embodiment of the TV system for endoscopes according to the present invention.
Figure 56B:
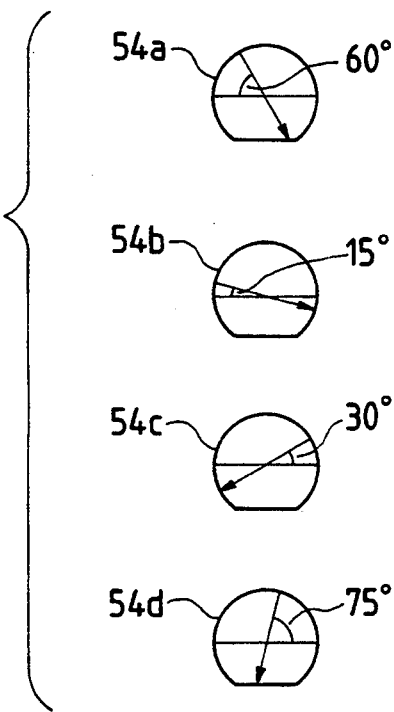
FIG. 56B shows diagrams illustrating directions of crystallographic axes of birefringent plates used in the optical low pass filter shown in FIG. 56A.

FIG. 56A and FIG. 56B illustrate an optical low pass filter according to a fifth embodiment of the TV system for endoscopes according to the present invention. In FIG. 56A, the reference numeral 54 represents an optical low pass filter composed of four birefringent plates 54a, 54b, 54c and 54d which are 2.52 mm, 1.52 mm, 1.63 mm and 2.62 mm thick respectively in order from the object side. These birefringent plates have crystallographic axes directed as shown in FIG. 56B.

Figure 57:
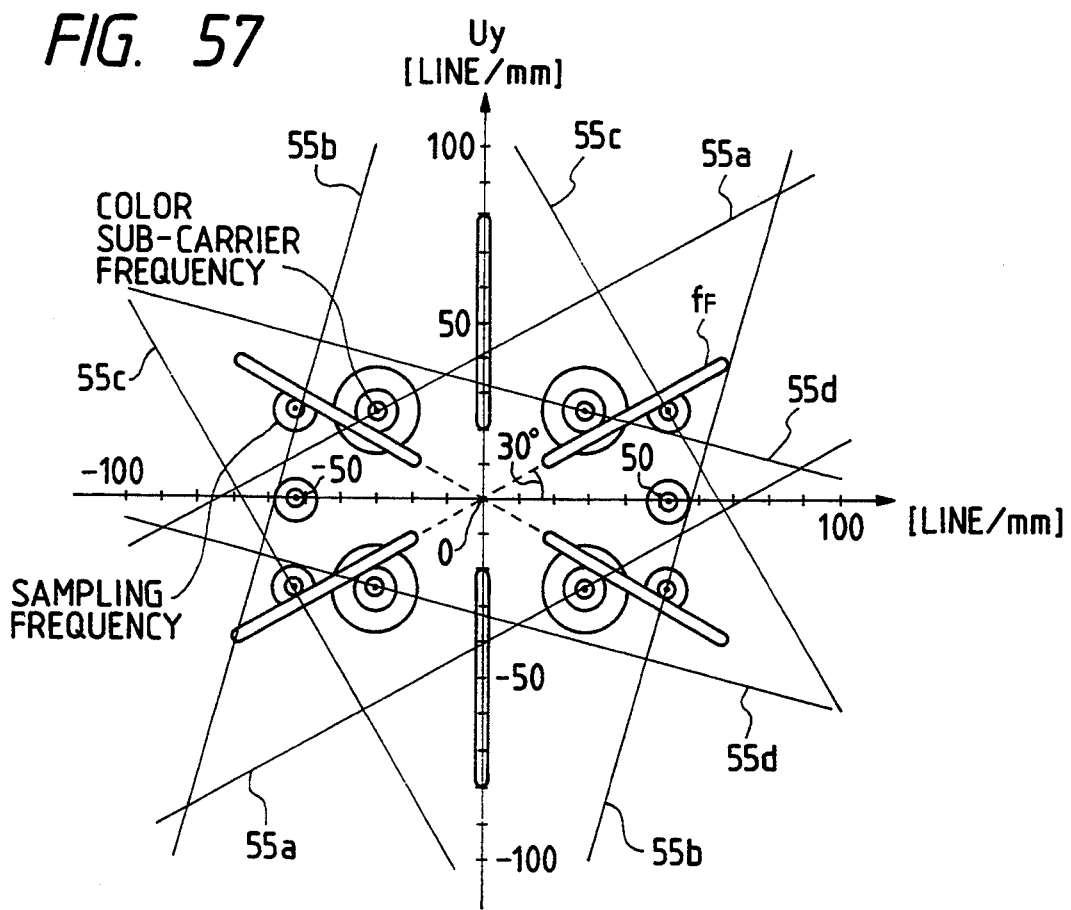
FIG. 57 is a diagram illustrating a trap characteristic of the optical low pass filter shown in FIG. 56A in a form traced on the two-dimensional frequency plane.
Figure 58:
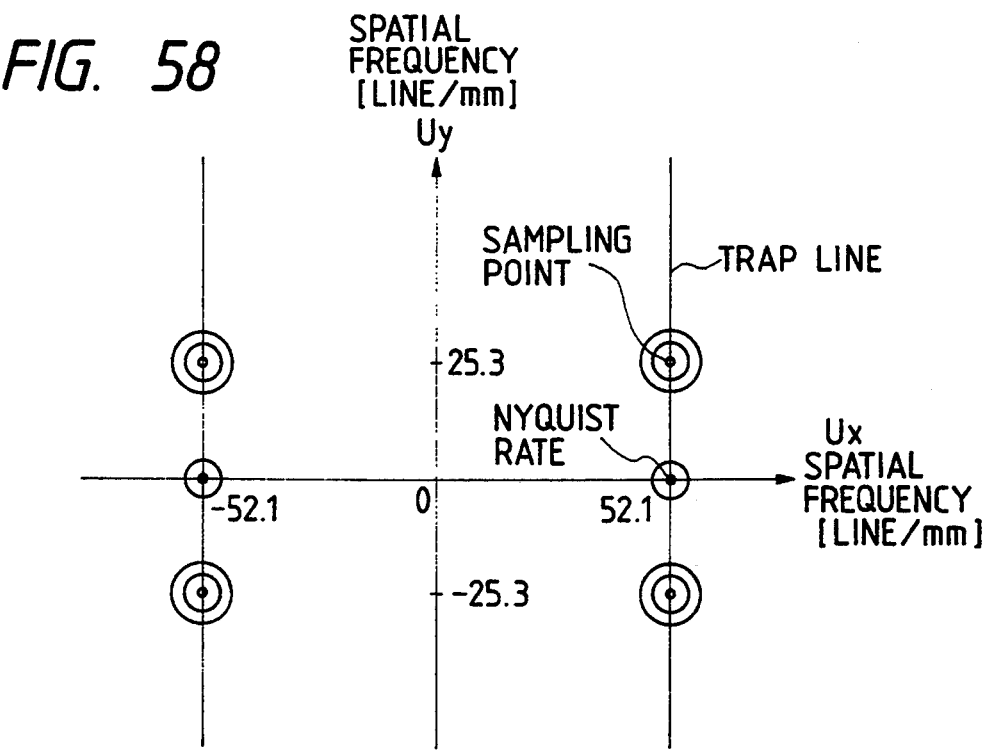
FIG. 58 is a diagram illustrating a trap characteristic of an optical low pass filter used in a sixth embodiment of the TV system for endoscopes according to the present invention.

The optical low pass filter 54 having the configuration described above has a trap characteristic illustrated in FIG. 57. In this drawing, the reference symbols Ux and Uy represent two dimensional frequency planes respectively, and the trap lines 55a, 55b, 55c and 55d indicate frequencies at which response is lowered to 0% by the birefringent plates 54a, 54b, 54c and 54d respectively. Further, all of the sampling point, the color sub-carrier frequency and the frequency spectrum contained in an image of an end surface of emergence of an image guide fiber bundle are the same as those adopted for the third embodiment.

In the fifth embodiment wherein different trap lines pass through the color sub-carrier frequency and the sampling point, the intensity of the frequency spectrum fF existing in each frequency can be attenuated effectively without lowering the response in the horizontal scanning direction unnecessarily.

Now, the sixth embodiment of the present invention will be described with reference to FIG. 42 and FIG. 51. As is already described above with reference to FIG. 51, electrical circuits for obtaining electrical matching with the camera control unit 37 are disposed in the TV camera heads 35 and 36 so that electrical characteristic can be adjusted for matching with the camera control unit 37. In the TV system for endoscopes illustrated in FIG. 42, the electrical characteristic can be adjusted on the side of the TV camera heads 35 and 36 to keep color reproducibility unchanged by connecting the plurality of camera heads 35 and 36 to the single camera control unit 37, and a plurality of TV camera heads can be connected to the single camera control unit 37 at the same time. In this case, a switch unit 38 is disposed on the camera control unit 37 for selecting one of the camera heads which is to process signals in this case since signals output from the plurality of TV camera heads are processed with a single signal processing system. The configuration in which a plurality of TV camera heads are usable simultaneously as described above provides a merit in that the camera heads can be easily switched from one to the other during a surgical operation, or a surgical operation can be carried out without interruption by using a normal camera head if the other camera head becomes abnormal.

Figure 45B:
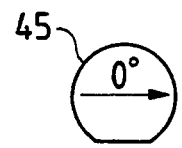
FIG. 45B is a diagram illustrating a direction of crystallographic axis of a birefringent plate to be used in the optical low pass filter shown in FIG. 45A.

As optical low pass filters which are optimum for use in the sixth embodiment, the optical low pass filters having the configurations described with reference to the third to fifth embodiments can be used as those for the fiber scope, and the optical low pass filters illustrated in FIG. 45A and FIG. 45B can be used as those for the rigid endoscope. The optical low pass filter 44 is composed of a single birefringent plate having the direction of crystallographic axis shown in FIG. 45B and a cut-off frequency set at the Nyquist frequency 52.1 (lines/mm) of the solid state image pickup device. The reference numeral 46 represents a glass plate used for adjusting an optical path length.

In the sixth embodiment, the Nyquist frequency is calculated as 52.1 (lines/mm) when solid-state image pickup device having picture elements each of which measures Px=9.6 μm in the horizontal direction by Py=9.9 μm in the vertical direction, for example, is used. Accordingly, an image having passed through the optical low pass filter for the fiber scope has a contrast of nearly 0% at 29.5 (lines/mm), whereas the response of the optical low pass filter for the rigid endoscope at 3.58 MHz is very high as calculated below:

MTF (3.58 MHz)=cos $\{(\pi/2) \times (29.5/52.1)\}$=63%

Therefore, the sixth embodiment permits full use of the merit obtained by arranging picture elements densely on the solid state image pickup device. Further, the sixth embodiment wherein the TV camera heads are exchangeable with each other prevents the TV camera heads from being enlarged and the image quality from being degraded by dust entering the TV system for endoscopes.

FIG. 59A is a perspective view illustrating the main parts of a rigid endoscope which is to be used exclusively for observation on a TV monitor and uses an imaging lens system 9 for connecting a TV camera head 36 comprising an optical low pass filter exclusively for the rigid endoscope directly to the rigid endoscope from which an eyepiece 56 is removed. Further, FIG. 59B is a perspective view illustrating the main parts of a fiber scope which is to be used exclusively for observation on a TV monitor and adopts an imaging lens system 9 for connecting a TV camera heads 35 comprising an optical low pass filter exclusively for the fiber scope to the fiber scope from which eyepiece 56 is removed.

Figure 60A:
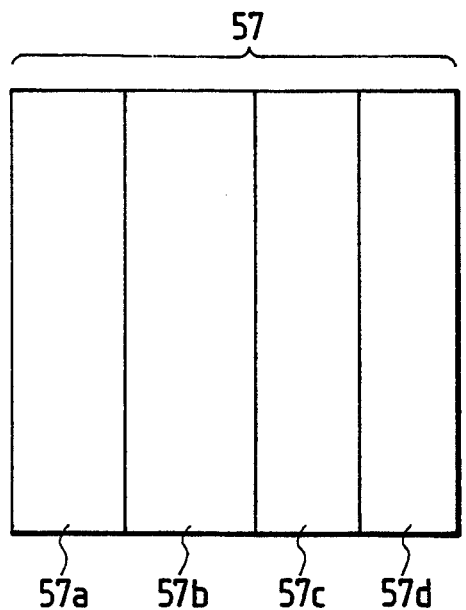
FIG. 60A is a schematic plan view illustrating an optical low pass filter to be used in a seventh embodiment of the TV system for endoscopes according to the present invention.
Figure 60B:
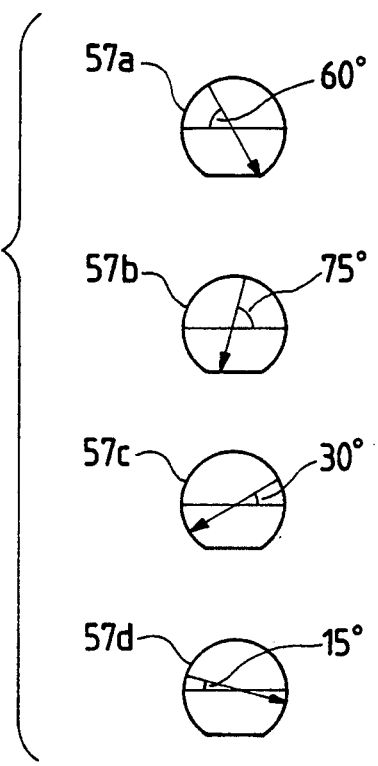
FIG. 60B shows diagrams illustrating directions of crystallographic axes of birefringent plates used in the optical low pass filter shown in FIG. 60A.
Figure 61:
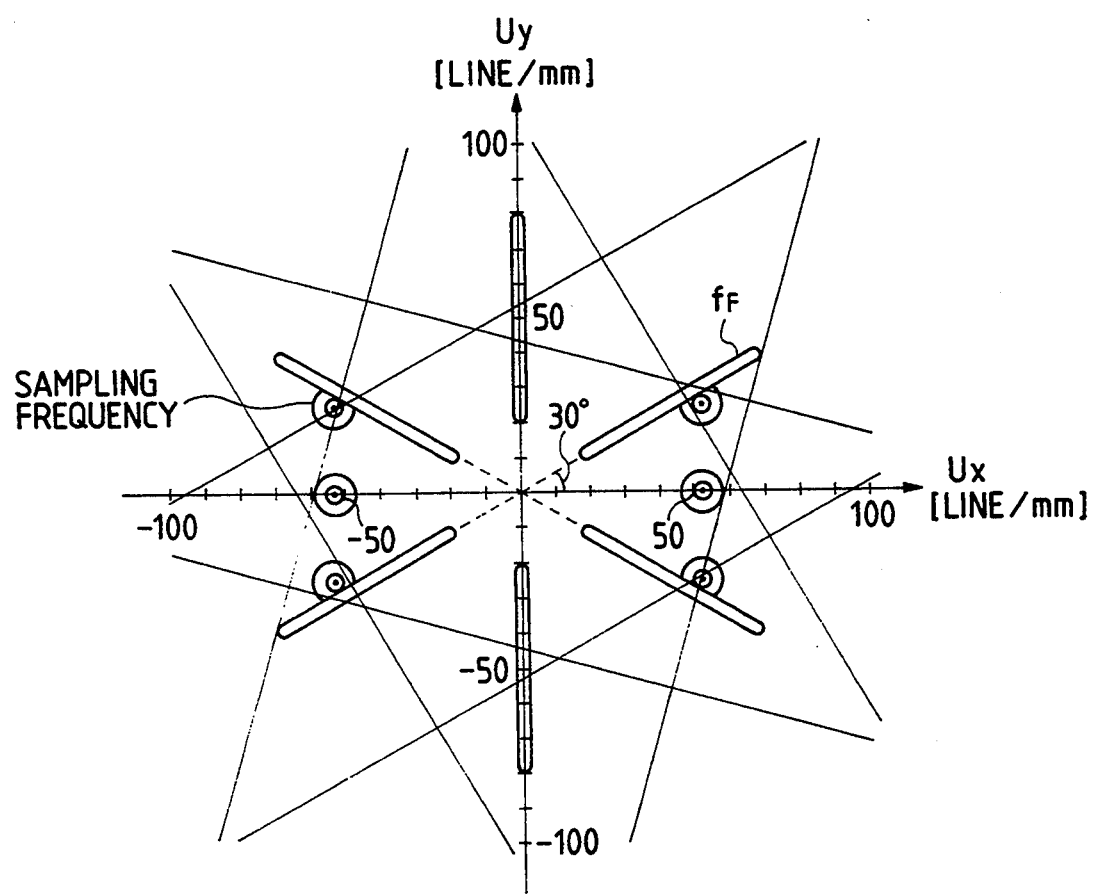
FIG. 61 is a diagram illustrating a trap characteristic of the optical low pass filter shown in FIG. 60A in a form traced on the two-dimensional frequency plane.

As a seventh embodiment of the present invention, still another example of an optical low pass filter for fiber scopes will be described below with reference to FIG. 60A and FIG. 60B. In FIG. 60A, the reference numeral 57 represents an optical low pass filter composed of four birefringent plates 57a, 57b, 57c and 57d which are 1.81 mm, 1.98 mm, 1.57 mm and 1.51 mm thick respectively in order from the object side. These birefringent plates have crystallographic axes directed as illustrated in FIG. 60B. FIG. 61 illustrates a trap characteristic of the optical low pass filter. In FIG. 61, both of the sampling point and the frequency spectrum fF contained in an image of an end surface of emergence of an image guide bundle are the same as those in the third embodiment.

By combining the optical low pass filter having the characteristic illustrated in FIG. 61 with the electrical or mechanical means described above, it is possible to make use of the merit obtained by arranging picture elements densely on the solid state image pickup device so as to obtain images excellent in both resolution and contrast. The above-mentioned electrical and mechanical means are applicable to all types of composite TV signal outputs: NTSC, PAL, SECAM and other systems including, for example, HD-TV. As another means for electrically eliminating moiré when a fiber scope is used, a still image recorder which records images formed by endoscopes and converted into video signals by solid-state image pickup devices can be used. When the images recorded by the still image recorder in a form of video signals are reproduced by using a video scope or a printer, the chroma of moiré is lowered and moiré is made less noticeable when the fiber scope used.

Figure 62A:
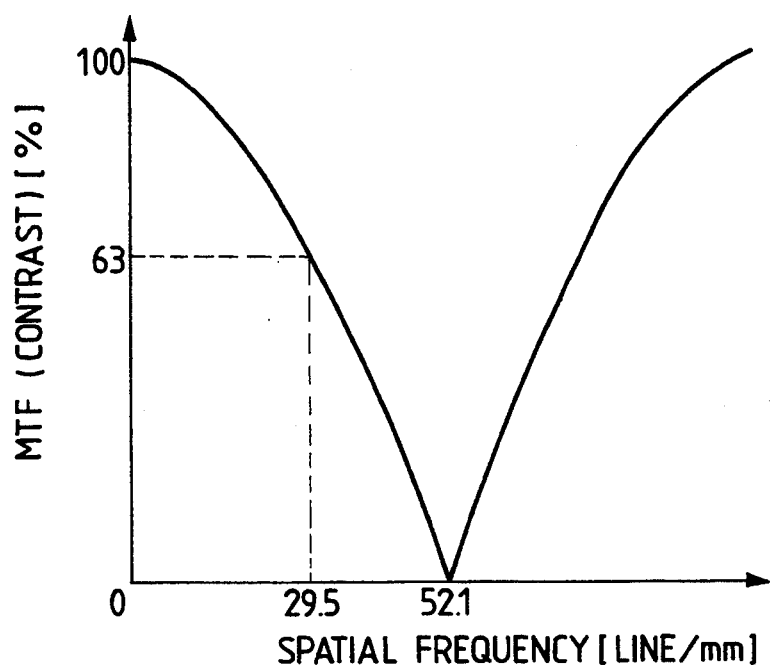
FIG. 62A is a graph illustrating a frequency characteristic of an optical low pass filter having a cut-off frequency set at the Nyquist frequency limit.
Figure 62B:
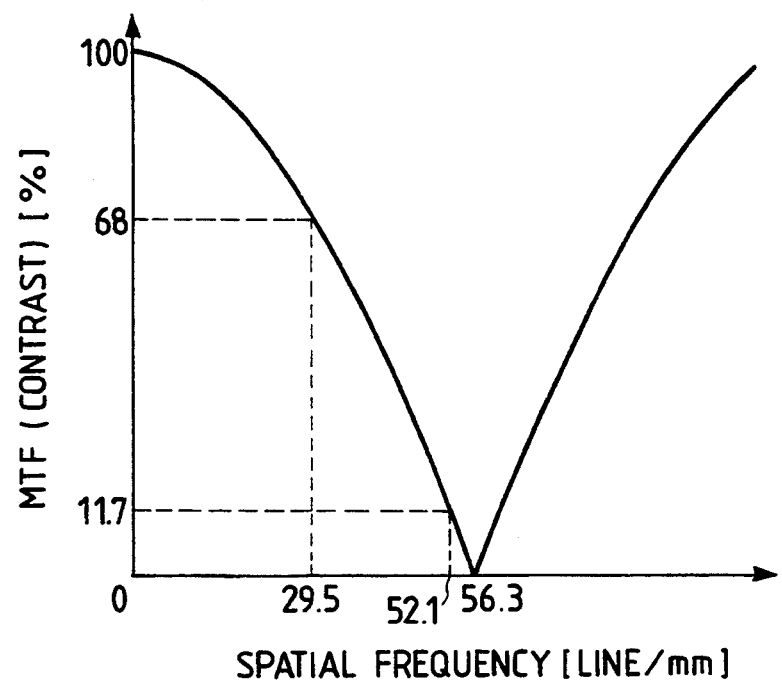
FIG. 62B is a graph illustrating a frequency characteristic of an optical low pass filter having a cut-off frequency set at a level exceeding the Nyquist frequency limit.

Finally, still another example of a TV system for endoscopes which uses a camera control unit comprising a chromasuppress circuit 23 will be described below as an eighth embodiment of the present invention. The camera control unit comprising the chromasuppress circuit 23 has already been described above with reference to FIG. 32A, FIG. 32B, FIG. 32C, FIG. 37A and FIG. 7B. When this camera control unit is used, it is possible to obtain the spurious color eliminating effect high enough for practical use by adopting an optical low pass filter having a cut-off frequency set at 56.3 (lines/mm) as shown in FIG. 2B in place of the optical low pass filter which has the cut-off frequency set at the Nyquist frequency of 52.1 (lines/mm) of the solid-state image pickup device as shown in FIG. 62A.

When a response obtained by using a solid-state image pickup device outputting signals of NTSC system is 63%, for example, response becomes as calculated below: MTF (3.58 MHz)=cos /2)×(29.5/56.3))=68% and contrast can be enhanced entirely by using the camera control unit and the optical low pass filter described above.

Further, a response which is 0% at the Nyquist frequency of the solid-state image pickup device is as calculated below: MTF (52.1 lines/mm)=cos {($\pi$/2)×(29.5/56.3))=15% and resolution can also be enhanced.

In addition, though the optical low pass filter used in the camera control unit comprising the chromasuppress circuit 23 has the cut-off frequency set at 56.3 (lines/mm), the optical low pass filter may have a cut-off frequency set at an optional level higher than the Nyquist frequency of the solid-state image pickup device or may not be used so far as the optical low pass filter has an optical characteristic which is matched with the characteristic of the chromasuppress circuit 23 and allows no noticeable spurious colors to be produced when the rigid endoscope is selected.

By using the camera control unit comprising the chromasuppress circuit 23 as described above, it is possible to obtain an effect which is higher than that obtainable by arranging picture elements densely on the solid-state image pickup device, enhancing both resolution and contrast. When an image containing a lot of high-frequency components is picked up and signals of the image are processed, however, aperture signals having a large amplitude are output, whereby the images become non-chromatic.

Figure 63:
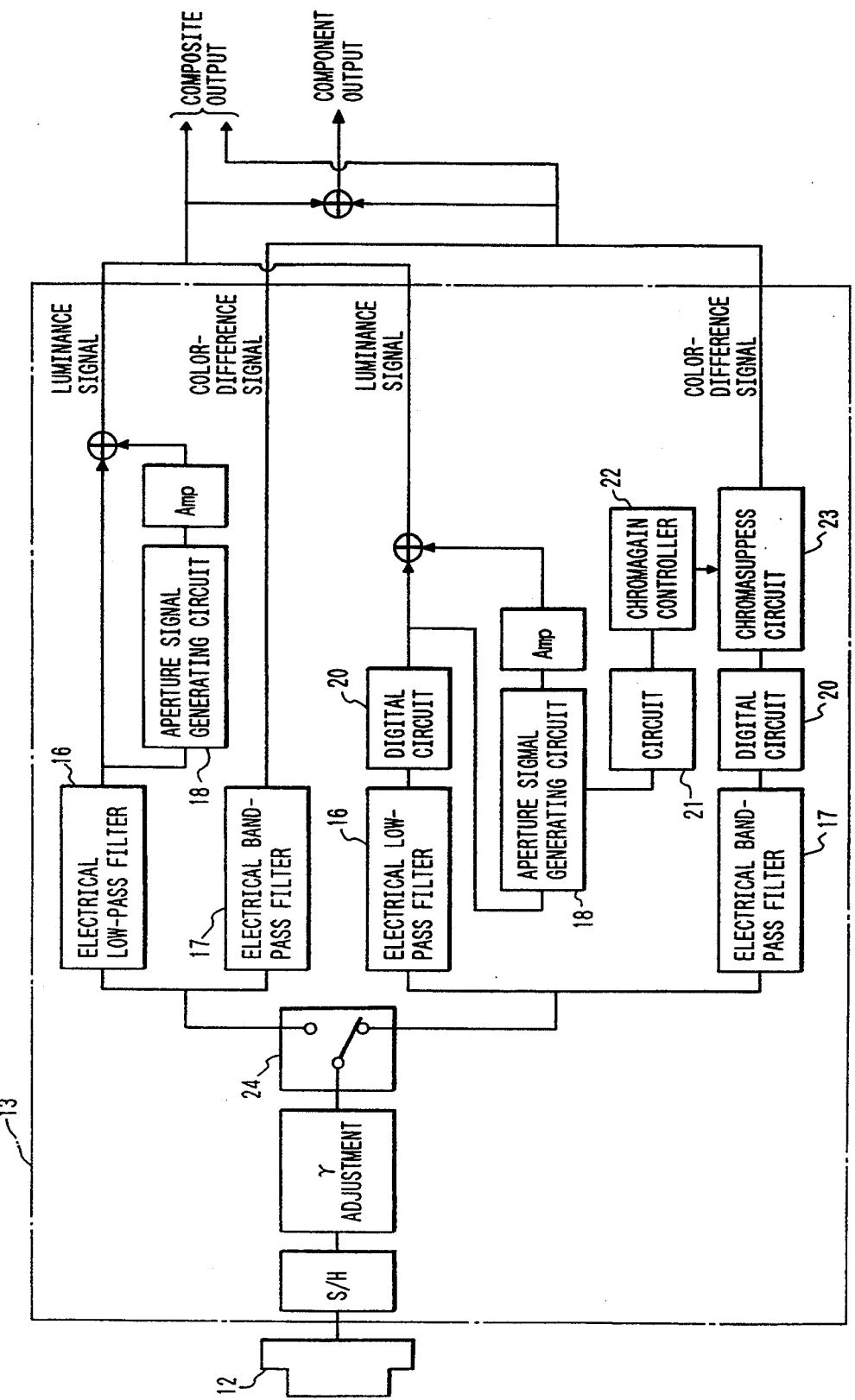
FIG. 63 is a block diagram illustrating a TV signal generating circuit to be used in an eighth embodiment of the TV system for endoscopes according to the present invention.

FIG. 63 is a block diagram illustrating the main members of the camera control unit used in the eighth embodiment. In FIG. 63, a camera control unit 13 comprises a chromasuppress circuit 23 and an electrical circuit, and a switch 24 selects one of these circuits into which video signals are to be input. Though the switch 24 is disposed at a stage next to the solid state image pickup device 12 in FIG. 63, the switch 24 may be disposed at an adequate location within a range from the input side of the solid-state image pickup device to a cathode-ray tube of a TV monitor.

The eighth embodiment, which comprises the switch 24 capable of selecting the functions of the chromasuppress circuit 23 dependently on the endoscope adopted, it is capable of preventing images from being discolored as described above. It is desirable to use any switching method which permits selecting the functions of the chromasuppress circuit as desired by an operator. Further, it is possible to select an operating condition of the chromasuppress circuit 23 the moment an endoscope is connected to the TV system for endoscopes by discriminating the types of endoscopes and feeding the discriminating information to the switch 24.

What is claimed is:

1. A TV system for an endoscope of a type having an endoscopic image appearing on an exit end face of an image guide fiber bundle of the endoscope and having said image formed on a solid-state image pickup device to enable said endoscopic image to be observed on a monitoring television screen, said TV system comprising:

an optical element having such optical characteristics that a frequency spectrum inherent in said image guide fiber bundle and existing within a first domain of substantially ±0.5 MHz in relation to a color sub-carrier frequency on a two-dimensional spatial frequency plane is damped to 40% or less within said first domain and having such optical characteristics that a spectrum inherent in said image guide fiber bundle and existing within a second domain of substantially ±0.5 MHz in relation to a sampling frequency of said solid-state image pickup device is damped to 40% or less within said second domain is arranged in a light path used for forming said endoscopic image on said solid state image pickup device.

2. A TV system for endoscopes capable of alternatively being connected to a fiber scope including therein an image guide fiber bundle and to a non-flexible endoscope including therein a relay lens system, comprising:

an image forming optical system, forming an endoscopic image obtained by said fiber scope or said non-flexible endoscope on a solid-state image pickup device; and a camera control unit for converting an electric output signal from said solid-state image pickup device into a television signal to display a picture on a monitoring television screen;

a first optical element having such optical characteristics that a frequency spectrum inherent in said image guide fiber bundle and existing within a first domain of substantially ±0.5 MHz in relation to a color sub-carrier frequency on a two-dimensional spatial frequency plane is damped to 40% or less within said first domain and having such optical characteristics that a spectrum inherent in said image guide fiber bundle and existing within a second domain of substantially ±0.5 MHz in relation to a sampling frequency of said solid-state image pickup device is damped to 40% or less within said second domain; and a second optical element having such optical characteristics that a spatial frequency response of said image forming optical system in said sampling frequency of said solid-state image pickup device is damped;

said first and second optical elements being selectively arranged in an optical path used for forming said endoscopic image on said solid-state image pickup device.

3. A TV system for endoscopes so arranged that an endoscopic image appearing on an exit end face of an image guide fiber bundle is formed on a solid-state image pickup device, and an electric output signal from said solid-state image pickup device is converted to one of a composite television signal and a component television signal, to display a picture on a monitoring television screen, wherein said TV system comprises electric means for alternating television signals in such manner that a picture is displayed on said monitoring television screen by said component television signal when a frequency spectrum inherent in said image guide fiber bundle exists within a domain of substantially ±0.5 MHz in relation to a color sub-carrier frequency of said composite television signal on a two-dimensional spatial frequency plane, and that by said composite television signal when said frequency spectrum does not exist within said domain in relation to said color sub-carrier frequency.

4. A TV system for endoscopes so arranged that an endoscopic image appearing on an exit end face of an image guide fiber bundle having a hexagonal close-packed structure is formed on a solid-state image pickup device, and an electric output signal from said solid-state image pickup device is converted to a composite television signal to display a picture on a monitoring television screen, wherein a relative position of said image guide fiber bundle and said solid-state image pickup device is selected so that an angle between an arrangement direction of fibers of said image guide fiber bundle and a horizontal scanning direction of said solid-state image pickup device is substantially 30° in a case where a frequency spectrum inherent in said image guide fiber bundle exists within a domain of substantially ±0.5 MHz in relation to a color sub-carrier frequency of said composite television signal on a two-dimensional spatial frequency plane.

5. A TV system for endoscopes capable of alternatively being connected to a fiber scope including therein an image guide fiber bundle and to a non-flexible endoscope including therein a relay lens, and comprising:
an image forming optical system for forming an endoscopic image obtained by said fiber scope or said non-flexible endoscope on a solid-state image pickup device; and
a camera control unit for converting an electric output signal from said solid-state image pickup device into a television signal to display a picture on a monitoring television screen;
said camera control unit comprises:
electric means for controlling a color difference signal in accordance with a spatial frequency component included in said endoscopic image, and
switching means for putting said electric means into operation in accordance with whichever one of said fiber scope and said non-flexible endoscope is connected to said system;
wherein a suppression characteristic for said color difference signal is adjusted so as to satisfy the following conditions:
fc < fc',
fc' ≧ fF when fF is larger or equal to fc;
wherein said reference symbol fc represents a lowest spatial frequency when said color difference signal has an intensity of 50% or lower in a condition where said non-flexible endoscope is connected to said TV system;
wherein said reference symbol fc' designates a highest spatial frequency when said color difference signal has an intensity of 50% or higher in a condition where said fiber scope is connected to said TV system; and
wherein said reference symbol fF denotes a frequency spectrum inherent in said image guide fiber bundle.

6. A TV system for endoscopes capable of alternatively being connected to a fiber scope including therein an image guide fiber bundle and to a non-flexible endoscope including therein a relay lens, and comprising:
an image forming optical system for forming an endoscopic image obtained by said fiber scope or said non-flexible endoscope on a solid-state image pickup device; and
a camera control unit for converting an electric output signal from said solid-state image pickup device into a television signal to display a picture on a monitoring television screen;
said camera control unit comprises:
an electric circuit in which a suppression characteristic of a color difference signal is controlled in accordance with whichever of said fiber scope and said non-flexible endoscope is connected to said TV system and in which said suppression characteristic is further set in accordance with a frequency spectrum inherent in said image guide fiber bundle when said fiber scope is connected to said TV system, and
means for alternating said suppression characteristics of said color difference signal output in accordance with which one of said fiber scope and said non-flexible endoscope is connected to said TV system;
wherein said suppression characteristic for said color difference signal output is adjusted so as to satisfy the following conditions:
fc < fc',
fc' ≧ fF when fF is larger or equal to fc;
wherein said reference symbol fc represents a lowest spatial frequency when said color difference signal has an intensity of 50% or lower in a condition where said non-flexible endoscope is connected to said TV system;
wherein said reference symbol fc' designates a highest spatial frequency when said color difference signal has an intensity of 50% or higher in a condition where said fiber scope is connected to said TV system; and
wherein said reference symbol fF denotes a frequency spectrum inherent in said image guide fiber bundle.

7. A TV system for endoscopes capable of alternatively being connected to a fiber scope including therein an image guide fiber bundle and to a non-flexible endoscope including therein a relay lens, and comprising:
an image forming optical system for forming an endoscopic image obtained by said fiber scope or said non-flexible endoscope on a solid-state image pickup device, through optical low pass filter means; and
a camera control unit for converting an electric output signal from said solid-state image pickup device into a television signal to display a picture on a monitoring television screen;
said optical low pass filter means comprises:
a first optical low pass filter for said non-flexible endoscope, and
a second optical low pass filter for said fiber scope having a cutoff frequency different from that of said first optical low pass filter;

said first optical low pass filter being arranged in an optical path for forming said endoscopic image on said solid-state image pickup device when said non-flexible endoscope is connected to said TV system; and said second optical low pass filter being arranged in said optical path when said fiber scope is connected to said TV system;

said camera control unit comprises an electric circuit for controlling a suppression characteristic for a color difference signal;

wherein a signal suppression for said color difference signal is performed when said first optical low pass filter is being arranged in said optical path, and said signal suppression for said color difference signal is not performed when said second optical low pass filter is being arranged in said optical path.

8. A TV system for endoscopes capable of alternatively being connected to a fiber scope including therein an image guide fiber bundle and to a non-flexible endoscope including therein a relay lens, and comprising:

an image forming optical system for forming an endoscopic image obtained by said fiber scope or said non-flexible endoscope on a solid-state image pickup device, through optical low pass filter means; and a camera control unit for converting an electric output signal from said solid-state image pickup device into a television signal to display a picture on a monitoring television screen;

said camera control unit comprises an electric circuit for controlling a suppression characteristic for a color difference signal;

said optical low pass filter means comprises:
  a first optical low pass filter for said non-flexible endoscope, and
  a second optical low pass filter for said fiber scope having a cutoff frequency different from that of said first optical low pass filter;

said first optical low pass filter being arranged in an optical path for forming said endoscopic image on said solid-state image pickup device when said non-flexible endoscope is connected to said TV system; and said second optical low pass filter being arranged in said optical path when said fiber scope is connected to said TV system;

wherein said cut-off frequency of said second optical low pass filter is set so as to satisfy the following condition:

$fL \leq fF$ when $fF$ is larger or equal to $fc$;

wherein said reference symbol $fc$ represents a lowest spatial frequency when said color difference signal has an intensity of 50% or lower;

said reference symbol $fF$ designates a frequency spectrum inherent in said image guide fiber bundle; and said reference symbol $fL$ denotes a cut-off frequency of said second optical low pass filter.

9. A TV system for endoscopes so arranged that an endoscopic image of an object is formed on a solid-state image pickup device and that a television signal is generated on the basis of an output from said solid-state image pickup device, to display said endoscopic image on a monitoring television screen, wherein said TV system comprises:

electric means for reducing a chroma-signal output of said television signal when a frequency spectrum of said endoscopic image does not exist within a first domain of substantially ±0.5 MHz in relation to a color sub-carrier frequency on a two-dimensional frequency plane; and means for lessening attenuation of said chroma-signal output when the frequency spectrum of said endoscopic image exists within a second domain of substantially ±0.5 MHz in relation to said color sub-carrier frequency on the two-dimensional frequency plane.

* * * * *